(12) United States Patent
Seo et al.

(10) Patent No.: US 12,443,235 B2
(45) Date of Patent: Oct. 14, 2025

(54) ELECTRONIC DEVICE INCLUDING PRINTED CIRCUIT BOARD MODULE

(71) Applicant: SAMSUNG ELECTRONICS CO., LTD., Suwon-si (KR)

(72) Inventors: Soohyun Seo, Suwon-si (KR); Moonchul Shin, Suwon-si (KR); Baekeun Cho, Suwon-si (KR); Sanghyuk Park, Suwon-si (KR); Nakhyun Choi, Suwon-si (KR); Jooyoung Kang, Suwon-si (KR); Myunghoon Kwak, Suwon-si (KR); Yangwook Kim, Suwon-si (KR); Hyunsuk Kim, Suwon-si (KR); Jookwan Lee, Suwon-si (KR); Changryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 18/110,076

(22) Filed: Feb. 15, 2023

(65) Prior Publication Data
US 2023/0195171 A1    Jun. 22, 2023

Related U.S. Application Data

(63) Continuation of application No. PCT/KR2022/014493, filed on Sep. 27, 2022.

(30) Foreign Application Priority Data

Nov. 19, 2021 (KR) .................. 10-2021-0160433
Jan. 26, 2022 (KR) .................. 10-2022-0011404

(51) Int. Cl.
H05K 7/20         (2006.01)
G06F 1/16         (2006.01)
(Continued)

(52) U.S. Cl.
CPC .......... G06F 1/1652 (2013.01); G06F 1/1624 (2013.01); G06F 1/184 (2013.01); G06F 1/203 (2013.01); H05K 7/205 (2013.01)

(58) Field of Classification Search
CPC ...... G06F 1/1652; G06F 1/1624; G06F 1/184; G06F 1/203; H05K 7/205
(Continued)

(56) References Cited

U.S. PATENT DOCUMENTS 5,619,399 A     4/1997  Mok
8,093,505 B2 *  1/2012  Gokan ................. H05K 1/144
                                              257/676
(Continued)

FOREIGN PATENT DOCUMENTS

KR    10-1395358       5/2014
KR    10-2016-0043253  4/2016
(Continued)

OTHER PUBLICATIONS

International Search Report for PCT/KR2022/014493, mailed Jan. 5, 2023, 3 pages.
(Continued)

*Primary Examiner* — Binh B Tran
(74) *Attorney, Agent, or Firm* — Nixon & Vanderhye P.C.

(57) ABSTRACT

An electronic device may include a housing including a first housing and a second housing to move relative to the first housing, a flexible display supported by at least one of the first housing or the second housing and changeable in form of a display area based on a movement of the second housing relative to the first housing, a board module disposed inside the housing, and a seating portion that forms a seating space receiving the board module and supports the board module.

20 Claims, 36 Drawing Sheets

(51) Int. Cl.
*G06F 1/18* (2006.01)
*G06F 1/20* (2006.01)

(58) Field of Classification Search
USPC .......................................................... 361/748
See application file for complete search history.

(56) References Cited

U.S. PATENT DOCUMENTS

| | | | |
|---|---|---|---|
| 2003/0168254 A1* | 9/2003 | Kariya | H01L 25/0657 |
| | | | 257/E21.705 |
| 2005/0168961 A1* | 8/2005 | Ono | H01L 25/0652 |
| | | | 257/E25.011 |
| 2005/0184381 A1* | 8/2005 | Asahi | H01R 13/2414 |
| | | | 257/693 |
| 2008/0036071 A1 | 2/2008 | Li et al. | |
| 2017/0142241 A1 | 5/2017 | Kim et al. | |
| 2019/0082535 A1 | 3/2019 | Myers et al. | |
| 2021/0326569 A1 | 10/2021 | Song et al. | |
| 2021/0337659 A1 | 10/2021 | Liu | |

FOREIGN PATENT DOCUMENTS

| | | |
|---|---|---|
| KR | 10-2017-0063229 | 6/2017 |
| KR | 10-2018-0006533 | 1/2018 |
| KR | 10-2018-0014603 | 2/2018 |
| KR | 10-2019-0029215 | 3/2019 |
| KR | 10-2019-0086305 | 7/2019 |
| KR | 10-2020-0117741 | 10/2020 |
| KR | 10-2021-0050235 | 5/2021 |

OTHER PUBLICATIONS

Extended European Search Report dated Oct. 2, 2024 for EP Application No. 22895835.1.

* cited by examiner

ELECTRONIC DEVICE INCLUDING PRINTED CIRCUIT BOARD MODULE

CROSS-REFERENCE TO RELATED APPLICATIONS

This application is a continuation of International Application No. PCT/KR2022/014493 designating the United States, filed on Sep. 27, 2022, in the Korean Intellectual Property Receiving Office and claiming priority to Korean Patent Application No. 10-2021-0160433, filed on Nov. 19, 2021, and to Korean Patent Application No. 10-2022-0011404, filed on Jan. 26, 2022 in the Korean Intellectual Property Office, the disclosures of which are all hereby incorporated by reference herein in their entireties.

BACKGROUND

1. Field

The disclosure relates to an electronic device including a printed circuit board (PCB).

2. Description of Related Art

Electronic devices are becoming slimmer, and are being developed in various ways to strengthen design aspects and differentiate functional elements at the same time. Research has been conducted to realize an electronic device having a deformable structure that is convenient to carry and can use a large-screen display.

In one example, an electronic device may include a display disposed on a plurality of housings, so that the display is folded and unfolded while the plurality of housings forms an angle. In another example, an electronic device may include a display of which a screen display area is expanded in response to one housing moving relative to another housing.

SUMMARY

Certain example embodiments may provide an electronic device including a display that slidably operates such that an externally exposed area is changed based on an operation of a housing. The electronic device may use a board module laminating a plurality of circuit boards to efficiently use a space formed inside the housing. In addition, various techniques are used for heat dissipation or waterproofing of the board module.

Certain example embodiments may provide a heat dissipation member (heat dissipator) disposed at an outer surface of an interposer connecting, directly or indirectly, a plurality of circuit boards to efficiently dissipate heat generated from a plurality of circuit boards.

Certain example embodiments may provide a heat dissipator to prevent or reduce moisture from penetrating a board space formed between a plurality of circuit boards.

Technical goals to be achieved through the one embodiment disclosed in this disclosure are not limited to the technical goals mentioned above, and other technical goals not mentioned will be clearly understood from the following description by those skilled in the art.

According to an example embodiment, an electronic device may include a housing including a first housing and a second housing to move relative to the first housing, a flexible display supported by at least one of the first housing and/or the second housing and changeable in form of a display area based on a movement of the second housing relative to the first housing, a board module disposed inside the housing, and a seating portion that forms a seating space receiving the board module and supports the board module. The board module may include a plurality of circuit boards spaced apart from each other and including one or more electrical elements, at least one interposer having at least a portion placed between, directly or indirectly, the plurality of circuit boards and electrically connecting, directly or indirectly, at least two circuit boards among the plurality of circuit boards, and a heat dissipator that is part of, contacting, and/or disposed in the interposer. In a state in which the board module is received in the seating space, at least a portion of a surface of the heat dissipator may contact the seating portion so that heat generated in the plurality of circuit boards is transferred to the seating portion.

According to an example embodiment, the board module disposed inside the electronic device may include the plurality of circuit boards spaced apart from each other and including the one or more electrical elements, the at least one interposer having at least a portion disposed between, directly or indirectly, the plurality of circuit boards and electrically connecting, directly or indirectly, at least two circuit boards among the plurality of circuit boards, and the heat dissipator 633 that is part of, contacting, and/or disposed in the interposer. The plurality of circuit boards includes a first circuit board and a second circuit board.

According to an example embodiment, the electronic device may include the housing, the flexible display supported by the housing, the board module disposed inside the housing, and the seating portion that forms the seating space receiving the board module and supports the board module. The board module includes the plurality of circuit boards spaced apart from each other and including the one or more electrical elements, the at least one interposer having at least a portion disposed between, directly or indirectly, the plurality of circuit boards and electrically connecting, directly or indirectly, at least two circuit boards among the plurality of circuit boards, and the heat dissipator that is part of, contacting, and/or disposed in the interposer. In a state in which the board module is received in the seating space, at least a portion of the heat dissipator may contact the seating portion so that heat generated in the plurality of circuit boards is transferred to the seating portion. The seating portion includes the at least one contact portion formed on the inner circumferential surface of the seating space 641 and in surface contact with an outer surface of the heat dissipator. When facing the seating direction, in the board module, at least one circuit board of the plurality of circuit boards includes a support portion having an edge protruding to the outer side of the interposer. The heat dissipator is supported by the support portion.

According to one embodiment, the electronic device includes the housing comprising the first housing and the second housing, and the second housing configured to move relative to the first housing, the flexible display supported by at least one of the first housing or the second housing and changeable in form of a display area based on a movement of the second housing relative to the first housing, the board module disposed inside the housing, and a seating portion configured to form the seating space receiving the board module and to support the board module. The board module includes the first circuit board including the first board surface and the second board surface opposite to the first board surface, the second circuit board including the third board surface facing the second board surface and the fourth board surface opposite to the third board surface, the third circuit board disposed between the first circuit board and the second circuit board and comprising the fifth board surface facing the second board surface and a sixth board surface facing the third board surface, the first interposer disposed between the first circuit board and the third circuit board and configured to electrically connect the first circuit board and the third circuit board, the second interposer disposed between the second circuit board and the third circuit board and configured to electrically connect the second circuit board and the third circuit board, and the heat dissipator that is part of, connected to, and/or disposed in, the first interposer and the second interposer. In a state in which the board module is accommodated in the seating space, at least a portion of a surface of the heat dissipator contacts the seating portion so that heat generated in the plurality of circuit boards can be transferred to the seating portion.

According to an example embodiment, it is possible to improve a heat dissipation performance of an electronic device by placing a heat dissipation member at an outer surface of an interposer connecting, directly or indirectly, a plurality of circuit boards provided in a laminated manner such that heat generated in a circuit board is transmitted to a housing.

According to an example embodiment, it is possible to prevent or reduce moisture from penetrating a board space formed between, directly or indirectly, a plurality of circuit boards by placing a heat dissipation member at an outer surface of an interposer such that a gap between the circuit board is filled.

Effects of the electronic device according to an example embodiment are not limited to those mentioned above, and other effects not mentioned will be clearly understood by those skilled in the art from the following description.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
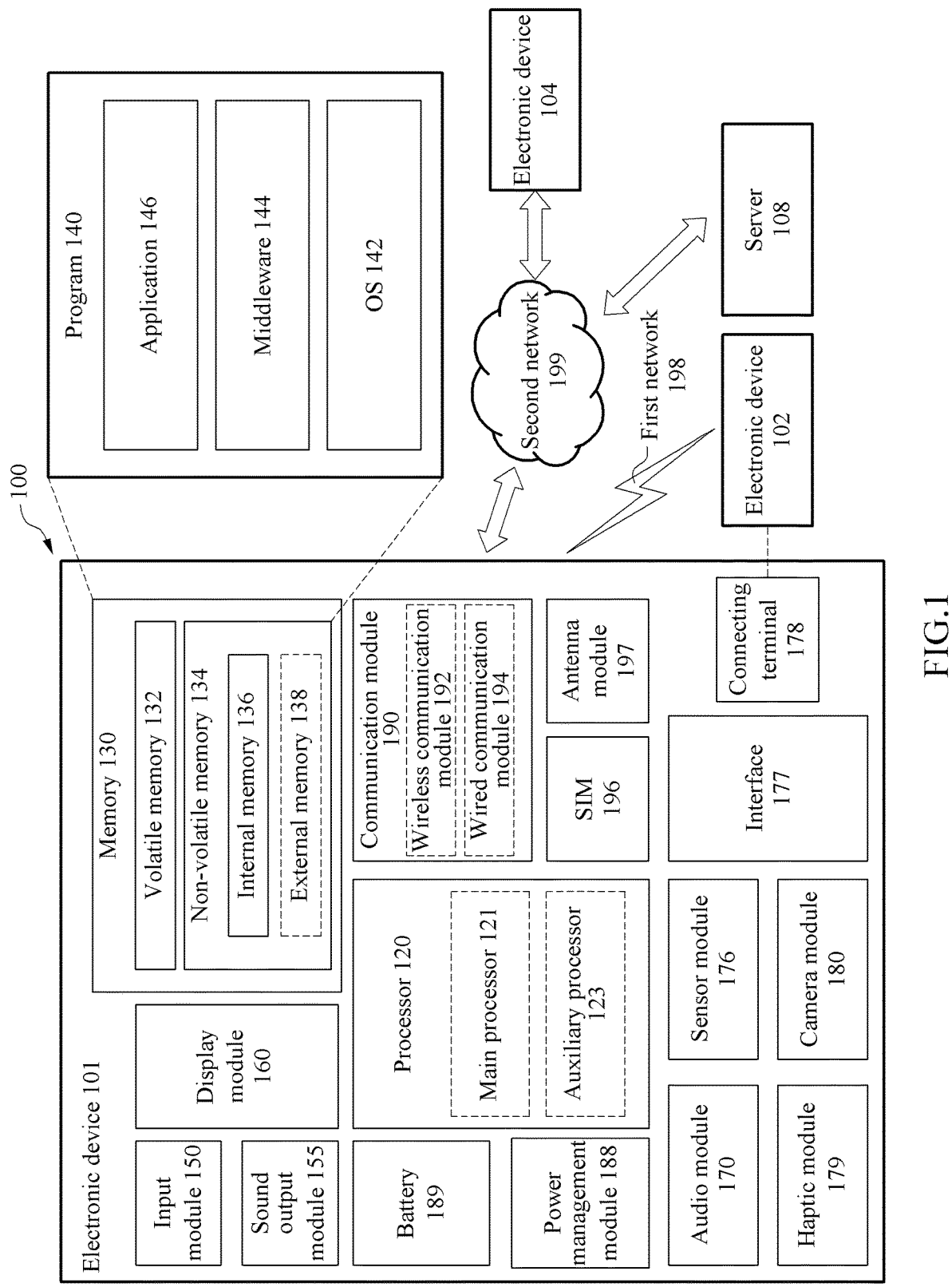
FIG. 1 is a block diagram illustrating an example electronic device in a network environment according to an example embodiment.

Hereinafter, an example embodiment will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to an example embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected, directly or indirectly, to the processor 120, and may perform various data processing or computation. According to an example embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include a slit antenna, and/or an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between, directly or indirectly, the communication module 190 and the external electronic device via the at least one selected antenna. According to an example embodiment, another component (e.g., a radio frequency integrated circuit (RFIC)) other than the radiating element may be additionally formed as a part of the antenna module 197.

According to an example embodiment, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an example embodiment may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that an example embodiment of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via at least a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

An example embodiment as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an example embodiment, each component (e.g., a module or a program) of the above-described components may include a single entity or multiple entities, and some of the multiple entities may be separately disposed in different components. According to an example embodiment, one or more of the above-described components may be omitted, or one or more other components may be added. Alternatively or additionally, a plurality of components (e.g., modules or programs) may be integrated into a single component. In such a case, according to an example embodiment, the integrated component may still perform one or more functions of each of the plurality of components in the same or similar manner as they are performed by a corresponding one of the plurality of components before the integration. According to an example embodiment, operations performed by the module, the program, or another component may be carried out sequentially, in parallel, repeatedly, or heuristically, or one or more of the operations may be executed in a different order or omitted, or one or more other operations may be added.

Figure 2A:
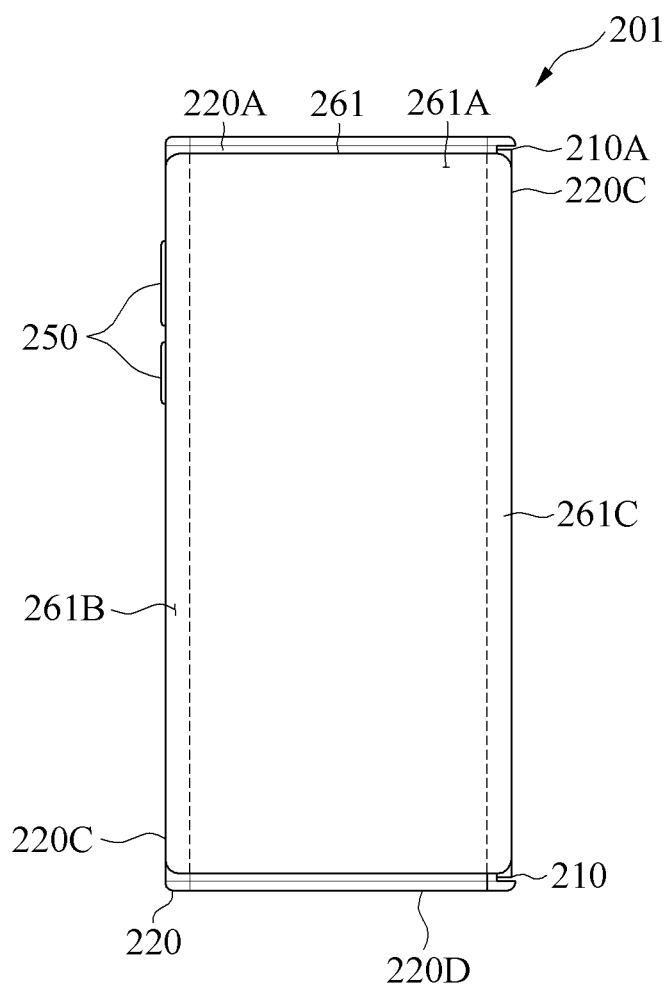
FIG. 2A is a front view illustrating an electronic device according to an example embodiment.
Figure 2B:
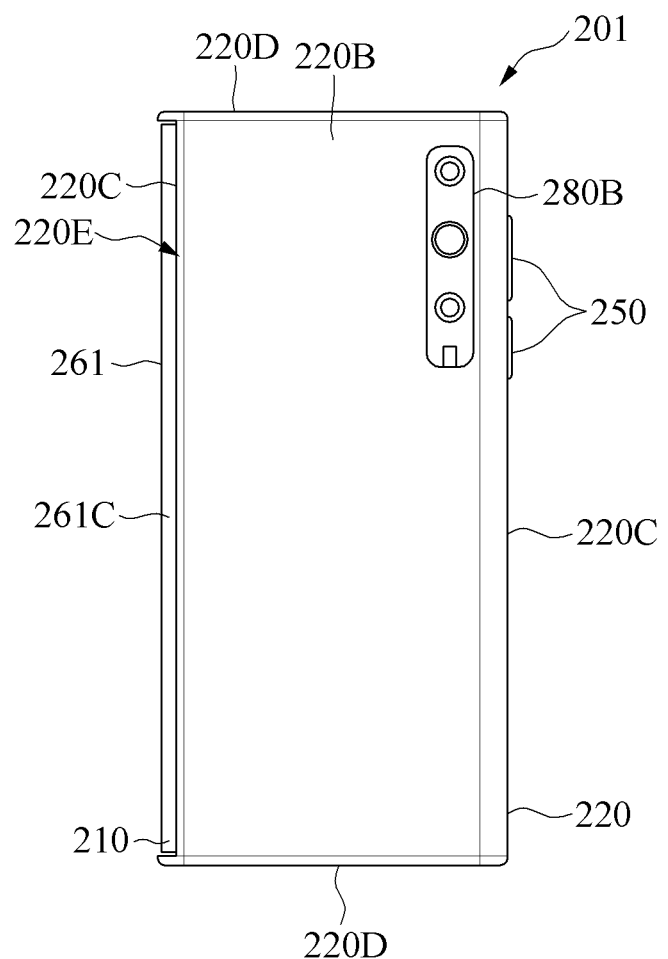
FIG. 2B is a rear view illustrating an electronic device according to an example embodiment.
Figure 2B:
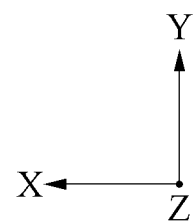
Figure 2C:
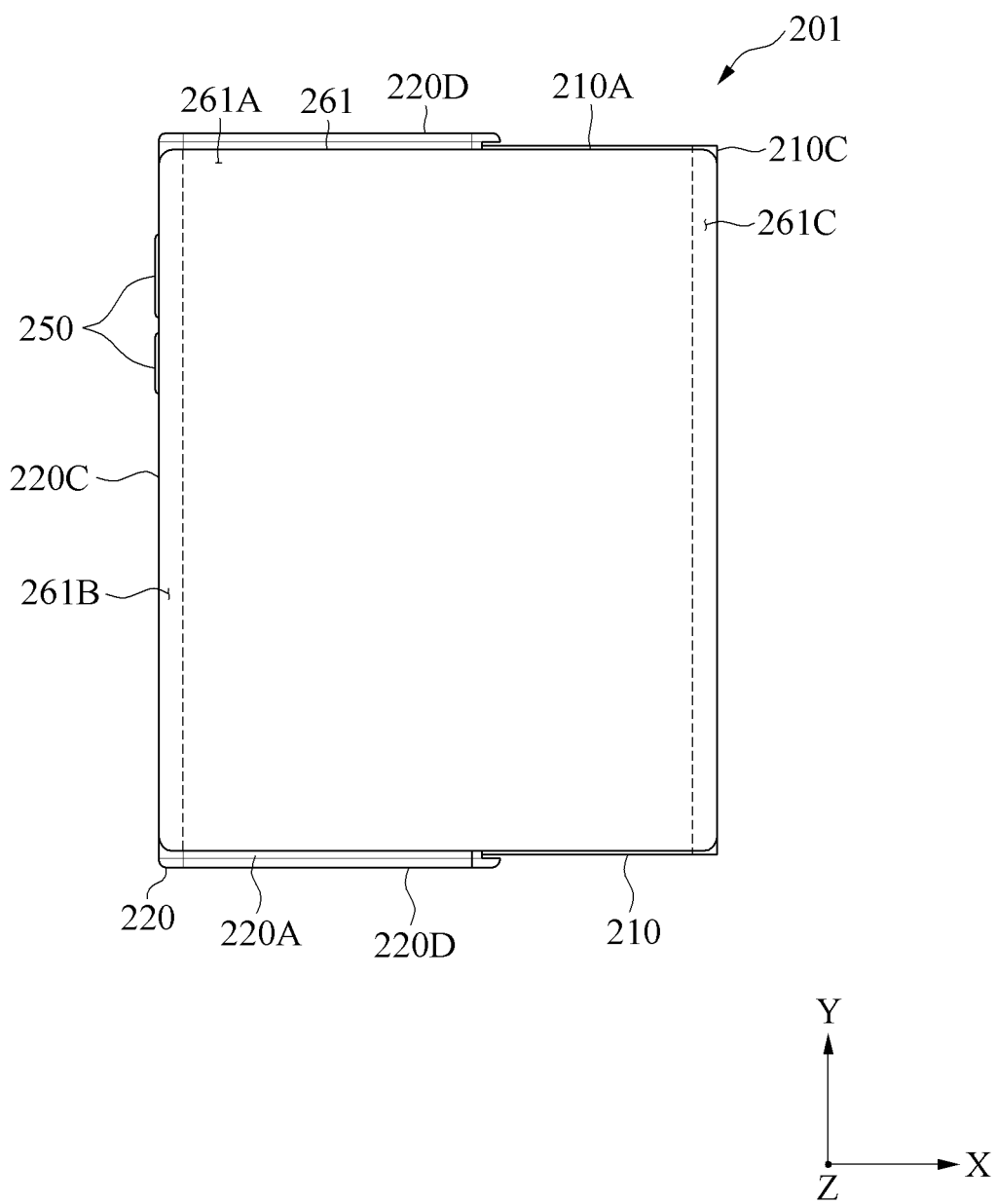
FIG. 2C is a front view illustrating an electronic device according to an example embodiment.
Figure 2D:
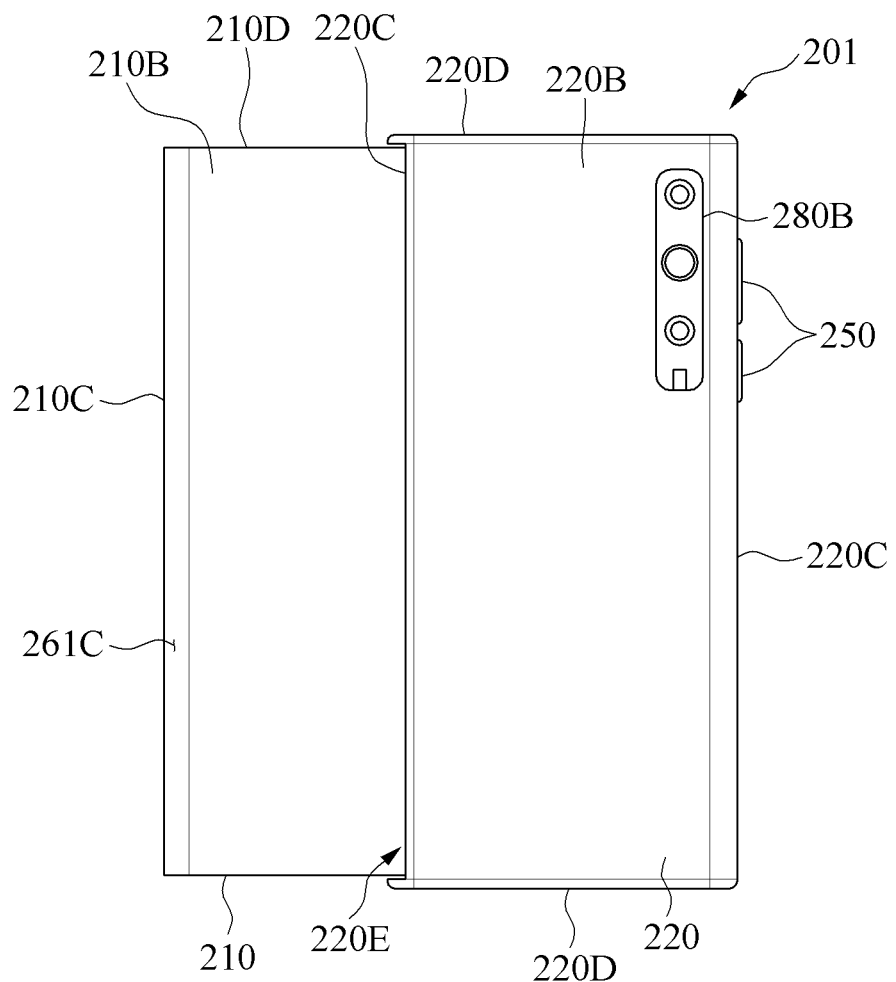
FIG. 2D is a rear view illustrating an electronic device according to an example embodiment.
Figure 2E:
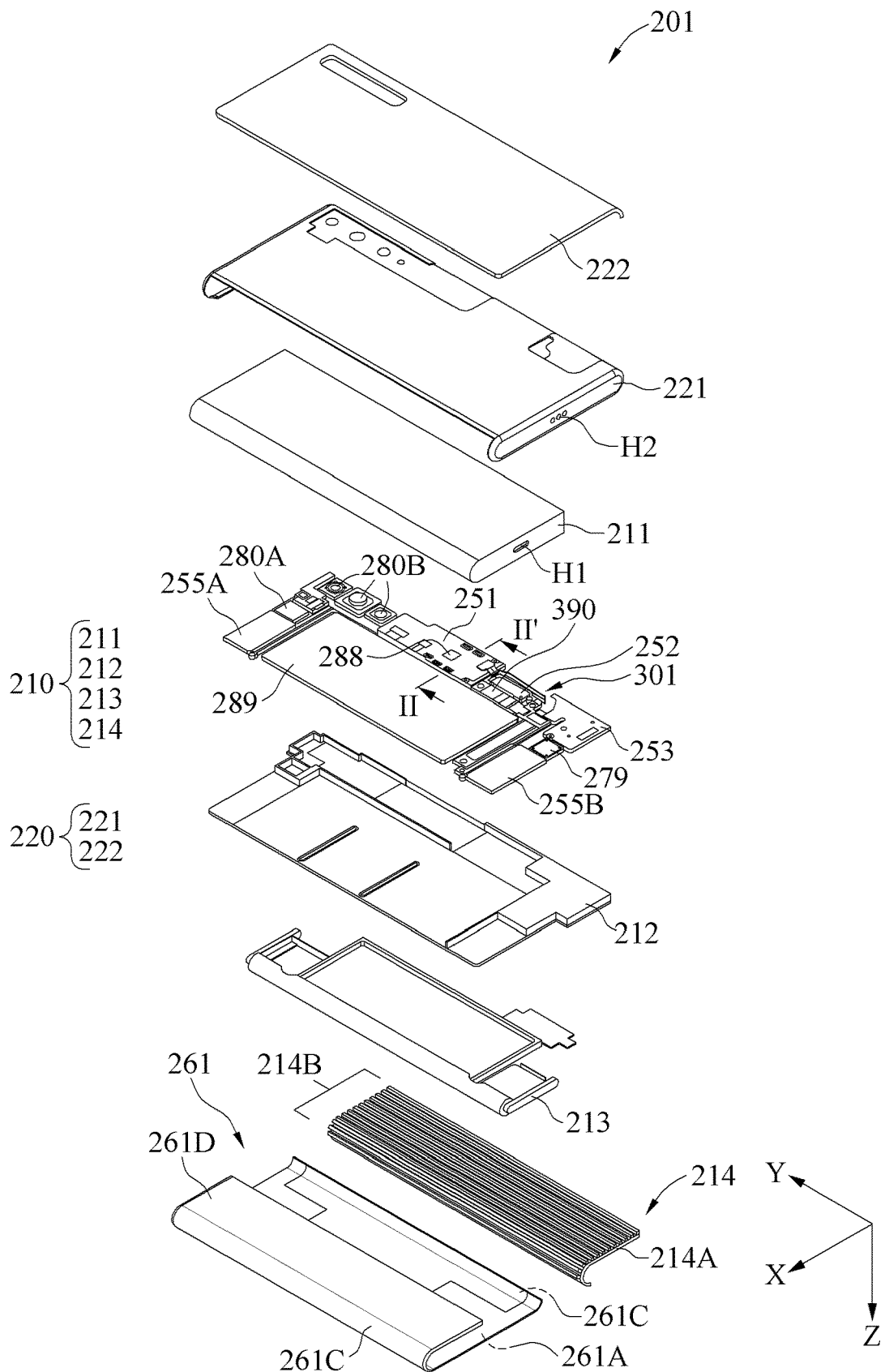
FIG. 2E is an exploded perspective view illustrating an electronic device according to an example embodiment.

FIG. 2A is a front view illustrating an electronic device according to one embodiment, FIG. 2B is a rear view illustrating an electronic device according to one embodiment, FIG. 2C is a front view illustrating an electronic device according to one embodiment, FIG. 2D is a rear view illustrating an electronic device according to one embodiment, and FIG. 2E is an exploded perspective view illustrating an electronic device according to one embodiment.

Specifically, FIGS. 2A and 2B are views obtained when the electronic device is in a retracted state and FIGS. 2C and 2D are views obtained when the electronic device is in an expanded state.

Referring to FIGS. 2A through 2E, an electronic device 201 (e.g., the electronic device 101 of FIG. 1) according to one embodiment includes a housing that forms an appearance and accommodates components therein. The housing may include a first housing 210 and a second housing 220 coupled to be movable relative to each other.

In one embodiment, the first housing 210 may be coupled to the second housing 220 to slide relative to the second housing 220. The first housing 210 may move relative to the second housing 220 in a first direction (e.g., +X-axial direction) or move relative to the second housing 220 in a second direction (e.g., −X-axial direction) opposite to the first direction. In one embodiment, descriptions will be made based on a case in which the first housing 210 moves relative to the second housing 220. However, it is merely an example, and it should be understood that the second housing 220 also slides relative to the first housing 210.

In one embodiment, the first housing 210 may include a first surface 210A (e.g., a first front surface), a second surface 210B (e.g., a first rear surface) opposite to the first surface 210A, a plurality of (e.g., two) first side surfaces 210C (e.g., a first left side surface and a first right side surface) disposed between, directly or indirectly, the first surface 210A and the second surface 201B in one direction (e.g., +/−X-axial direction), and a plurality of (e.g., two) second side surfaces 210D (e.g., a first upper side surface and a first lower side surface) disposed between the first surface 210A and the second surface 201B in another direction (e.g., +/−Y-axial direction) intersecting with the one direction (e.g., +/−X-axial direction). In one embodiment, the plurality of first side surfaces 210C may be formed as round surfaces. In one embodiment, the first housing 210 may include at least one first hole H1 formed in the second side surface 210D (e.g., the first lower side surface) facing one direction (e.g., −Y-axial direction) among the second side surfaces 210D.

In one embodiment, the second housing 220 may include a third surface 220A (e.g., a second front surface), a fourth surface 220B (e.g., a second rear surface) opposite to the third surface 220A, a plurality of (e.g., two) third side surfaces 220C (e.g., a second left side surface and a second right side surface) disposed between, directly or indirectly, the third surface 220A and the fourth surface 220B in one direction (e.g., +/−X-axial direction), and a plurality of (e.g., two) fourth side surfaces 220D (e.g., a second upper side surface and a second lower side surface) disposed between, directly or indirectly, the third surface 220A and the fourth surface 220B in another direction (e.g., +/−Y-axial direction) intersecting with the one direction (e.g., +/−X-axial direction). Among the plurality of third side surfaces 220C, the third side surfaces 220C facing one direction (e.g., +X-axial direction) may include an opening portion 220E that is at least partially opened. In one embodiment, the plurality of third side surfaces 220C may be formed as round surfaces. In one embodiment, the second housing 220 may include at least one second hole H2 formed in the fourth side surface 220D (e.g., the second lower side surface) facing one direction (e.g., −Y-axial direction) among the plurality of fourth side surfaces 220D. The second hole H2 may be aligned with, for example, the first hole H1.

In one embodiment, the electronic device 201 may include a display 261 (e.g., the display module 160 of FIG. 1) including a screen display area. In one embodiment, the display 261 may be one of a flexible display, a foldable display, or a rollable display.

In one embodiment, the screen display area may include a first area 261A located between, the first surface 210A and the third surface 220A, a second area 261B located on the third side surfaces 220C facing one direction (e.g., −X-axial direction) among the third side surfaces 220C, a third area 261C located on the third side surfaces 220C facing the other direction (e.g., +X-axial direction) among the third side surfaces 220C and surround at least a portion of the opening portion 220E, and a fourth area 261D located between the second surface 201B and the fourth surface 220B.

In one embodiment, the second area 261B and the third area 261C of the display 261 may have flexibly curved round surfaces. In some cases, the second area 261B may be at least partially located on the first surface 210A and the third surface 220A. In some cases, the third area 261C may be at least partially located on the first surface 210A and the third surface 220A. In some cases, the third area 261C may be at least partially located on the second surface 201B and the fourth surface 220B.

In another embodiment, the display 261 may display a portion of a screen. For example, the display 261 may display a screen through the first area 261A located on the first surface 210A and the third surface 220A. The second area 261B, the third area 261C, and/or the fourth area 261D may display the screen at a viewpoint different from that of the first area 261A. In one embodiment, the screen display area of the display 261 may be expanded or retracted in response to the first housing 210 moving in the first direction and the second direction.

In one embodiment, when viewed in one direction (e.g., −Z-axial direction), the electronic device 201 may be changed in form between a first form (e.g., a retracted state, a form of FIG. 2A) having a screen display area (e.g., the first area 261A, the second area 261B, and the third area 261C) of a first size and a second form (e.g., an expanded state, a state of FIG. 2C) having a screen display area (e.g., the first area 261A, the second area 261B, and the third area 261C) of a size larger than the first size. For example, in the first form, when the first housing 210 moves relative to the second housing 220 in the first direction (e.g., +X-axial direction), a size of the first area 261A may increase, a size of the fourth area 261D may decrease, and the screen display area of the electronic device 201 viewed in one direction (e.g., −Z-axial direction) may be expanded. For example, in the second form, when the first housing 210 moves relative to the second housing 220 in the second direction (e.g., −X-axial direction) opposite to the first direction, the size of the first area 261A may decrease and the size of the fourth area 261D may increase. While the electronic device 201 is changed in form between the first form and the second form, the size of the second area 261B and the size of the third area 261C may be substantially constant.

For ease of description, FIGS. 2A through 3B illustrate an example in which an area of the display 261 exposed to an outside of the electronic device 201 is expanded in a +x-axial direction (e.g., a rightward direction of FIGS. 2A and 2C). However, a direction in which the display 261 of the electronic device 201 is expanded is not limited to the example shown in the drawings. In one embodiment, the electronic device 201 may operate the externally exposed area of the display 261 to expand in the −x-axial direction (e.g., the leftward direction of FIGS. 2A and 2C), the +y-axial direction (e.g., the upward direction), or the −y-axial direction (e.g., the downward direction). In addition, even when expanded in the horizontal direction (e.g., the x-axial direction) or the vertical direction (e.g., y-axial direction), the externally exposed area may be expanded in one direction or multiple directions (e.g., the bi-direction). For example, when the electronic device 201 operates the externally exposed the display 261 to expand in the x-axial direction (e.g., the leftward or rightward direction), the display 261 may be expanded in one of the −x-axial direction (e.g., the leftward direction) or +x-axial direction (e.g., the rightward direction), or may be expanded in both −x-axial direction and +x-axial direction. Also, when the electronic device 201 operates the display 261 to expand in the vertical direction (e.g., y-axial direction), the display 261 may be expanded in one of the upward direction (e.g., +y-axial direction) or the downward direction (e.g., −y-axial direction), or may be expanded in both upward direction and downward direction. Hereinafter, one embodiment is described under an assumption that the display 261 is expanded in the +x-axial direction, but this is merely for convenience of description, and an implementation method of each embodiment is not limited thereto. Each embodiment herein may be used in combination with any other embodiment described herein.

In one embodiment, the electronic device 201 may include a sliding device 300 including a driving device 390 to allow the first housing 210 and the second housing 220 to move relative to each other. The sliding device 300 may be connected, directly or indirectly, to the first housing 210 and the second housing 220 and slide another housing based on one housing so that a display is expanded or retracted in response to the first housing 210 or the second housing 220 moving.

In one embodiment, the electronic device 201 may include an input module 250 (e.g., the input module 150 of FIG. 1). For example, the input module 250 may be formed in the third side surfaces 220C (e.g., a second left side surface) not including the opening portion 220E among the plurality of third side surfaces 220C.

In one embodiment, the electronic device 201 may include a first sound output module 255A (e.g., the sound output module 155 of FIG. 1) and a second sound output module 255B (e.g., the sound output module 155 of FIG. 1). In one embodiment, the first sound output module 255A may be disposed in a first portion (e.g., upper portion) of the first housing 210 and the second sound output module 255B may be disposed in a second portion (e.g., lower portion) of the first housing 210 different from the first portion.

For example, in the first form (e.g., the retracted state of the electronic device 201 of FIG. 2A), the first sound output module 255A may perform a handset function. The second sound output module 255B may perform a speaker function in the first form. In the second form (e.g., the expanded state of the electronic device 201 of FIG. 2C), the first sound output module 255A and the second sound output module 255B may perform the speaker function. In some cases, in the second form, the first sound output module 255A and the second sound output module 255B may cooperate to output a stereo sound.

In one embodiment, the second sound output module 255B may output sound through the first hole H1 and the second hole H2, which are substantially aligned to each other, in the first form and output sound through the first hole H1 in the second form. In another embodiment, at least one of the first sound output module 255A and the second sound output module 255B may be disposed in the second housing 220. In another embodiment, the electronic device 201 may include only one of the first sound output module 255A and the second sound output module 255B, or may further include a sound output module in addition to the sound output module shown in the drawing.

In one embodiment, the electronic device 201 may include a haptic module 279 (e.g., the haptic module 179 of FIG. 1). The haptic module 279 may include, for example, a vibrator that generates vibrations. In one embodiment, the haptic module 279 may be disposed in the first housing 210. In some cases, the haptic module 279 may be disposed to be adjacent, to the second sound output module 255B. In another embodiment, the haptic module 279 may be disposed in the second housing 220.

In one embodiment, the electronic device 201 may include a first camera module 280A (e.g., the camera module 180 of FIG. 1) and a second camera module 280B (e.g., the camera module 180 of FIG. 1). The first camera module 280A may acquire an image of the electronic device 201 in one direction (e.g., +Z-axial direction). The second camera module 280B may acquire an image of the electronic device 201 in the other direction (e.g., −Z-axial direction).

In one embodiment, the first camera module 280A and the second camera module 280B may be disposed in the second housing 220. In another embodiment, at least one of the first camera module 280A and the second camera module 280B may be disposed in the first housing 210. In another embodiment, the electronic device 201 may include only one of the first camera module 280A and the second camera module 280B, or may further include a camera module in addition to the camera module shown in the drawing.

In one embodiment, the electronic device 201 may include a battery 289 (e.g., the battery 189 of FIG. 1). In one embodiment, the battery 289 may be disposed in the first housing 210. The battery 289 may be partially surrounded by, for example, the first sound output module 255A, the first camera module 280A, the second camera module 280B, a first printed circuit board (PCB) 251, the sliding device 300, a third PCB 253, the haptic module 279, and the second sound output module 255B. In another embodiment, the battery 289 may be disposed in the second housing 220.

In one embodiment, the electronic device 201 may include the first PCB 251, a second PCB 252, and the third PCB 253. The first PCB 251, the second PCB 252, and the third PCB 253 may include a plurality of metal layers and a plurality of dielectrics positioned between, directly or indirectly, a pair of metal layers neighboring. In one embodiment, the first PCB 251 may be disposed in the second housing 220. The first PCB 251 may include a first electronic component 288 (e.g., the power management module 188 of FIG. 1). The second PCB 252 may be disposed in the first housing 210. The second PCB 252 may be electrically connected to, for example, the sliding device 300. The third PCB 253 may be disposed in the second housing 220. The third PCB 253 may be electrically connected, directly or indirectly, to, for example, the haptic module 279.

According to one embodiment, the electronic device 201 may include a housing, for example, the first housing 210 and the second housing 220. Specifically, the electronic device 201 may include a first cover 211, a first plate 212, a second plate 213, and a support structure body 214. The first cover 211, the first plate 212, the second plate 213, and the support structure body 214 may form the first housing 210. The electronic device 201 may include a second cover 221 and a third plate 222. The second cover 221 and the third plate 222 may form the second housing 220.

In one embodiment, the first cover 211 may at least partially cover the first sound output module 255A, the first camera module 280A, the haptic module 279, and the second sound output module 255B. The first plate 212 may at least partially accept electronic components (e.g., the sliding device 300, the first sound output module 255A, the second sound output module 255B, the first camera module 280A, the second camera module 280B, the first PCB 251, the second PCB 252, the third PCB 253, a connector assembly 290, the haptic module 279, and other electronic components). The second plate 213 may be disposed between, directly or indirectly, the first plate 212 and the display 261 and support the sliding device 300 and the display 261.

In one embodiment, the support structure body 214 may include a base plate 214A curved flexibly, and a plurality of support bars 214B arranged along the base plate 214A to be spaced apart from one another to support the display 261. The second cover 221 may cover at least a portion of the first cover 211 and be coupled to the first cover 211 such that the first cover 211 slides with respect to the second cover 221.

In one embodiment, the second cover 221 may guide the plurality of support bars 214B. The second cover 221 may expose at least a portion (e.g., the second camera module 280B) of the electronic components to the outside of the electronic device 201. The third plate 222 may cover at least a portion of the second cover 221. The third plate 222 may include, for example, a glass material. The structures forming the first housing 210 and the second housing 220 described herein are not limited to the embodiments shown in the drawings, and various forms of structures may be applicable.

Figure 3A:
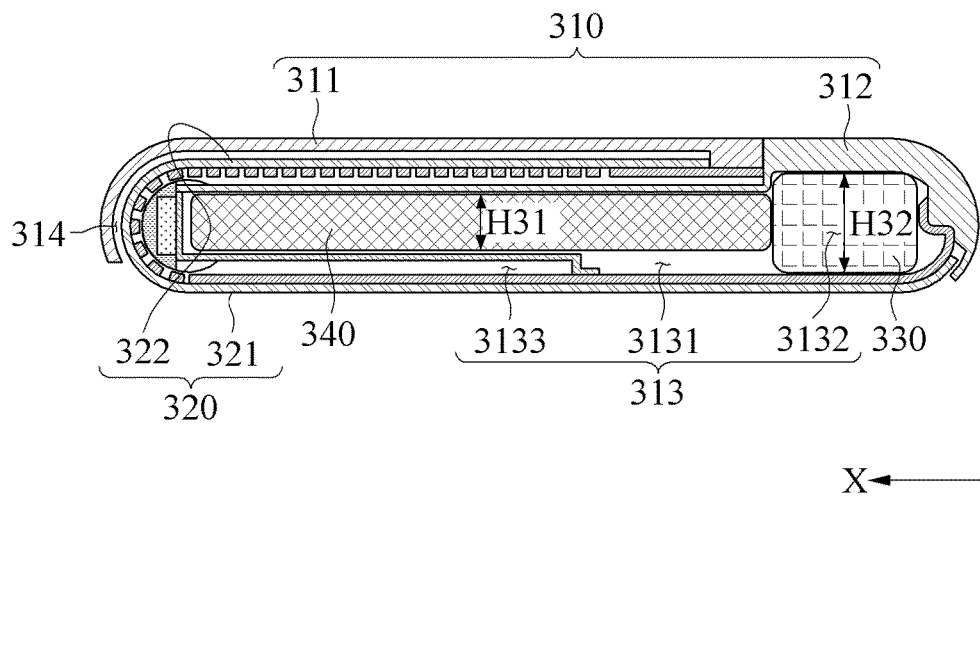
FIG. 3A is a cross-sectional view illustrating a first form of an electronic device according to an example embodiment.
Figure 3B:
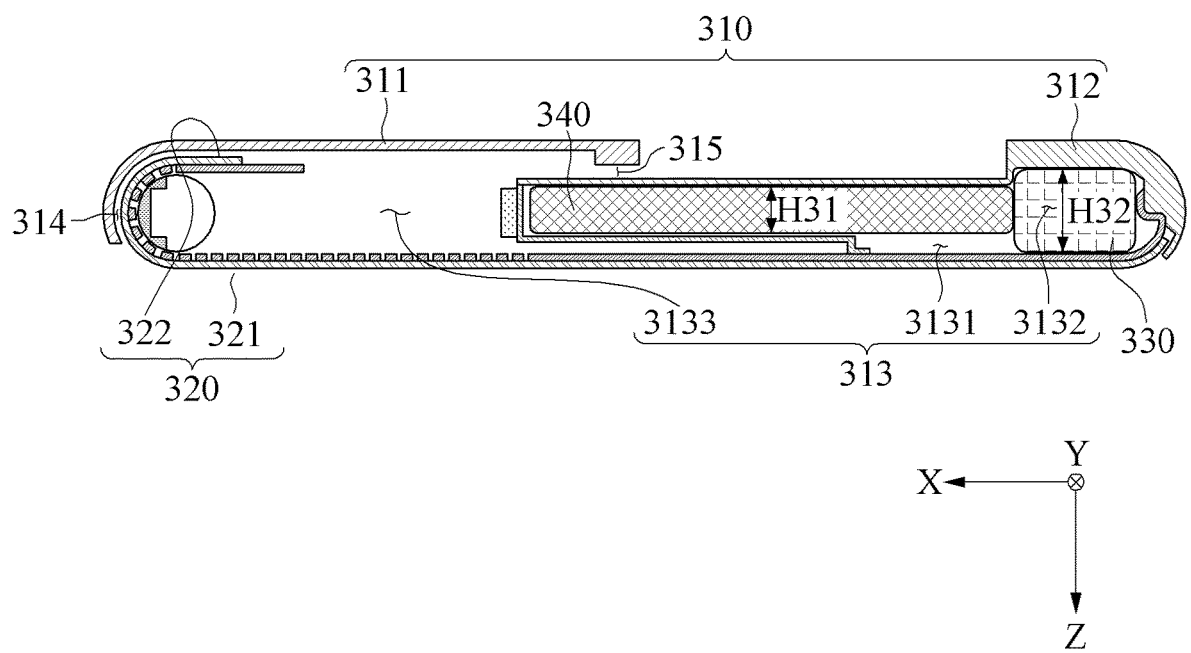
FIG. 3B is a cross-sectional view illustrating a second form of an electronic device according to an example embodiment.

FIG. 3A is a cross-sectional view illustrating a first form of an electronic device according to one embodiments and FIG. 3B is a cross-sectional view illustrating a second form of an electronic device according to one embodiment.

Referring to FIGS. 3A and 3B, an electronic device 301 (e.g., the electronic device 101 of FIG. 1 or the electronic device 201 of FIG. 2A) according to one embodiment may include a housing 310 (e.g., the housings 210 and 220 of FIG. 2A), a flexible display 320 (e.g., the display module 160 of FIG. 1 or the display 261 of FIG. 2A), a board module 330 (e.g., the first PCB 251 of FIG. 2E) and a battery 340 (e.g., the battery 189 of FIG. 1 or the batter 289 of FIG. 2E).

In one embodiment, the housing 310 may include a first housing 311 and a second housing 312 forming an appearance of the electronic device 301. In one embodiment, the first housing 311 and the second housing 312 may be connected, directly or indirectly, so as to partially move relative to each other in a movement direction (e.g., X-axial direction). For example, while a form of the electronic device 301 is changed, the first housing 311 may move relative to the second housing 312in the movement direction (e.g., X-axial direction).

Hereinafter, for convenience of descriptions, relative movement operations of the first housing 311 and the second housing 312 are assumed as a movement of the first housing 311 relative to the second housing 312 in the movement direction (e.g., X direction).

In one embodiment, the housing 310 may have a housing space 313 therein. In one embodiment, the housing space 313 may include a first space 3131, a second space 3132, and a third space 3133. For example, the first space 3131 and the second space 3132 may be formed in the second housing 312, and the third space 3133 may be formed in the first housing 311.

In one embodiment, the housing 310 may include an outlet 314 formed in a front surface (e.g., a surface facing +Z axis). In one embodiment, the outlet 314 may be formed between the first housing 311 and the second housing 312 to externally communicate the third space 3133 formed in the first housing 311. In one embodiment, the outlet 314 may be formed to have a longitudinal direction (e.g., Y-axial direction) perpendicular to the movement direction (e.g., X-axial direction) when facing the front surface (e.g., a surface facing +Z-axial direction) of the housing 310. In one embodiment, while the first housing 311 moves relative to the second housing 312, at least a portion of the flexible display 320 may be drawn out of the housing 310 through the outlet 314 or inserted into the third space 3133 through the outlet 314. In one embodiment, the flexible display 320 may include an exposed portion 321 exposed to the outside of the housing 310 and an inserted portion 322 inserted into the housing 310. In this case, a length of the outlet 314 in the longitudinal direction (e.g., Y-axial direction) may be greater than a length of the flexible display 320 in a height direction (e.g., Y-axial direction).

In one embodiment, in a first form as illustrated in FIG. 3A, the first housing 311 may be connected to the second housing 312 such that the first space 3131 of the second housing 312 is located inside. In this case, an opening portion 315 having at least a portion opened may be formed between the first housing 311 and the second housing 312 such that the first housing 311 moves relative to the second housing 312. In one embodiment, the opening portion 315 may be formed between the first housing 311 and the second housing 312 to communicate the third space 3133 of the first housing 311 externally. In one embodiment, the opening portion 315 may be formed to have a longitudinal direction (e.g., Y-axial direction) perpendicular to the movement direction (e.g., X-axial direction) when facing a rear surface (e.g., a surface facing −Z-axial direction) of the housing 310.

In one embodiment, the flexible display 320 may be supported by the first housing 311 and the second housing 312 and visually exposed to the outside of the electronic device 301, for example, the front surface (e.g., a surface facing +Z direction) of the housing 310 through a display area. In one embodiment, a size to which the display area of the flexible display 320 is exposed externally may be changed based on the relative movement of the first housing 311 and the second housing 312. For example, the display area of the flexible display 320 may be changed in size between a first form having a minimum or small size as shown in FIG. 3A and a second form having a maximum or large size as shown in FIG. 3B.

In one embodiment, at least a portion of the flexible display 320 may be mounted on a surface of the housing 310, and at least a portion of the flexible display 320 may be accommodated in the housing space 313. For example, one area of the flexible display 320 may be at least partially mounted on a surface of the second housing 312 and the other area may be accommodated in the third space 3133 of the first housing 311. In one embodiment, a partial area of the flexible display 320 may be withdrawn from the housing space 313 onto the surface of housing 310 through the outlet 314 based on the movement of the first housing 311 relative to the second housing 312 or inserted from the surface of the housing 310 into the housing space 313 through the outlet 314. In other words, the size to which the display area of the flexible display 320 is visually exposed to the surface of the housing 310 may be changed in response to the partial area moving between the housing space 313 and the surface through the outlet 314 based on an operation of the housing 310.

In one embodiment, based on the first form, when facing the rear surface (e.g., a surface facing −Z-axial direction) of the housing 310, the second space 3132 and the inserted portion 322 may not overlap each other. In one embodiment, when facing the rear surface (e.g., a surface facing −Z-axial direction) of the housing 310 in the first form, the second space 3132 and the flexible display 320 in the inserted state may not overlap each other. Unlike the first space 3131, since the second space 3132 may not overlap the flexible display 320 in the inserted state, a length H32 of the second space 3132 in a height direction (e.g., Z-axial direction) may be greater than a length H31 of the first space 3131 in a height direction (e.g., Z-axial direction). In one embodiment, the first space 3131 may be formed to have a larger volume when compared to the second space 3132. For example, the first space 3131 may have a larger plane (e.g., XY plane) directional area when compared to the second space 3132. For example, when compared to the first space 3131, the second space 3132 may have a narrower area in the planar direction. Instead, the second space 3121 may secure a relatively high space in the height direction (e.g., Z-axial direction).

In one embodiment, the board module 330 may be disposed in the housing space 313 formed inside the housing 310. For example, the board module 330 may be disposed in the second space 3132. A seating portion (not shown) may be formed in the second space 3132 to mount the board module 330 on the housing 310. In one embodiment, the board module 330 may prevent or reduce damage due to foreign substances flowing into the outlet 314 and the opening portion 315. For example, the foreign substance flowing into the outlet 314 and the opening portion 315 may be moisture, and the board module 330 may have a waterproof function.

In one embodiment, the battery 340 may supply power to the electronic device 301. In one embodiment, the battery 340 may be disposed in the housing space 313, for example, the first space 3131.

In one embodiment, the battery 340 may be disposed in the first space 3131 and the board module 330 may be disposed in the second space 3132. For example, the board module 330 may be disposed in the second space 3132 that occupies a smaller space in the planar direction. In this example, an area occupied by the battery in the first space 3131 may be expanded, so that a battery having a sufficient capacity may be disposed in the electronic device 301.

Figure 4:
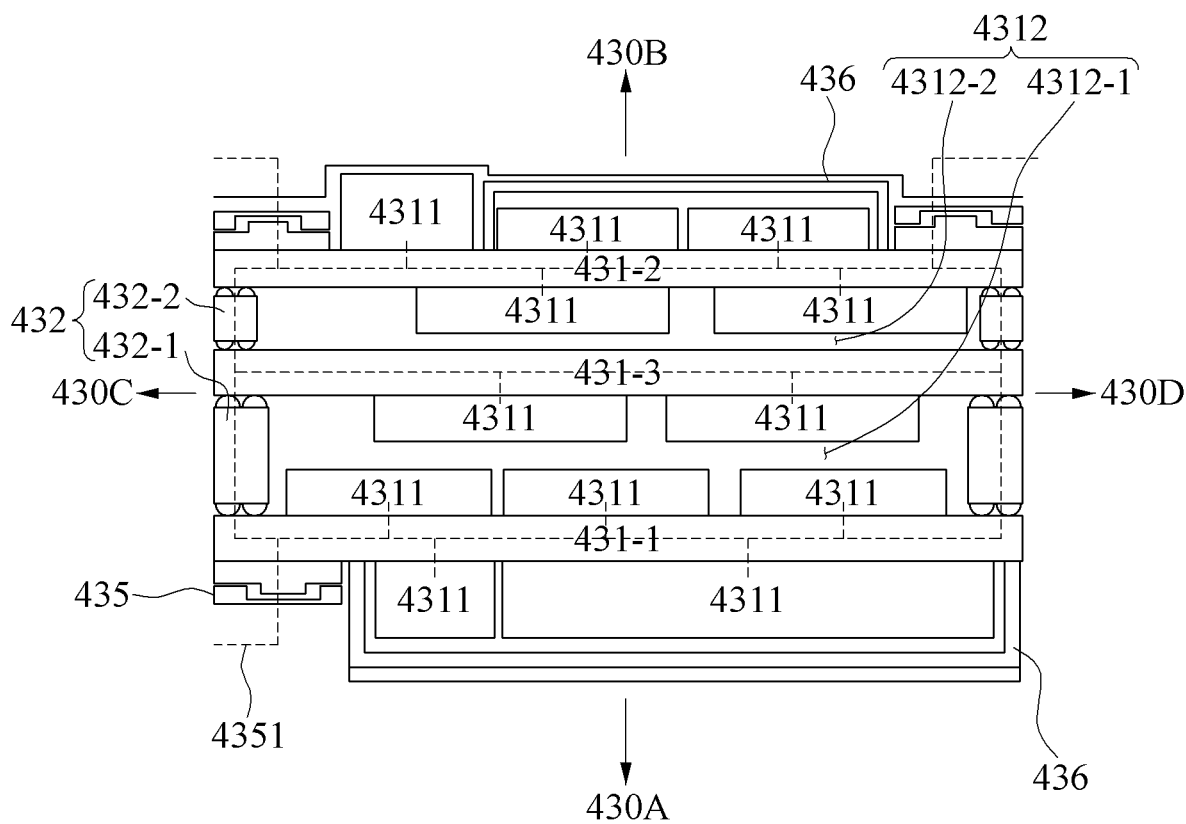
FIG. 4 is a cross-sectional view illustrating a board module taken along line II-II' of FIG. 2E according to an example embodiment.

FIG. 4 is a cross-sectional view illustrating a board module taken along line II-II' of FIG. 2E according to one embodiment.

Referring to FIG. 4, a board module 430 (e.g., the first PCB 251 of FIG. 2E) according to one embodiment may include a circuit board 431, an interposer 432, a connecting port 435, and a shield can 436.

In one embodiment, one or more electrical elements 4311 may be mounted on each of a plurality of circuit boards 431. For example, electrical element(s) 4311 may include one or more of circuit(s), circuitry, conductor(s), processor(s), at least one of an application processor (AP) (e.g., the processor 120 of FIG. 1), a power management integrated circuit (PMIC) (e.g., the power management module 188 of FIG. 1), and/or a radio frequency integrated circuit (RFIC) (e.g., the communication module 190 of FIG. 1). A plurality of circuit boards may be disposed to be spaced apart from one another substantially in the vertical direction (e.g., Z direction) in a parallel state. For example, as illustrated, a first circuit board 431-1, a third circuit board 431-3, and a second circuit board 431-2 may be arranged in sequence to be spaced apart from one another in the vertical direction. In one embodiment, a board space 4312 may be formed between, directly or indirectly, the plurality of circuit boards 431. For example, a first circuit board space 4312-1 may be formed between the first circuit board 431-1 and the third circuit board 431-3, and a second board space 4312-2 may be formed between the second circuit board 431-2 and the third circuit board 431-3.

In one embodiment, the interposer 432 may connect, directly or indirectly, the plurality of circuit boards 431 to encompass the board space 4312. In one embodiment, the interposer 432 may connect two circuit boards 431 adjacent, directly or indirectly, to each other along a circumferential boundary of the circuit board 431 in parallel. In one embodiment, when the board module 430 includes three or more circuit boards 431, the board module 430 may include a plurality of interposers 432 connecting the circuit boards 431 adjacent to each other. For example, the interposer 432 may include a first interposer 432-1 connecting the first circuit board 431-1 and the third circuit board 431-3, and a second interposer 432-2 connecting the third circuit board 431-3 and the second circuit board 431-2. In one embodiment, the interposer 432 may include a via to electrically connect the circuit boards 431 adjacent to each other.

In one embodiment, the connecting port 435 may electrically connect, directly or indirectly, the board module 430 and an electronic component (not shown) other than the board module 430. The electrical element 4311 mounted on the circuit board 431, the circuit board 431, the interposer 432, and an electronic component other than the board module 430 may be electrically connected, directly or indirectly, to one another through a virtual connection line 4351 passing the connecting port 435. For example, the electronic component other than the board module 430 may include at least one of a processor (e.g., the processor 120 of FIG. 1), a memory (e.g., the memory 130 of FIG. 1), an input module (e.g., the input module 150 of FIG. 1), a sound output module (e.g., the sound output module 155 of FIG. 1), a display module (e.g., the display module 160 of FIG. 1), an audio module (e.g., the audio module 170 of FIG. 1), a sensor module (e.g., the sensor module 176 of FIG. 1), an interface (e.g., the interface 177 of FIG. 1), a connecting terminal (e.g., the connecting terminal 178 of FIG. 1), a haptic module (e.g., the haptic module 179 of FIG. 1), a camera module (e.g., the camera module 180 of FIG. 1), a power management module (e.g., the power management module 188 of FIG. 1), a battery (e.g., the battery 189 of FIG. 1), a communication module (e.g., the communication module 190 of FIG. 1), a subscriber identification module (e.g., the subscriber identification module 196 of FIG. 1), or an antenna module (e.g., the antenna module 197 of FIG. 1).

In one embodiment, the shield can 436 may be disposed to surround at least one of the electrical elements 4311 exposed to an outside of the board module 430, for example, the electrical elements 4311 that is not disposed in the board space 4312, so as to protect the electrical element 4311 from an external shock. In this case, the electrical element 4311 encompassed by the shield can 436 may be a component that generates a large amount of heat and is sensitive to impact, for example, a component such as an AP or a communication device.

In one embodiment, a bottom surface 430A (e.g., a surface facing +Z-axial direction) of the board module 430 and a top surface 430B (e.g., a surface facing −Z-axial direction) may be water-repellent coated. The electrical elements 4311 disposed on the bottom surface 430A and the top surface 430B of the board module 430 may be covered by a water-repellent coating agent and prevented, or reduced, from contacting moisture. In one embodiment, side surfaces 430C and 430D (e.g., a surface facing X-axial direction) of the board module 430 may be surrounded by the below-described heat dissipator (e.g., a heat dissipator 533 of FIG. 5B) and prevent or reduce moisture from flowing into the board space 4312. For example, the electrical element 4311 disposed on the surface of the board module 430 may achieve waterproofness through the water-repellent coating, and the electrical element 4311 disposed in the board space 4312 may achieve waterproofness by the below-described heat dissipator.

Figure 5A:
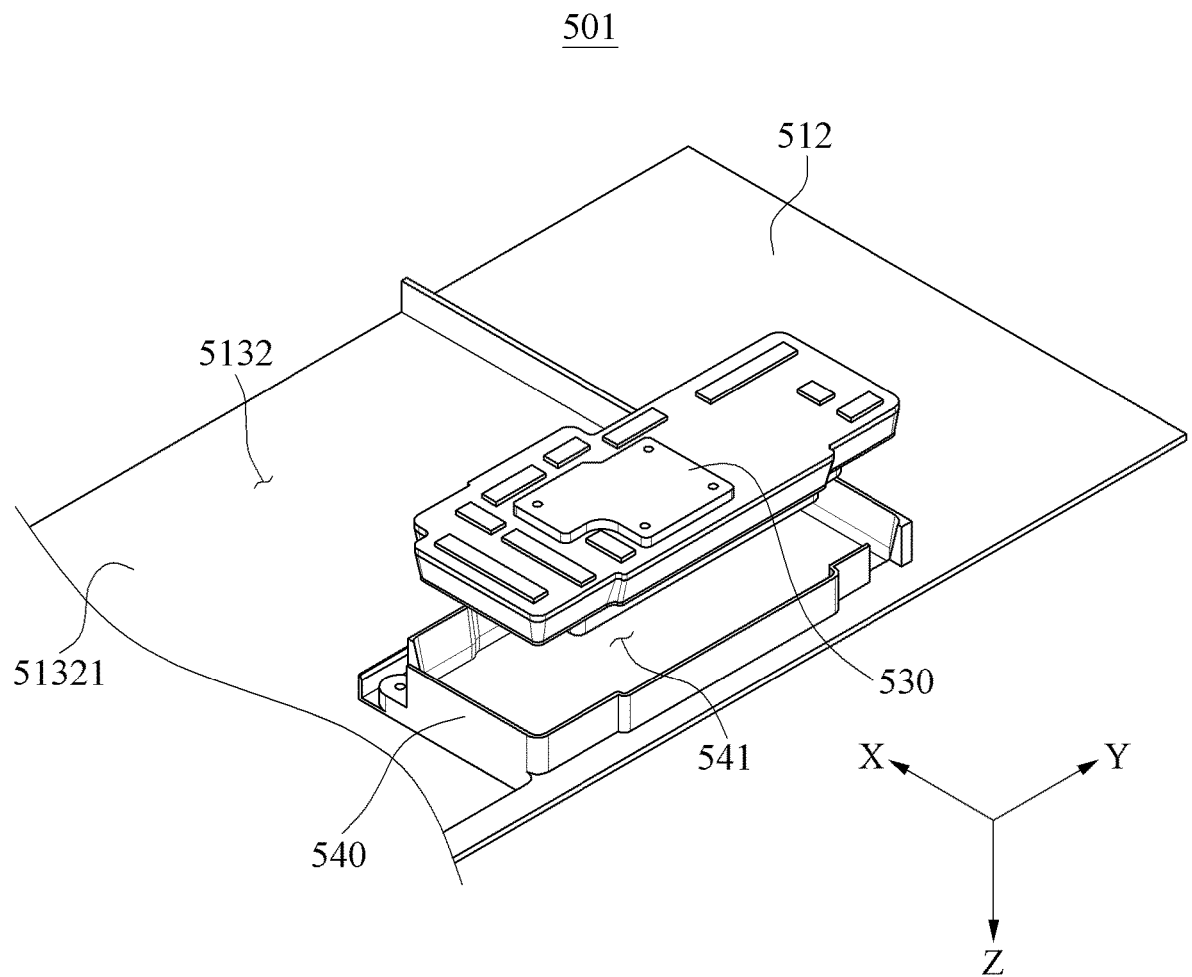
FIG. 5A is a perspective view illustrating an electronic device according to an example embodiment.
Figure 5B:
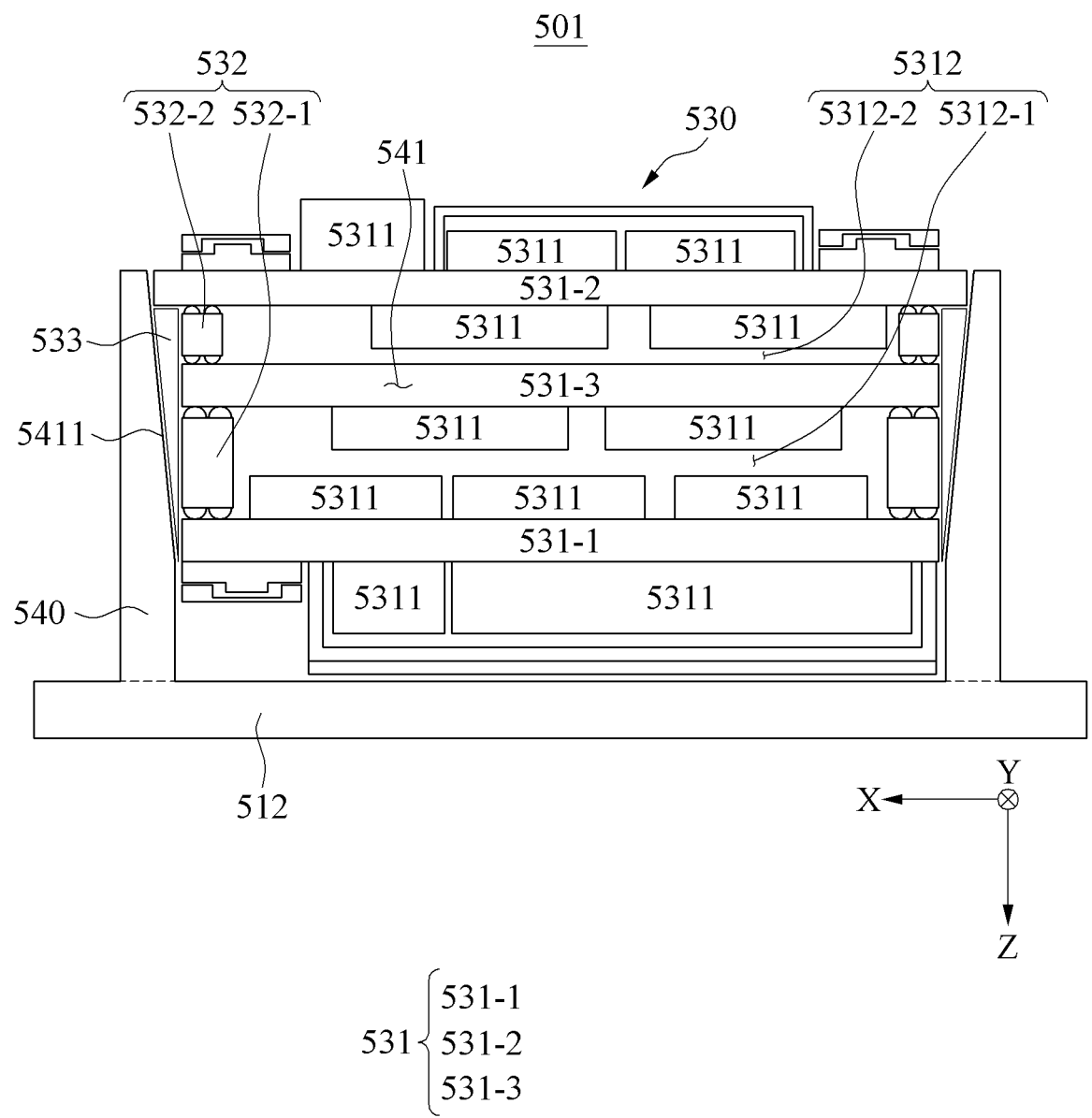
FIG. 5B is a cross-sectional view illustrating an electronic device taken along the line II-II' of FIG. 2E according to an example embodiment.

FIG. 5A is a perspective view illustrating an electronic device according to one embodiment and FIG. 5B is a cross-sectional view illustrating an electronic device taken along the line II-II' of FIG. 2E according to one embodiment.

Referring to FIGS. 5A and 5B, an electronic device 501 (e.g., the electronic device 101 of FIG. 1, the electronic device 201 of FIG. 2A, or the electronic device 301 of FIG. 3A) according to one embodiment may include a housing (e.g., the housing 310 of FIG. 3A), a seating portion 540 formed inside the housing, and a board module 530 (e.g., the first PCB of FIG. 2E or the board module 330 of FIG. 3A) seated in the seating portion.

In one embodiment, the seating portion 540 may be formed in a second space 5132. In one embodiment, the seating portion 540 may support the board module 530, thereby fixing the board module 530 in the second space 5132. In one embodiment, the board module 530 may be mounted on the seating portion 540. For example, the seating portion 540 may be formed to protrude from a lower surface 51321 of the second space (i.e., in −Z-axial direction of FIG. 5A) and have a seating space 541 for seating the board module 530 therein. In one embodiment, the board module 530 may be seated in a way of being inserted into the seating space 541 in a seating direction (e.g., +Z-axial direction). In this case, the seating portion 540 may be formed to cover a side surface of the board module 530 seated in the seating space 541. Hereinafter, for convenience of descriptions, a direction in which the board module 530 is inserted into the seating space 541 may be referred to as a "seating direction" (e.g., +Z-axial direction).

In one embodiment, the seating portion 540 may include at least one contact portion 5411 formed on an inner circumferential surface of the seating space 541 and contacting the side surface of the board module 530. In one embodiment, the seating space 541 may be formed in a shape substantially corresponding to the board module 530 so as to be easily mounted on the board module 530. More details on this will be provided later.

In one embodiment, each of a plurality of circuit boards 531 may include one or more electrical elements 5311 mounted on a surface thereof. In one embodiment, the plurality of circuit boards 531 may include a first circuit board 531-1, a second circuit board 531-2 disposed to be substantially parallel to the first circuit board 531-1, and a third circuit board 531-3 disposed between the first circuit board 531-1 and the second circuit board 531-2 to be substantially parallel to the first circuit board 531-1. In this case, a first board space 5312-1 may be formed between the first circuit board 531-1 and the third circuit board 531-3, and a second circuit board space 5312-2 may be formed between the third circuit board 531-3 and the second circuit board 531-2. In one embodiment, at least one interposer 532 may connect, directly or indirectly, the circuit boards 531 adjacent to each other. For example, the at least one interposer 532 may include a first interposer 532-1 disposed between, directly or indirectly, the first circuit board 531-1 and the third circuit board 531-3 and surround the first circuit board space 5312-1, and a second interposer 532-2 disposed between, directly or indirectly, the third circuit board 531-3 and the second circuit board 531-2 and surround the second board space 5312-2.

In one embodiment, a heat dissipator 533 may be disposed on an outer surface of the interposer 532. In this case, the heat dissipator 533 may be disposed on the outer surface of the interposer 532 to cover a circumference of the board space 5312 formed between, directly or indirectly, the plurality of circuit boards 531, so as to seal the circumference of the board space 5312. In one embodiment, the heat dissipator 533 may prevent or reduce foreign substances outside the board module 530 from flowing into the board space 5312. The foreign substances may include, for example, moisture. The heat dissipator 533 may perform a waterproof function to prevent or reduce the moisture from flowing into the board space 5312.

In one embodiment, the heat dissipator 533 may seal the board space 5312, and simultaneously, emit heat generated in the board space 5312, for example, heat generated from the electrical element 5311 located in the board space 5312 to an outside of the board module 530. For example, based on a state in which the board module 530 is seated in the seating space 541 of the seating portion 540, at least a portion of a surface of the heat dissipator 533 may contact the seating portion 540, so that the heat generated in the board module 530, for example, the heat generated in the board space 5312 is transferred to the seating portion 540. In this example, the heat of the board module 530 transferred to the seating portion 540 may be spread onto a second housing and dissipated. In one embodiment, the heat dissipator 533 may be in surface contact with the contact portion 5411 formed in the seating space 541. In this case, a contacting area between the heat dissipator 533 and the seating portion 540 may increase, so that the heat transfer is effectively performed.

In one embodiment, the heat dissipator 533 may be formed of a material that has high thermal conductivity while ensuring sufficient waterproof performance. For example, the heat dissipator 533 may be formed of a material including a base, a filler, and a curing agent. In one embodiment, the base may include a silicone component, for example, a silicone polymer component. According to a composition ratio of the base, the heat dissipator 533 may have a predetermined viscosity. Through the base, the heat dissipator 533 may secure the sufficient waterproof function. In one embodiment, the filler may function so that the heat dissipator 533 has sufficient heat dissipation performance. The filler may include a material having the high thermal conductivity, for example, a ceramic component. In one embodiment, the filler may include a plurality of filler particles having different diameters. For example, the filler may include a plurality of filler particles having diameters of approximately 100 micrometers ($\mu m$), 50 $\mu m$, and/or 10 $\mu m$. In this example, as the content of the filler particles having a large diameter increases, the viscosity of the heat dissipator 533 may increase. In one embodiment, the filler particles may be, for example, alumina powder. In one embodiment, by the curing agent, the heat dissipator 533 may be cured from a liquid state to a solid state. For example, the curing agent may be a thermal curing agent or an ultraviolet ray (UV) curing agent. The thermal curing agent may be used to cure a portion that is difficult to irradiate with UV rays. The UV curing agent has a short curing time, so it may be used when fast curing is required.

In one embodiment, to control the components of the heat dissipator 533, the heat dissipation performance, the waterproof performance, the viscosity, and an elasticity after curing may be adjusted. For example, the higher the component ratio of the filler, the higher the heat dissipation performance. For example, to the extent that the heat dissipator 533 is able to perform a waterproof function, the component ratio of the base may be minimized or made small. The aforementioned components of the heat dissipator 533 are merely an example, and components of the heat dissipator 533 are not limited thereto. For example, the heat dissipator 533 may further include a volatile material. For example, the volatile material may include a solvent component.

Figure 6A:
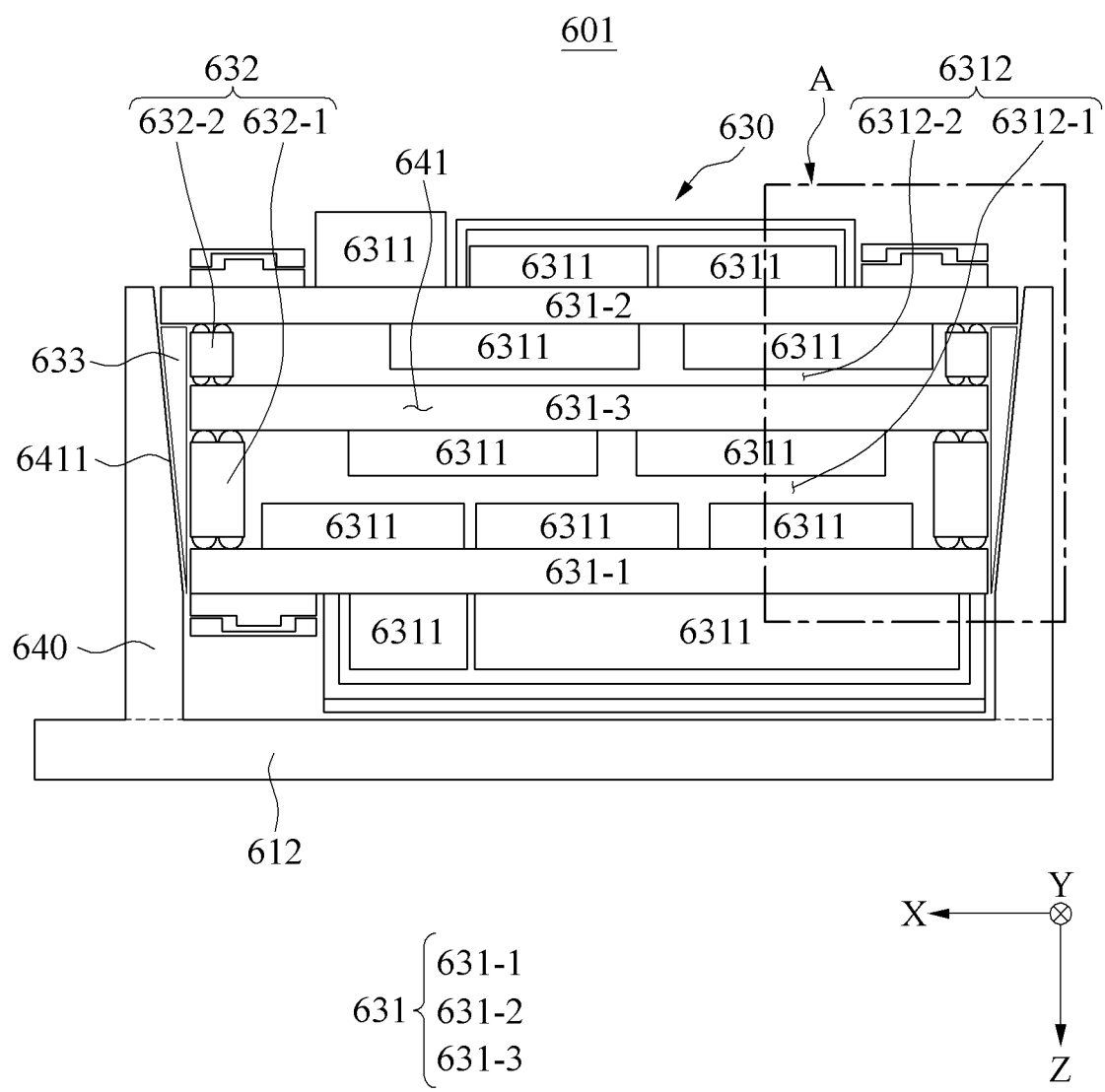
FIG. 6A is a cross-sectional view illustrating an electronic device taken along the line II-II' of FIG. 2E according to an example embodiment.
Figure 6B:
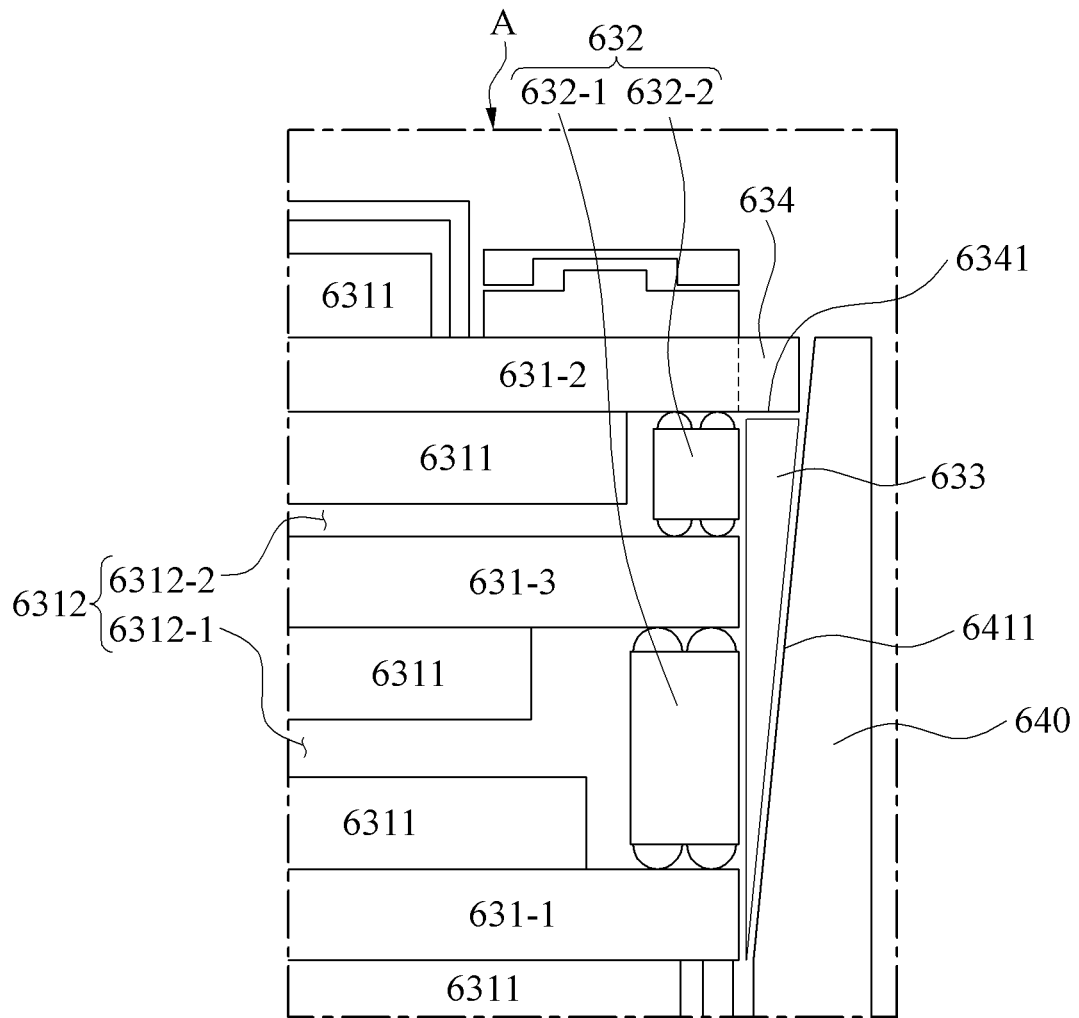
FIG. 6B is an enlarged view illustrating a portion A of FIG. 6A according to an example embodiment.
Figure 6C:
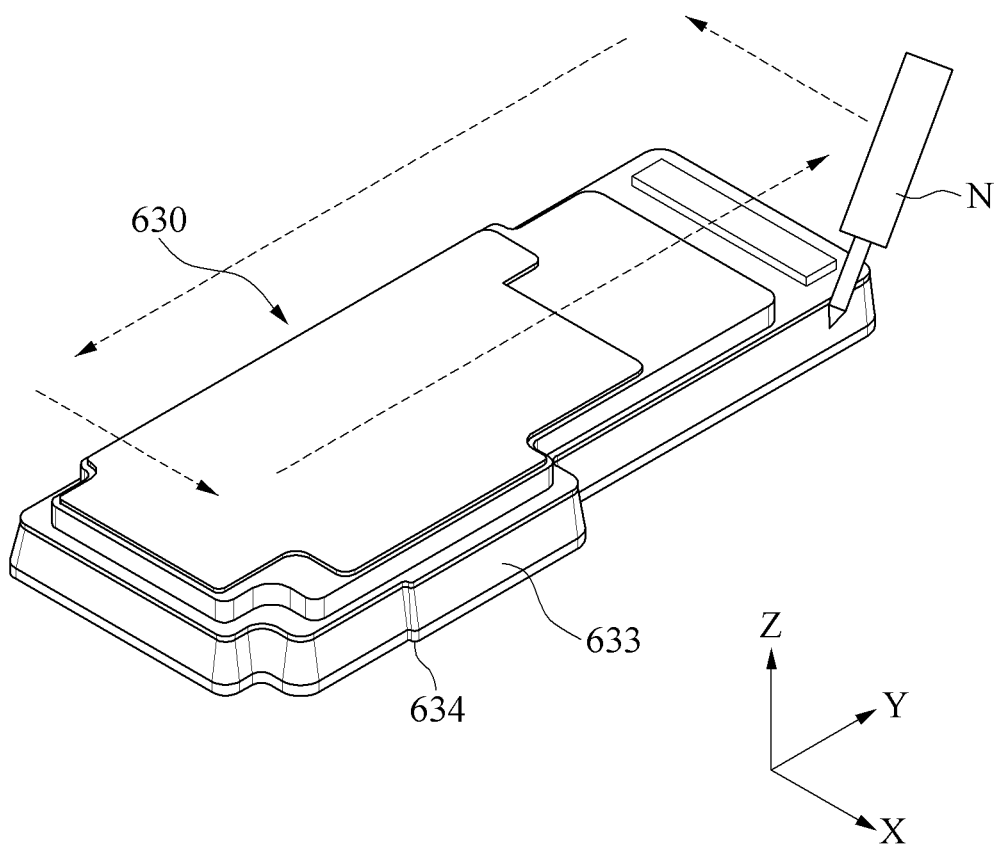
FIG. 6C is a diagram illustrating a process of placing a heat dissipation member according to an example embodiment.
Figure 6D:
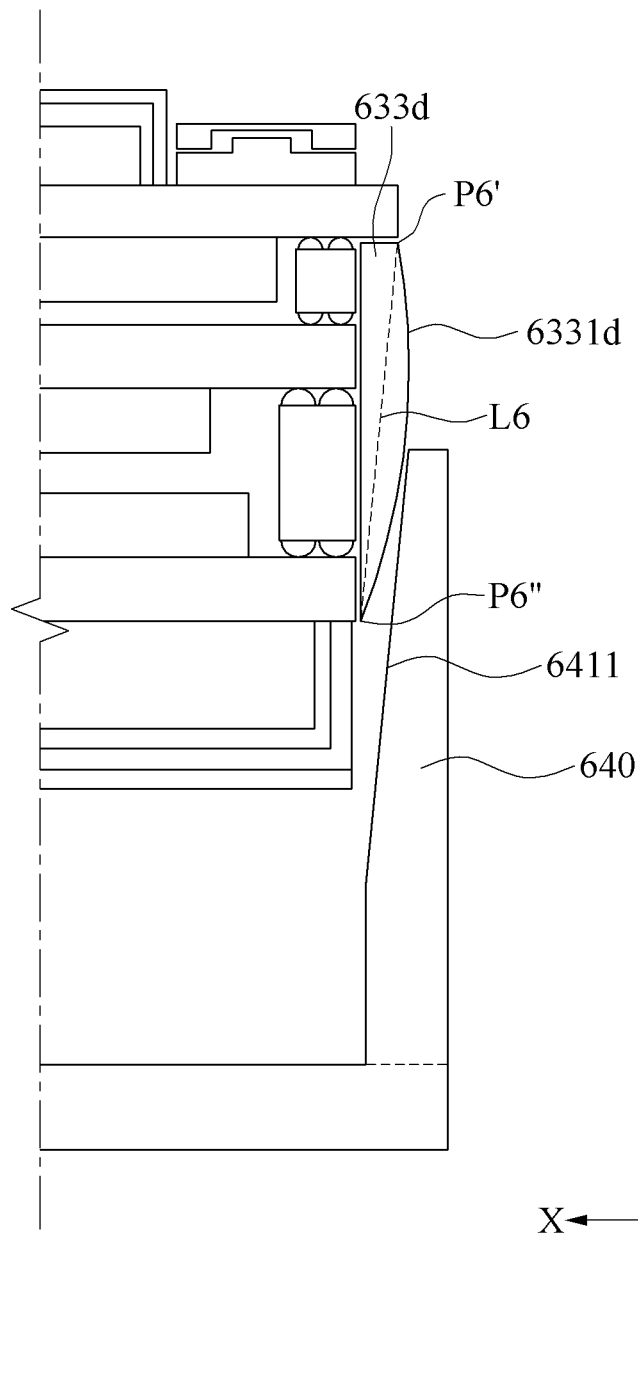
FIGS. 6D and 6E are cross-sectional views illustrating an electronic device taken along the line II-II' of FIG. 2E according to an example embodiment.
Figure 6E:
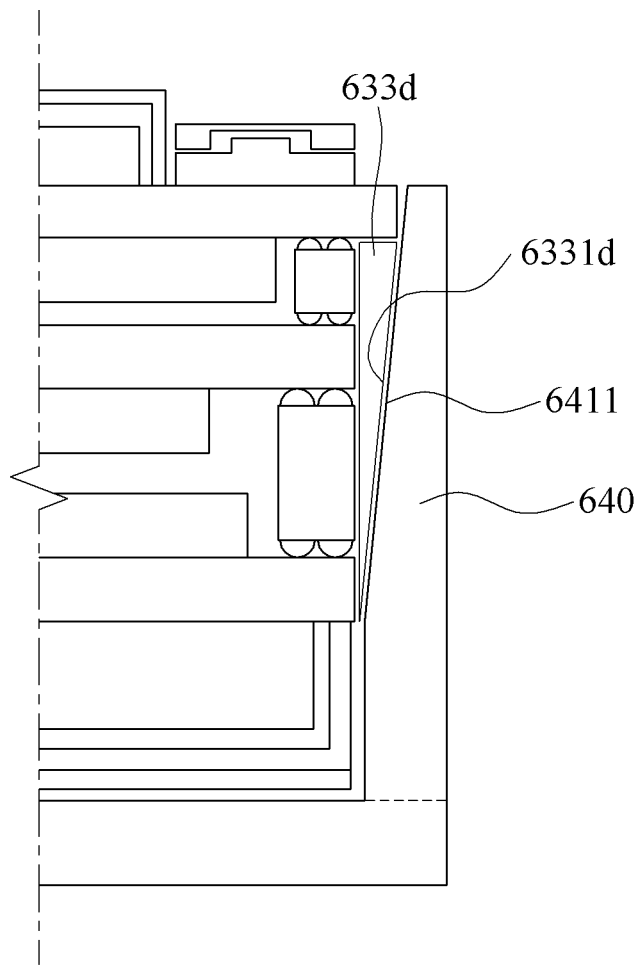
Figure 6F:
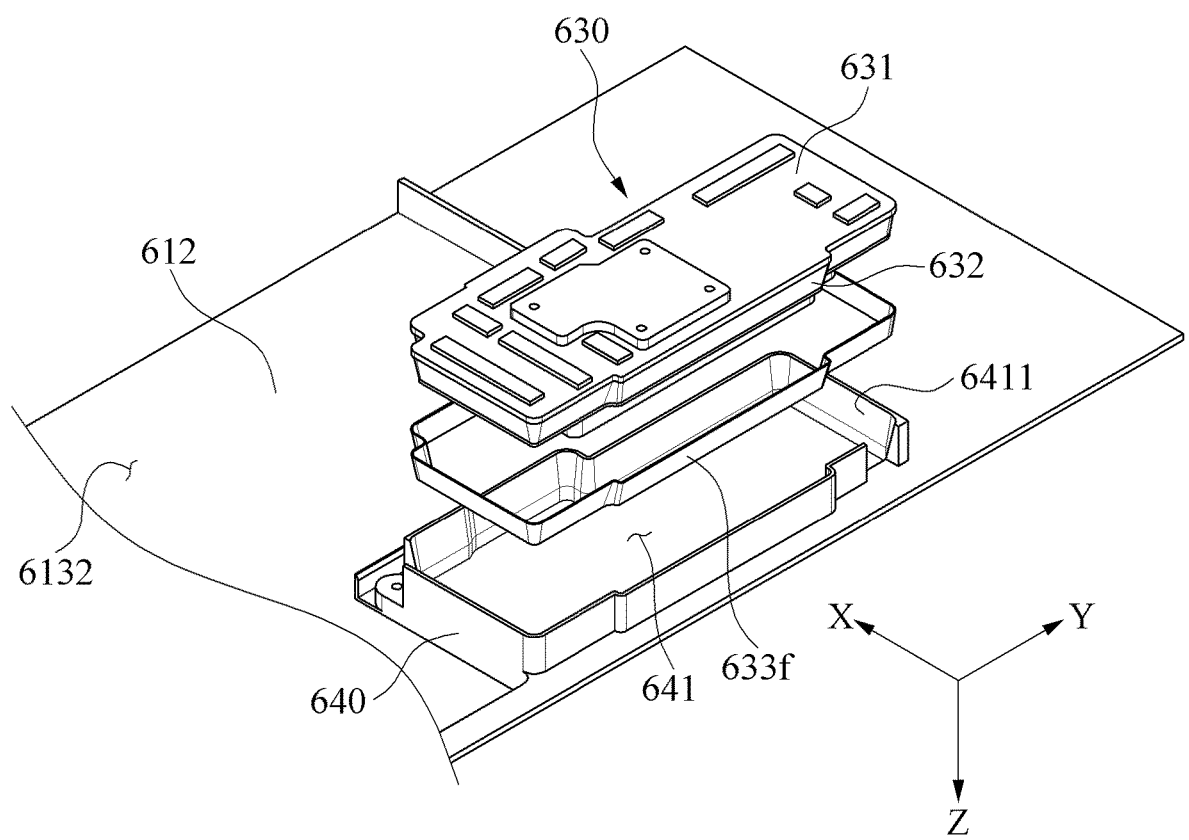
FIG. 6F is a perspective view illustrating an electronic device according to an example embodiment.
Figure 6G:
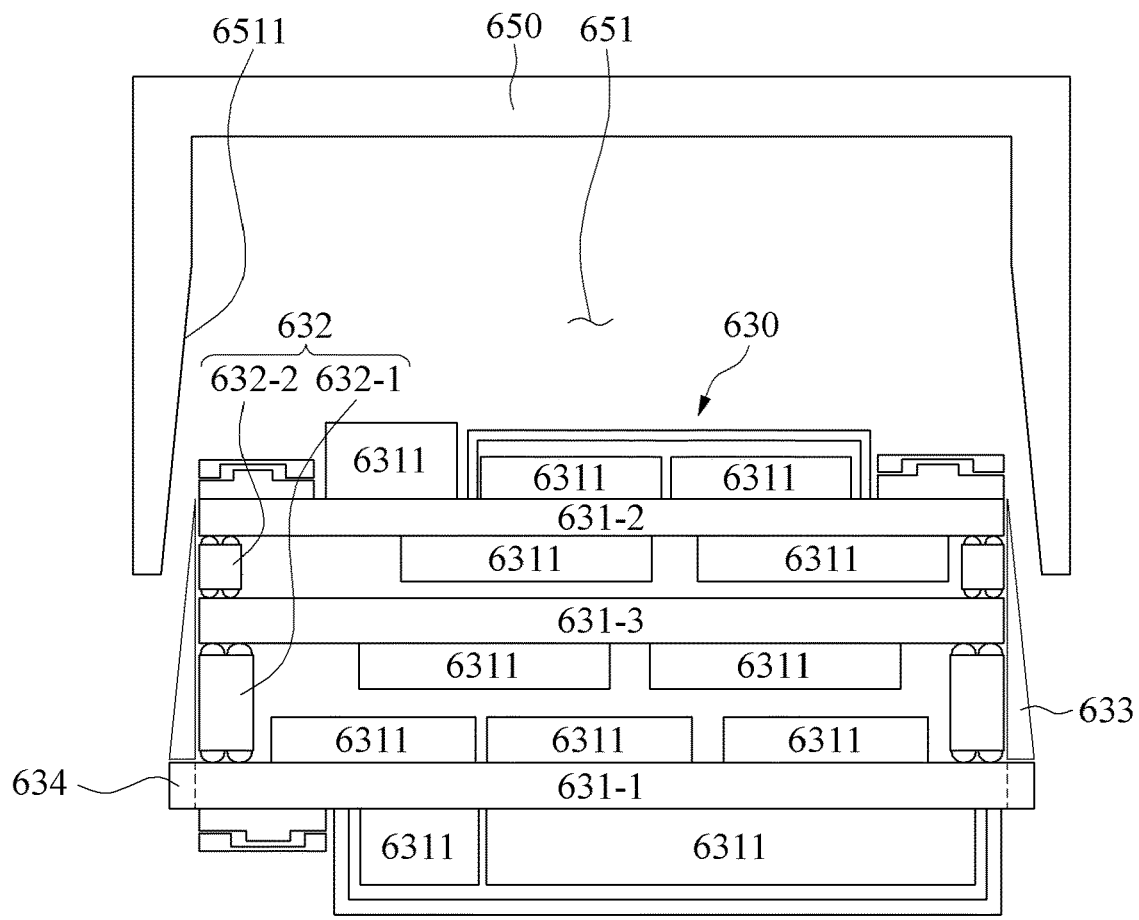
FIGS. 6G and 6H are cross-sectional views illustrating an electronic device taken along the line II-II' of FIG. 2E according to an example embodiment.
Figure 6H:
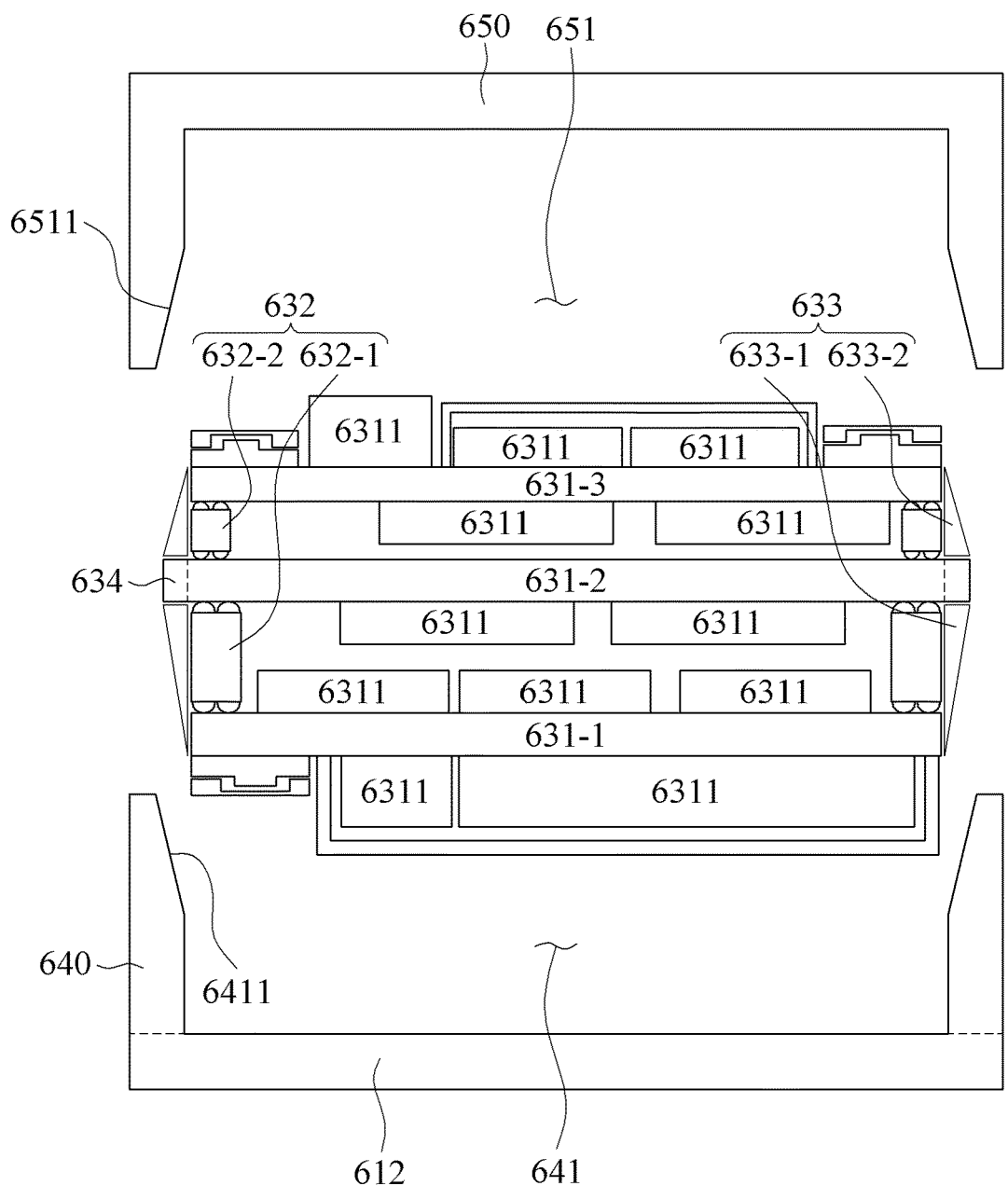

FIG. 6A is a cross-sectional view illustrating an electronic device taken along the line II-II' of FIG. 2E according to one embodiment, FIG. 6B is an enlarged view illustrating a portion A of FIG. 6A according to one embodiment, FIG. 6C is a diagram illustrating a process of placing a heat dissipator according to one embodiment, FIGS. 6D and 6E are cross-sectional views illustrating an electronic device taken along the line II-II' of FIG. 2E according to one embodiment, FIG. 6F is a perspective view illustrating an electronic device according to one embodiment, and FIGS. 6G and 6H are cross-sectional views illustrating an electronic device taken along the line II-II' of FIG. 2E according to one embodiment.

Referring to FIGS. 6A through 6E, an electronic device 601 (e.g., the electronic device 101 of FIG. 1, the electronic device 201 of FIG. 2A, or the electronic device 301 of FIG. 3A) according to one embodiment may include a housing (e.g., the housing 310 of FIG. 3A), a seating portion 640, and a board module 630 (e.g., the first PCB 251 of FIG. 2, the board module 330 of FIG. 3A).

In one embodiment, the seating portion 640 may fix the board module 630 in a housing space (e.g., the housing space 313 of FIG. 3A). For example, the seating portion 640 may have a seating space 641 formed in a second space (e.g., the second space 6132 of FIG. 6F) of a second housing 612, so that the board module 630 is seated therein. The seating portion 640 may include at least one contact portion 6411 formed on an inner circumferential surface of the seating space 641 and contacting a side surface of the board module 630.

In one embodiment, the board module 630 may include a plurality of circuit boards 631, at least one interposer 632, a heat dissipator 633, and a support portion 634. In one embodiment, one or more electrical elements 6311 may be mounted on a surface of each of the plurality of circuit boards, for example, a first circuit board 631-1, a second circuit board 631-2, and a third circuit board 631-3. In one embodiment, board spaces 6312-1 and 6312-2 may be formed between the plurality of circuit boards 631-1, 631-2, and 631-3. In one embodiment, one or more interposers, for example, a first interposer 632-1 and a second interposer 632-2 may connect the plurality of circuit boards 631-1, 631-2, and 631-3. In one embodiment, the heat dissipator 633 may be disposed on an outer surface of the interposer 632.

In one embodiment, based on a cross-section parallel to a seating direction (e.g., +Z direction), at least one of the plurality of circuit boards 631 may include the support portion 634 having an edge protruding to an outer side of the interposer 632. For example, as illustrated in FIG. 6B, the second circuit board 631-2 may include the support portion 634 having an edge of which at least a portion protrudes to the outer side of the interposer 632. In one embodiment, the heat dissipator 633 may be connected, directly or indirectly, to the interposer 632 in a state of being supported by a support plane 6341 formed on the support portion 634. In this case, the heat dissipator 633 may be connected to surround the outer surface of the interposer 632 more stably by being supported by the support plane 6341. In one embodiment, in a state in which the board module 630 is seated in the seating portion 640, the conductive heat dissipator 633 may be surrounded by the support plane 6341, the outer surface of the interposer 632, and the contact portion 6411.

FIG. 6A illustrates that the support portion 634 is formed on the circuit board 631 disposed on an uppermost end, but this is only for convenience of description, and a position of the circuit board 631 on which the support portion 634 is formed is not limited thereto. For example, the support portion 634 may be formed at an edge of the first circuit board 631-1 as shown in FIG. 6G.

In one embodiment, the heat dissipator 633 may be connected to the outer surface of the interposer 632 in various ways. For example, the heat dissipator 633 may be provided in a liquid state having fluidity. In addition, as shown in FIG. 6C, the heat dissipator 633 may be disposed to cover the outer surface of the interposer 632 in a way that it is applied to the outer surface of the interposer 632 through a nozzle N and then cured. As such, when the heat dissipator 633 is disposed on the outer surface of the interposer 632, in a state in which the support plane 6341 of the support portion 634 of the board module 630 is placed to face a direction (e.g., +Z direction) opposite to gravity, the heat dissipator 633 in a liquid state may be applied to the outer surface of the interposer 632 in a way that it is supported through the support plane 6341. In this case, a phenomenon that the heat dissipator 633 in the liquid state flows down due to the gravity and deviates from a set application position may be minimized or reduced.

A manufacturing method in which the heat dissipator 633 in the liquid state is applied to the outer surface of the interposer 632 and then solidified through curing has been described with reference to FIG. 6C, but it is merely an example. A method of placing the heat dissipator 633 on the outer surface of the interposer 632 is not limited to the example of FIG. 6C. For example, the heat dissipator 633 may be connected in a way that it is attached to the outer surface of the interposer 632 after being manufactured in the form of a fixed sheet. In this example, the support portion 634 may stably maintain a position of the heat dissipator 633 on the outer surface of the interposer 632 by supporting the heat dissipator 633.

Referring to FIGS. 6D and 6E, a conductive heat dissipator 633*d* may be shaped to be in close contact with the seating portion 640. For example, in a state of being seated in the seating portion 640, the heat dissipator 633*d* may be shaped to be in close contact with the contact portion 6411.

In one embodiment, the heat dissipator 633*d* may be formed of a compressible material. In addition, an outer surface of the heat dissipator 633*d* may be formed to have a convex cross-sectional shape in an outward direction (e.g., −X-axial direction). For example, based on a cross-section parallel to the seating direction (e.g., +Z direction), with respect to a virtual line L6 connecting both end portions P6' and P6" of an outer surface 6331*d* of the heat dissipator 633*d*, the outer surface 6331*d* of the heat dissipator 633*d* may be convex in an outer direction of the heat dissipator 633*d*. In this case, the contact portion 6411 may be formed to have a cross-sectional shape substantially corresponding to the virtual line L6. In the above-described structure, in a process of seating the board module 630 in the seating space as illustrated in FIG. 6E, the outer surface of the heat dissipator 633*d* may be compressed to correspond to the shape of the contact portion 6411 so that the heat dissipator 633*d* is deformed to have the cross-sectional shape corresponding to the virtual line L6. As such, in the state in which the board module 630 is seated in the seating space 641, the outer surface 6331*d* of the heat dissipator 633*d* may be in close contact with the contact portion 6411, thereby increasing an area contacting the contact portion 6411 to perform an effective heat transfer.

Referring to FIG. 6F, the electronic device 601 according to one embodiment may include a housing (e.g., the second housing 612), the seating portion 640, the board module 630, and a heat dissipator 633*f*.

In one embodiment, the board module 630 may include the plurality of circuit boards 631 arranged substantially in parallel and the interposer 632 connecting the plurality of circuit boards 631. In one embodiment, the heat dissipator 633*f* may have a frame structure surrounding the outer surface of the interposer 632. In this case, the board module 630 may be detachably inserted into the heat dissipator 633*f* such that the outer surface of the interposer 632 is in contact with the inner surface of the heat dissipator 633*f*.

The heat dissipator 633*f* may be formed as a frame structure detachable from the outer surface of the interposer 632. For example, in one embodiment, the outer surface of the heat dissipator 633*f* may have a shape substantially corresponding to the shape of the contact portion 6411 of the seating portion 640. In the above-described structure, the board module 630 and the heat dissipator 633*f* may be sequentially seated in the seating space 641 in the seating direction (e.g., +Z-axial direction). In this case, while the board module 630 and the heat dissipator 633*f* are seated in the seating space 641, the outer surface of the interposer 632 may be at least partially in contact with the inner surface of the heat dissipator 633*f*, and at least a portion of the outer surface of the heat dissipator 633*f* may be in contact with the contact portion 6411. In one embodiment, a fluid material may be disposed between the interposer 632 and the heat dissipator 633*f*. In one embodiment, a fluid material may be disposed between, directly or indirectly, the heat dissipator 633*f* and the contact portion 6411. The fluid material may include, for example, thermal grease.

Referring to FIG. 6G, in one embodiment, the electronic device 601 may include a housing (e.g., the second housing 612), the seating portion 640, the board module 630, and a cover 650. Each "module" herein may comprise circuitry.

In one embodiment, the board module 630 may include the plurality of circuit boards 631 arranged substantially in parallel, the at least one interposer 632 connecting the plurality of circuit boards 631, and the heat dissipator 633 disposed on the outer surface of the interposer 632. For example, the plurality of circuit boards 631 may include the first circuit board 631-1 and the second circuit board 631-2 arranged in parallel to each other, and the third circuit board 631-3 disposed between the first circuit board 631-1 and the second circuit board 631-2 in parallel. In this example, the first circuit board 631-1 and the third circuit board 631-3 may be connected through the first interposer 632-1, and the second circuit board 631-2 and the third circuit board 631-3 may be connected through the second interposer 632-2. In one embodiment, the board module 630 may be seated in the seating portion 640 such that the first circuit board 631-1 faces a bottom surface of the seating portion 640.

In one embodiment, based on a cross-section parallel to the seating direction (e.g., +Z-axial direction), the first circuit board 631-1 may include the support portion 634 having an edge protruding to an outer side of the first interposer 632-1. In this case, the heat dissipator 633 may be disposed to cover the outer surface of the at least one interposer 632 in a state of being supported by the support portion 634.

In one embodiment, the second housing 612 may include a support member (not shown) that supports at least a portion of the board module 630. For example, in a state in which the board module 630 is supported by the support member, the support member may be formed to have a height corresponding to a part of the first circuit board 631-1 of the board module 630.

In one embodiment, the cover 650 may be connected to the seating portion 640 to cover the outer surface of the board module 630 seated in the seating portion 640. In this case, the cover 650 may be connected to the seating portion 640 to cover a remaining portion of the board module 630 not covered by the seating portion 640, for example, a portion in which the heat dissipator 633 is formed. In one embodiment, the cover 650 may form a cover space 651 that covers the board module 630. The cover 650 may include a cover portion 6511 formed on an inner circumferential surface of the cover space 651 and contacting the outer surface of the heat dissipator 633. In this case, to effectively contact the outer surface of the heat dissipator 633, the cover portion 6511 may be formed to have a shape substantially corresponding to the shape of the heat dissipator 633. For example, based on the cross-section parallel to the seating direction (e.g., +Z-axial direction), the heat dissipator 633 may have a cross-section shape in which a width decreases from the first circuit board 631-1 toward the second circuit board 631-2. In this example, the cover portion 6511 may be formed to have a cross-section shape corresponding to the cross-section shape of the heat dissipator 633. In one embodiment, in a state in which the cover 650 covers the board module 630, heat generated in the board module 630 may be sequentially dissipated through the cover 650 and the seating portion 640.

Referring to FIG. 6H, an electronic device according to one embodiment may include a housing (e.g., the second housing 612), the board module 630, the seating portion 640, and the cover 650.

In one embodiment, the board module 630 may include the plurality of circuit boards 631 arranged substantially in parallel and the at least one interposer 632 disposed between the plurality of circuit boards 631. For example, the board module 630 may include the first circuit board 631-1, the second circuit board 631-2, the third circuit board 631-3 disposed between the first circuit board 631-1 and the second circuit board 631-2, the first interposer 632-1 connecting the first circuit board 631-1 and the third circuit board 631-3, and the second interposer 632-2 connecting the second circuit board 631-2 and the third circuit board 631-3. In this case, the third circuit board 631-3 may include the support portion 634 having an edge protruding to an outside of the interposer 632.

In one embodiment, the heat dissipator 633 may include one or more heat dissipators 633 separated from each other based on the support portion 634 as a boundary. For example, the heat dissipator 633 may include a first heat dissipator 633-1 at least partially supported by the support portion 634 and connected to cover the outer surface of the first interposer 632-1, and a second heat dissipator 633-2 at least partially supported by the support portion 634 and connected to cover the outer surface of the second interposer 632-2. In this example, based on cross-sections parallel to the seating directions (e.g., +Z-axial direction and Z-axial direction), the first heat dissipator 633-1 and the second heat dissipator 633-2 may be formed to have cross-sections gradually narrowed as a distance from the support portion 634 increases.

In one embodiment, at least a portion of the board module 630 may be seated in the seating space 641 formed in the seating portion 640. For example, the board module 630 may be connected to the seating portion 640 such that the first heat dissipator 633-1 is located in the seating space 641. In this example, the cover 650 may be connected to the board module 630 to cover a remaining portion of the board module 630 located outside the seating space 641, for example, the second heat dissipator 633-2.

In one embodiment, when the board module 630 is seated in the seating portion 640, and when the cover 650 is connected to cover the board module 630, an end portion of the cover 650 may be in contact with an end portion of the seating portion 640. In one embodiment, the heat generated in the plurality of circuit boards 631 may be transferred to the seating portion 640 and the cover 650 through the interposer 632 and the heat dissipator 633. For example, the heat transferred to the first heat dissipator 633-1 may be directly transferred to the seating portion 640, and the heat transferred to the second heat dissipator 633-2 may be transferred to the seating portion 640 through the cover 650.

Figure 7A:
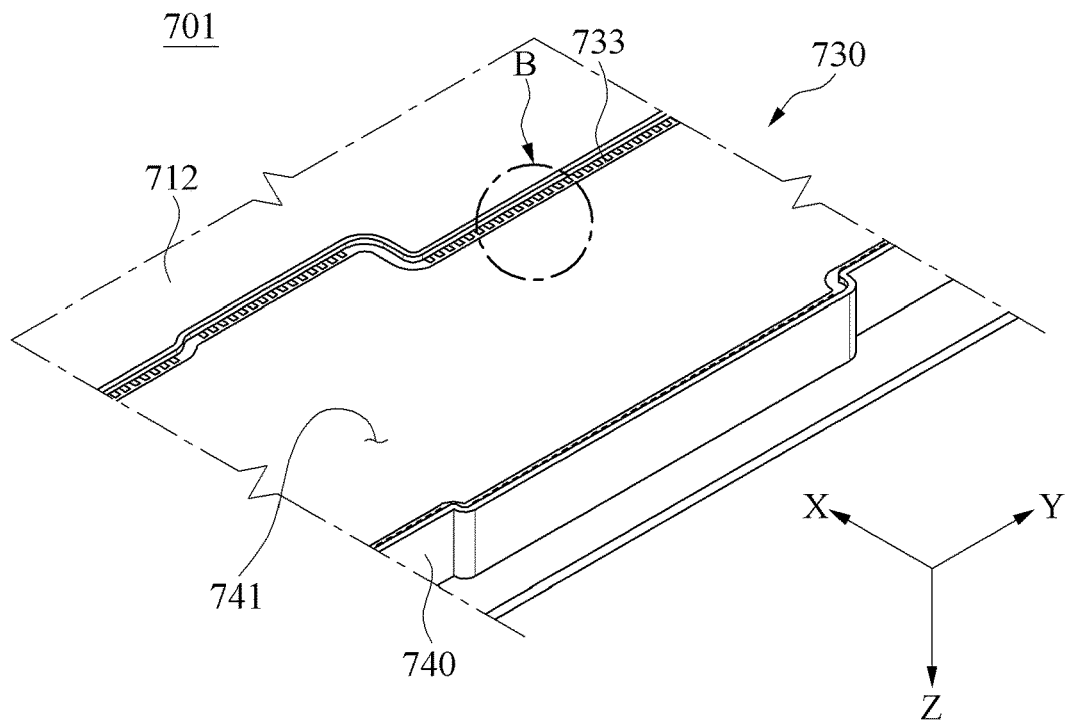
FIG. 7A is a perspective view illustrating an electronic device according to an example embodiment.
Figure 7B:
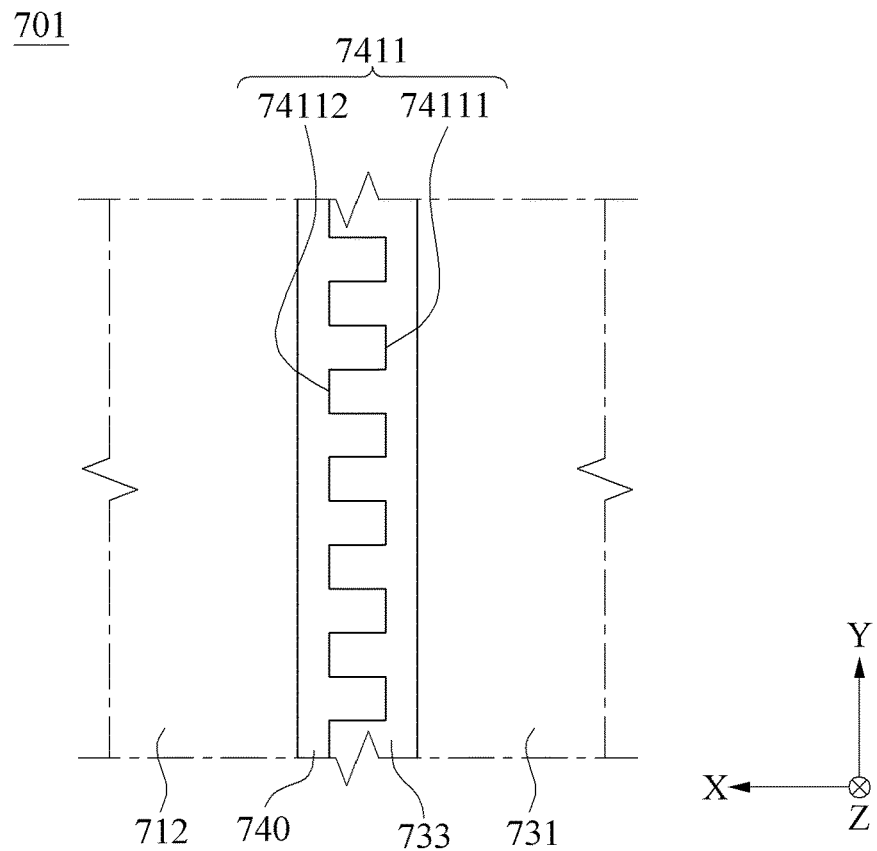
FIG. 7B is a cross-sectional view of a cross-section perpendicular to a seating direction of an electronic device with respect to a portion B of FIG. 7A according to an example embodiment.

FIG. 7A is a perspective view illustrating an electronic device according to one embodiment and FIG. 7B is a cross-sectional view of a cross-section perpendicular to a seating direction of an electronic device with respect to a portion B of FIG. 7A according to one embodiment.

Referring to FIGS. 7A and 7B, an electronic device 701 (e.g., the electronic device 101 of FIG. 1, the electronic device 201 of FIG. 2A, or the electronic device 301 of FIG. 3A) according to one embodiment may include a housing (e.g., a second housing 712 and the housing 310 of FIG. 3A), a seating portion 740, and a board module 730 (e.g., the first PCB 251 of FIG. 2 and the board module 330 of FIG. 3A).

In one embodiment, the board module 730 may be seated in a seating space 741 formed by the seating portion 740. In one embodiment, the seating portion 740 may include at least one contact portion 7411 formed on an inner circumferential surface of the seating space 741 and contacting a side surface of the board module 730 to receive heat.

In one embodiment, the board module 730 and the contact portion 7411 may be formed to have a shape for increasing a contacting area. For example, as shown in FIG. 7B, based on a cross-section perpendicular to the seating direction (e.g., +Z-axial direction), the contact portion 7411 may include a plurality of first contact portions 74111 and second contact portions 74112 formed in a circumferential direction of the board module 730. In one embodiment, the second contact portion 74112 may have an end portion formed to be relatively concave compared to the first contact portion 74111. In this case, in a state of facing the seating direction (e.g., +Z-axial direction), the first contact portion 74111 and the second contact portion 74112 may be repeatedly formed in the circumferential direction of the board module 730 to form an uneven shape. In one embodiment, based on a state in which the board module 730 is seated in the seating portion 740, a surface of a heat dissipator 733 may have a shape substantially corresponding to the contact portion 7411 such that the heat dissipator 733 engages with the first contact portion 74111 and the second contact portion 74112 of the seating portion 740. For example, based on the cross-section perpendicular to the seating direction (e.g., +Z-axial direction), the outer surface of the heat dissipator 733 facing the inner circumferential surface of the seating space 741 may be formed to have an uneven shape as shown in FIG. 7B.

In the above-described structure, in a state in which the board module 730 is seated in the seating portion 740, the board module 730 and the seating portion 740 may have a relatively large contact length. For example, a contact area between the heat dissipator 733 and the seating portion 740 may increase, so that the heat of the board module 730 is effectively transferred to the seating portion 740. The shapes of the heat dissipator 733 and the contact portion 7411 shown in the drawings are provided as an example for convenience of description, and the heat dissipator 733 and the seating portion 740 may be formed to have various shapes for increasing a mutual contact area, for example, a curved uneven shape or an uneven shape having various sizes.

FIGS. 7C through 7F illustrate temperature measurement data of an electronic device for explaining a heat dissipation performance of a heat dissipator according to one embodiment.

Figure 7C:
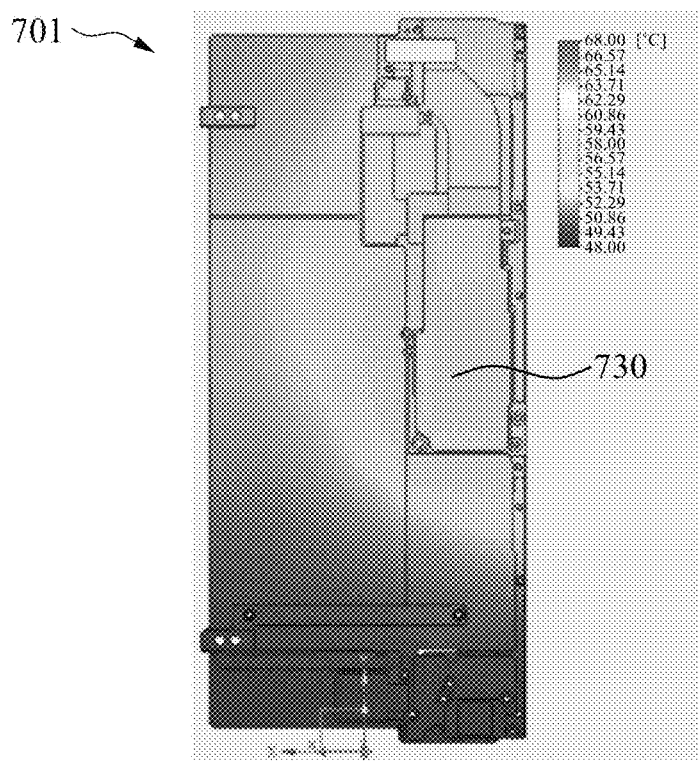
FIGS. 7C, 7D, 7E, and 7F illustrate temperature measurement data of an electronic device for explaining a heat dissipation performance of a heat dissipator according to an example embodiment(s)
Figure 7D:
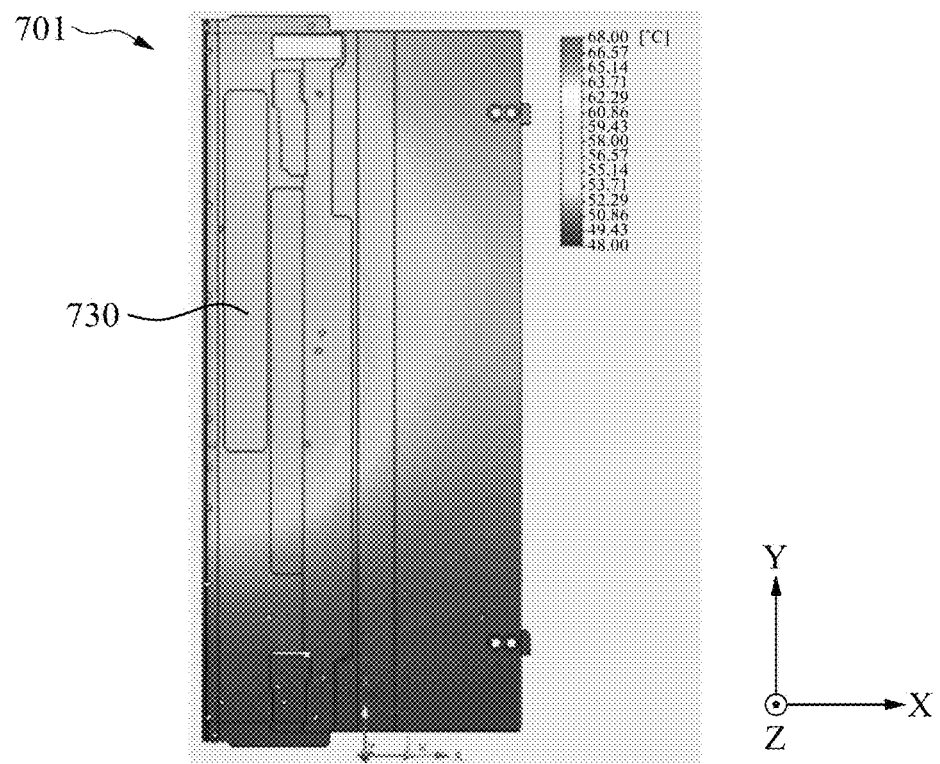
Figure 7E:
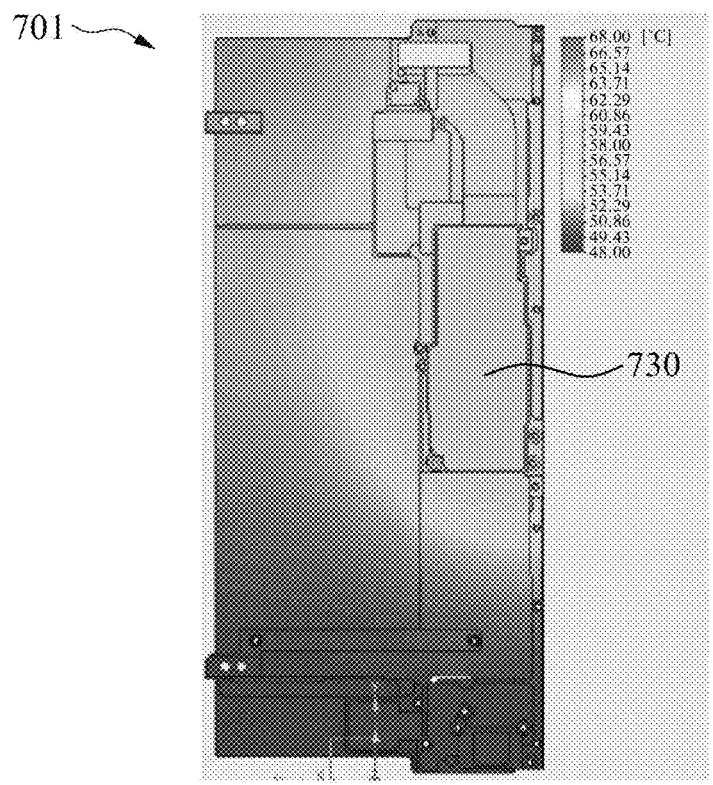
Figure 7F:
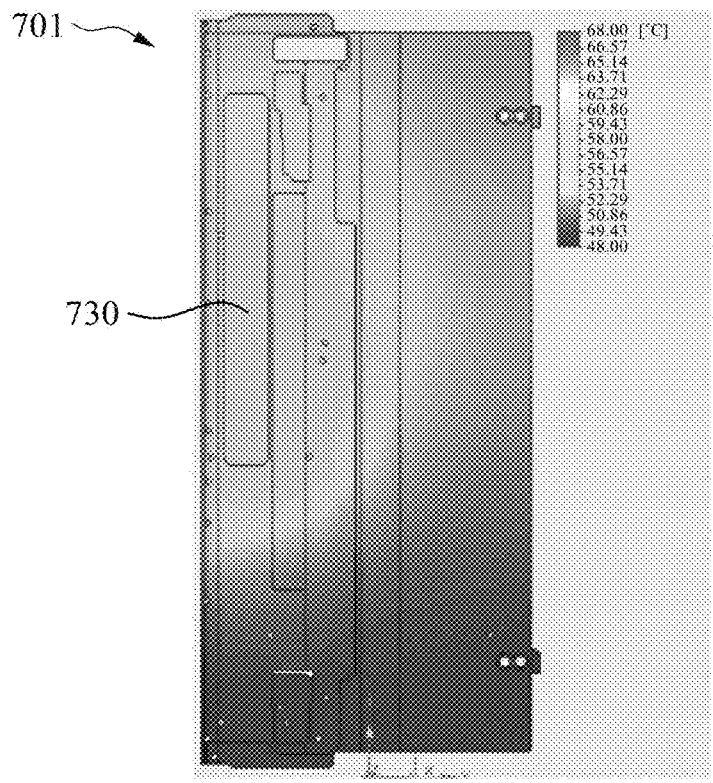

FIGS. 7C and 7D illustrate experimental data obtained by measuring a temperature of an electronic device when a heat dissipator (e.g., the heat dissipator 733 of FIG. 7A) is omitted from a board module (e.g., the board module 730 of FIG. 7A), and FIGS. 7E and 7F illustrate experimental data obtained by measuring a temperature of an electronic device when a heat dissipator is applied to a board module. In addition, FIG. 7C illustrates temperature measurement data of a rear surface of the electronic device in which the heat dissipator is omitted, FIG. 7D illustrates temperature measurement data of a front surface of the electronic device of FIG. 7C, FIG. 7E illustrates temperature measurement data of a rear surface of the electronic device in which the heat dissipator is applied, and FIG. 7F illustrates temperature measurement data of a front surface of the electronic device of FIG. 7E.

Experiments shown in FIGS. 7C to 7E were performed using the same electronic device 701 that differed only in whether the heat dissipator was omitted. Temperature measurement of all data was performed after a set time elapsed after supplying about 0.12 watts (W) of power to the board module under the same conditions.

Referring to FIGS. 7C and 7D, when the heat dissipator was omitted in the board module, an average ambient temperature of an electrical element to which power was applied was measured to be about 66.56 degrees Celsius (° C.), and a temperature of a circuit board including the power-applied element was measured to be about 64.23° C.

Referring to FIGS. 7E and 7F, when the heat dissipator was applied to the board module, an average ambient temperature of an electrical element to which power was applied was measured to be about 62.89° C., and a temperature of a circuit board including the power-applied electrical element was measured to be about 60.50° C. From this, it was confirmed that a lower temperature is obtained compared to a case in which the heat dissipator is omitted. Specifically, when the heat dissipator is applied, compared to the case in which the heat dissipator is omitted, the temperature around the electrical element decreased by 5.51%, and the temperature of the circuit board on which the electrical element was mounted decreased by 5.71%, confirming that relatively high heat dissipation performance was ensured.

Figure 8A:
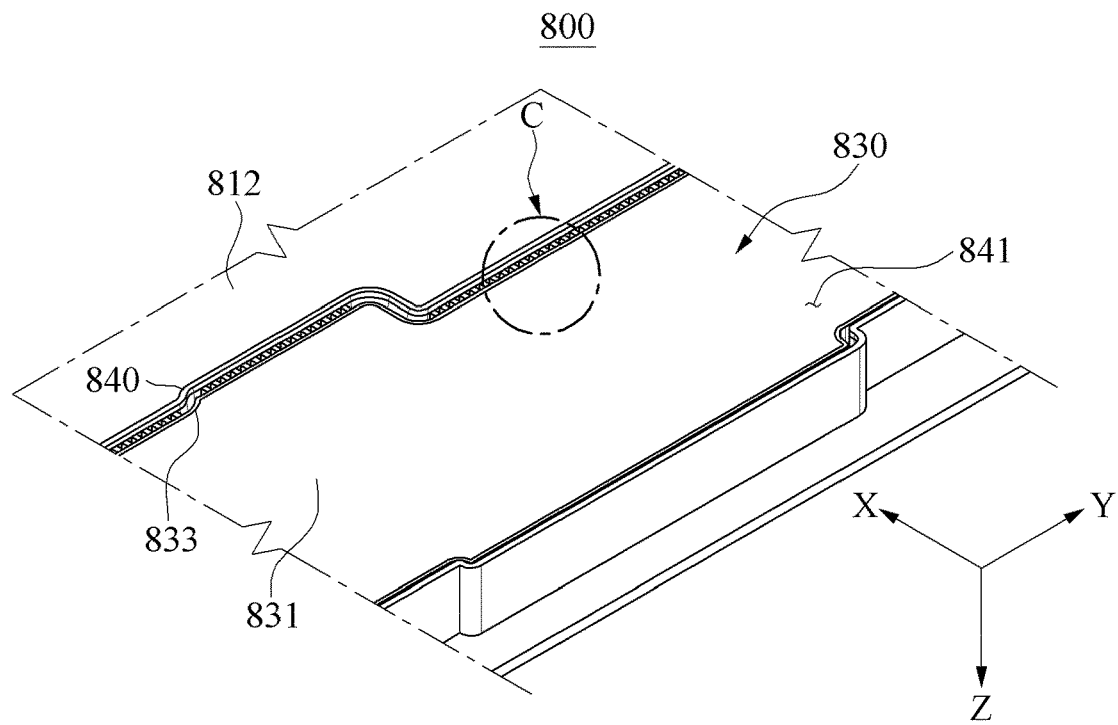
FIG. 8A is a perspective view illustrating an electronic device according to an example embodiment.
Figure 8B:
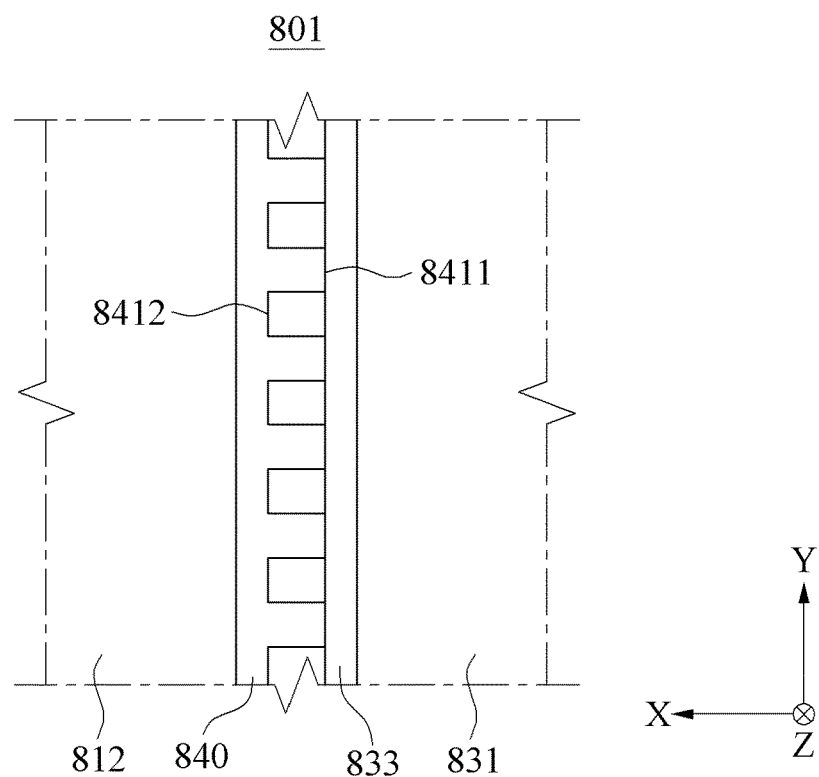
FIG. 8B is a cross-sectional view of a cross-section perpendicular to a seating direction of an electronic device with respect to a portion C of FIG. 8A according to an example embodiment.
Figure 8C:
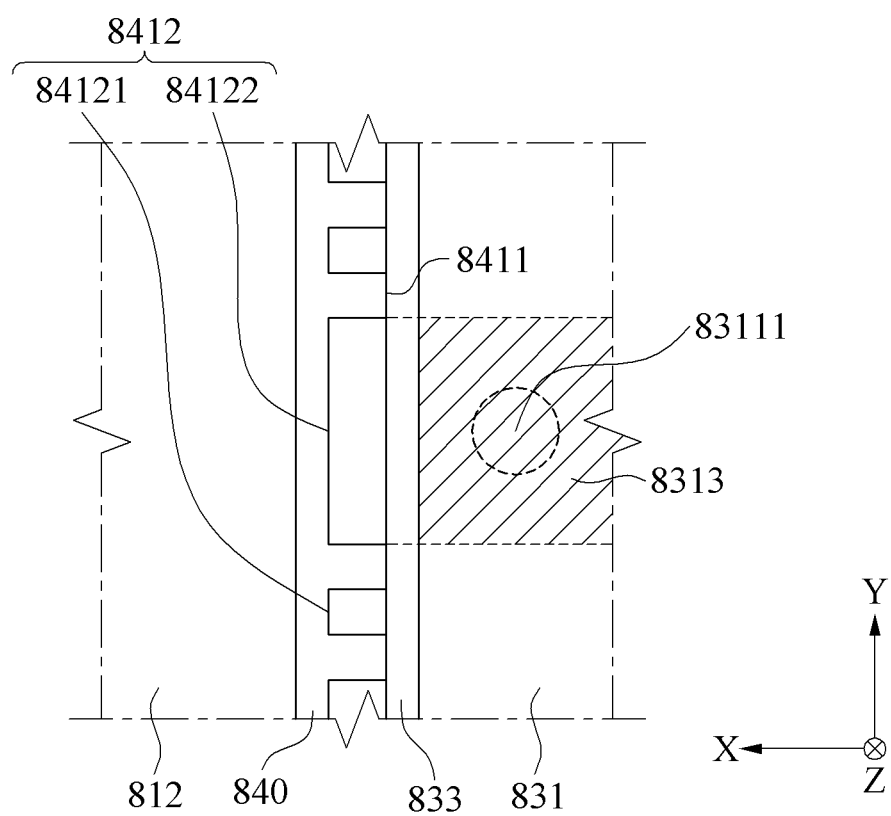
FIG. 8C is a cross-sectional view of a cross-section perpendicular to a seating direction of an electronic device with respect to the portion C of FIG. 8A according to an example embodiment.

FIG. 8A is a perspective view illustrating an electronic device according to one embodiment, FIG. 8B is a cross-sectional view of a cross-section perpendicular to a seating direction of an electronic device with respect to a portion C of FIG. 8A according to one embodiment, and FIG. 8C is a cross-sectional view of a cross-section perpendicular to a seating direction of an electronic device with respect to the portion C of FIG. 8A according to one embodiment.

Referring to FIGS. 8A through 8C, an electronic device 801 (e.g., the electronic device 101 of FIG. 1, the electronic device 201 of FIG. 2A, or the electronic device 301 of FIG. 3A) according to one embodiment may include a housing (e.g., a second housing 812), a seating portion 840, and a board module 830 (e.g., the first PCB 251 of FIG. 2 and the board module 330 of FIG. 3A).

In one embodiment, the seating portion 840 may support the board module 830 from the second housing 812. In one embodiment, the seating portion 840 may form a seating space 841 in which the board module 830 is seated. In one embodiment, the seating portion 840 may include at least one contact portion 8411 and at least one non-contact portions 8412 formed on an inner circumferential surface of the seating space 841. In one embodiment, in a state in which the board module 830 is seated in the seating portion 840, the contact portion 8411 may be in contact with an outer surface of the board module 830, for example, a heat dissipator 833, and the non-contact portion 8412 may be spaced apart from an outer surface of the heat dissipator 833.

In one embodiment, based on a cross-section perpendicular to the seating direction (e.g., +Z direction), the non-contact portion 8412 may be formed between the plurality of contact portions 8411, and have an end portion formed to be inwardly concave compared to the contact portion 8411. For example, based on the cross-section perpendicular to the seating direction (e.g., +Z direction), the contact portion 8411 and the non-contact portion 8412 may be formed to alternate with each other, so that the inner circumferential surface of the seating space 841 is formed in an uneven shape. In the above-described structure, in a state in which the board module 830 is seated in the seating portion 840, a predetermined gap may be formed between the board module 830 and the seating portion 840 through the non-contact portion 8412. In this case, when a shock is applied to the electronic device 801, a space formed between the non-contact portion 8412 and the board module 830 may function as a buffer space for buffering the shock transmitted from the seating portion 840 to the board module 830.

In one embodiment, based on a cross-section perpendicular to the seating direction (e.g., +Z direction), the plurality of non-contact portions 8412 may have different lengths in the vertical direction (e.g., +Y direction). For example, in FIG. 8C, based on a cross-section perpendicular to the seating direction (e.g., +Z direction), the non-contact portion 8412 may include a first non-contact portion 84121 and a second non-contact portion 84122 having a length larger than that of the first non-contact portion 84121 in the vertical direction (e.g., Y direction). Based on the cross-section perpendicular to the seating direction (e.g., +Z direction), a separation area 8313 may be formed between two virtual lines extending a boundary between the second non-contact portion 84122 and the contact portion 8411 adjacent, to the second non-contact portion 84122 in the horizontal direction (e.g., X direction).

In one embodiment, the separation area 8313 may be located adjacent, directly or indirectly, to a space formed between the seating portion 840 and the board module 830, for example, the non-contact portion 8412 so as to receive a relatively less influence of the external shock compared to other regions. In this case, when facing the board module 830 in the seating direction (e.g., +Z direction), at least one electrical element 83111 among electrical elements arranged on a plurality of circuit boards 831 may overlap the separation area 8313. The electrical element 83111 overlapping the separation area 8313 may be one of shock-vulnerable elements, for example, an AP (e.g., the processor 120 of FIG. 1), a PMIC (e.g., the power management module 188 of FIG. 1), or an RFIC (e.g., the communication module 190 of FIG. 1). For example, the board module 830 may position the electrical element 83111 vulnerable to the shock at a position at which the electrical element 83111 overlaps the separation area 8313, thereby reducing damage due to the external shock.

Figure 9:
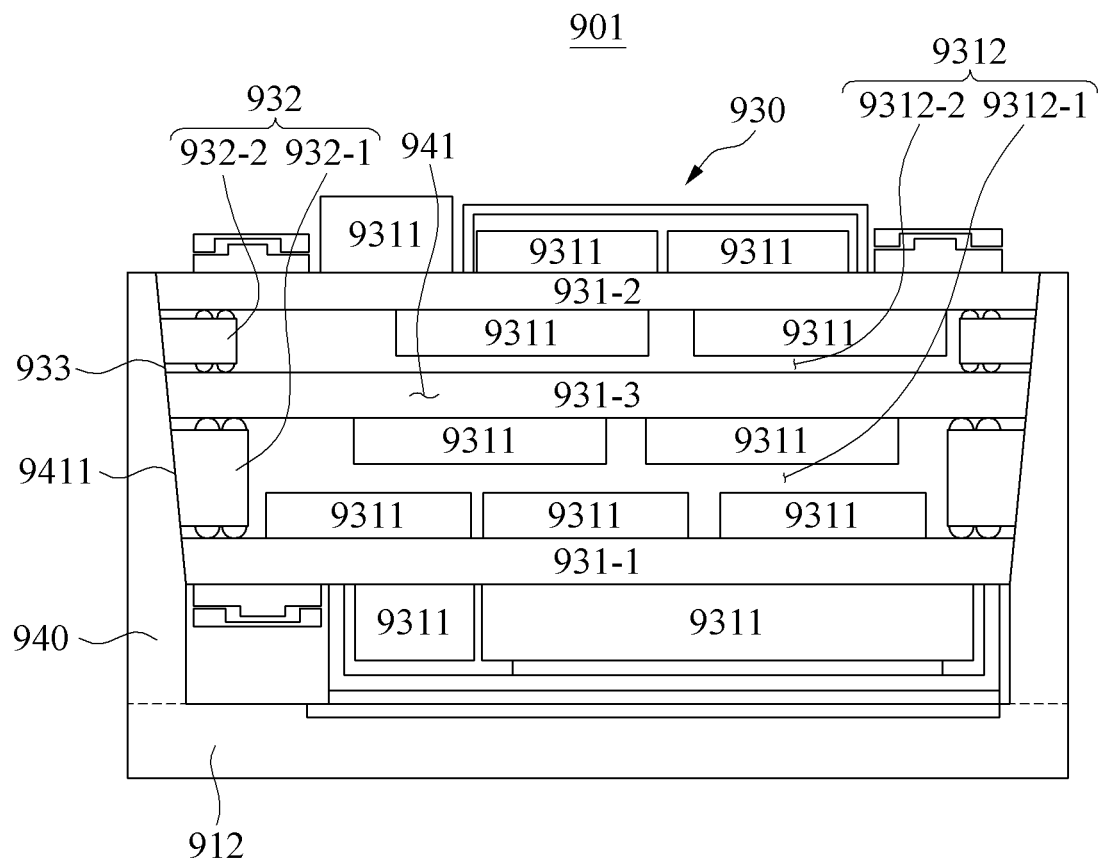
FIG. 9 is a cross-sectional view illustrating an electronic device taken along the line II-II' of FIG. 2E according to an example embodiment.

FIG. 9 is a cross-sectional view illustrating an electronic device taken along the line II-II' of FIG. 2E according to one embodiment.

Referring to FIG. 9, an electronic device 901 (e.g., the electronic device 101 of FIG. 1, the electronic device 201 of FIG. 2A, or the electronic device 301 of FIG. 3A) according to one embodiment may include a housing (e.g., a second housing 912), a seating portion 940, and a board module 930 (e.g., the first PCB 251 of FIG. 2 and the board module 330 of FIG. 3A).

In one embodiment, the seating portion 940 may support the board module 930 from the second housing 912. In one embodiment, the seating portion 940 may form a seating space 941 in which the board module 930 is seated. The seating portion 940 may include at least one contact portion 9411 formed on an inner circumferential surface of the seating space 941 and contacting a side surface of the board module 930.

In one embodiment, the board module 930 may include a plurality of circuit boards 931, an interposer 932, and a heat dissipator 933. For example, the plurality of circuit boards 931 may include a first circuit board 931-1 and a second circuit board 931-2 disposed in parallel to each other, and a third circuit board 931-3 disposed between the first circuit board 931-1 and the second circuit board 931-2. One or more interposers 932 may include a first interposer 932-1 connecting the first circuit board 931-1 and the third circuit board 931-3, and a second interposer 932-2 connecting the second circuit board 931-2 and the third circuit board 931-3.

In one embodiment, one or more electrical elements 9311 may be mounted on a surface of each of the plurality of circuit boards 931. A board space 9312 may be formed between the plurality of circuit boards 931. In this case, a first circuit board space 9312-1 may be formed between the first circuit board 931-1 and the third circuit board 931-3, and a second board space 9312-2 may be formed between the second circuit board 931-2 and the third circuit board 931-3. In one embodiment, the heat dissipator 933 may be applied to an outer surface of the interposer 932.

In one embodiment, based on a cross-section parallel to a seating direction (e.g., +Z direction), the contact portion 9411 may be formed to be inclined such that a width of the seating space 941 decreases in the seating direction (e.g., +Z direction). For example, based on a cross-section parallel to the seating direction (e.g., +Z direction), the contact portion 9411 may be formed to be downwardly inclined in the seating direction (e.g., +Z direction). In one embodiment, based on the cross-section parallel to the seating direction (e.g., +Z direction), the board module 930 may be formed to have a shape corresponding to the contact portion 9411.

In one embodiment, side surfaces of the interposer 932 and the plurality of circuit boards 931 may be shaped to correspond to the contact portion 9411. For example, based on the cross-section parallel to the seating direction (e.g., +Z direction), side surfaces of the interposer 932 and the plurality of circuit boards 931 may be formed to be inclined such that widths decrease in the seating direction (e.g., +Z direction). In this example, the heat dissipator 933 may be formed of a fluid material filling a gap between the contact portion 9411 and the side surfaces of the interposer 932 and the plurality of circuit boards 931. The heat dissipator 933 may be, for example, thermal grease.

Figure 10A:
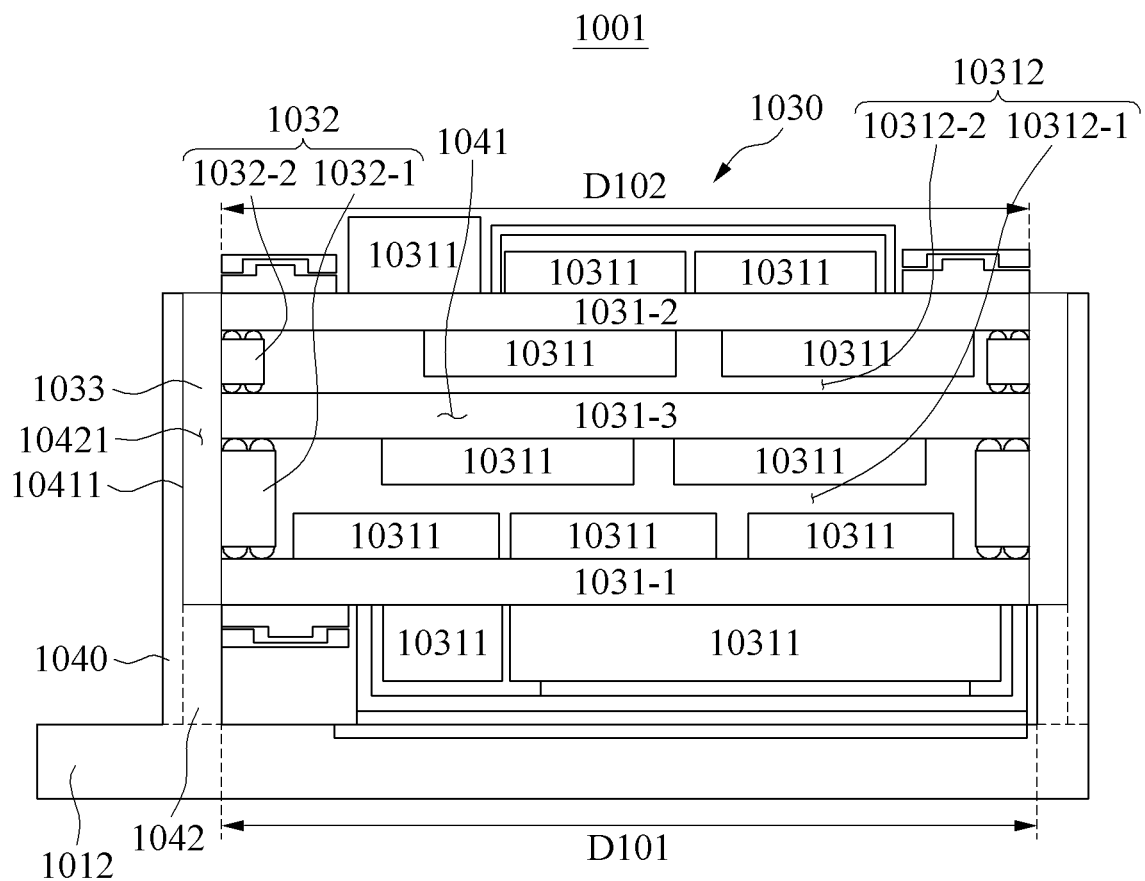
FIG. 10A is a cross-sectional view illustrating an electronic device taken along the line II-II' of FIG. 2E according to an example embodiment.
Figure 10B:
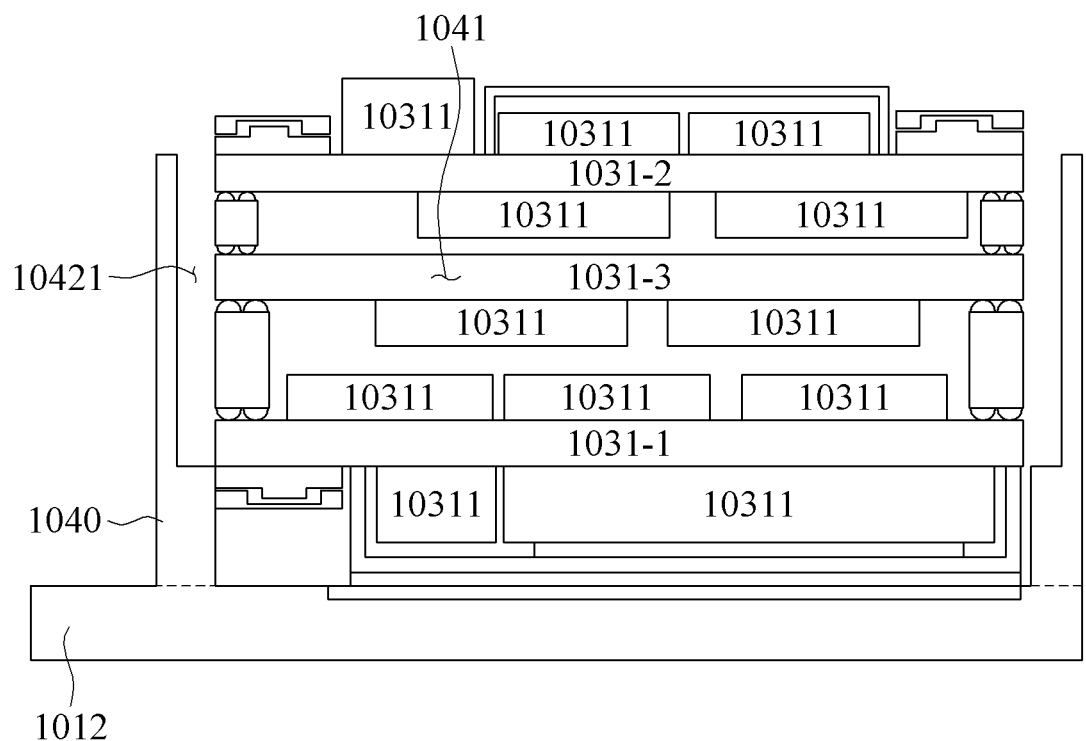
FIGS. 10B and 10C are diagrams illustrating a process of seating a board module in a seating space according to an example embodiment.
Figure 10B:
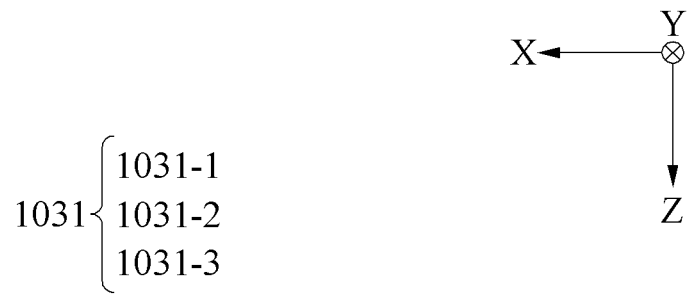
Figure 10C:
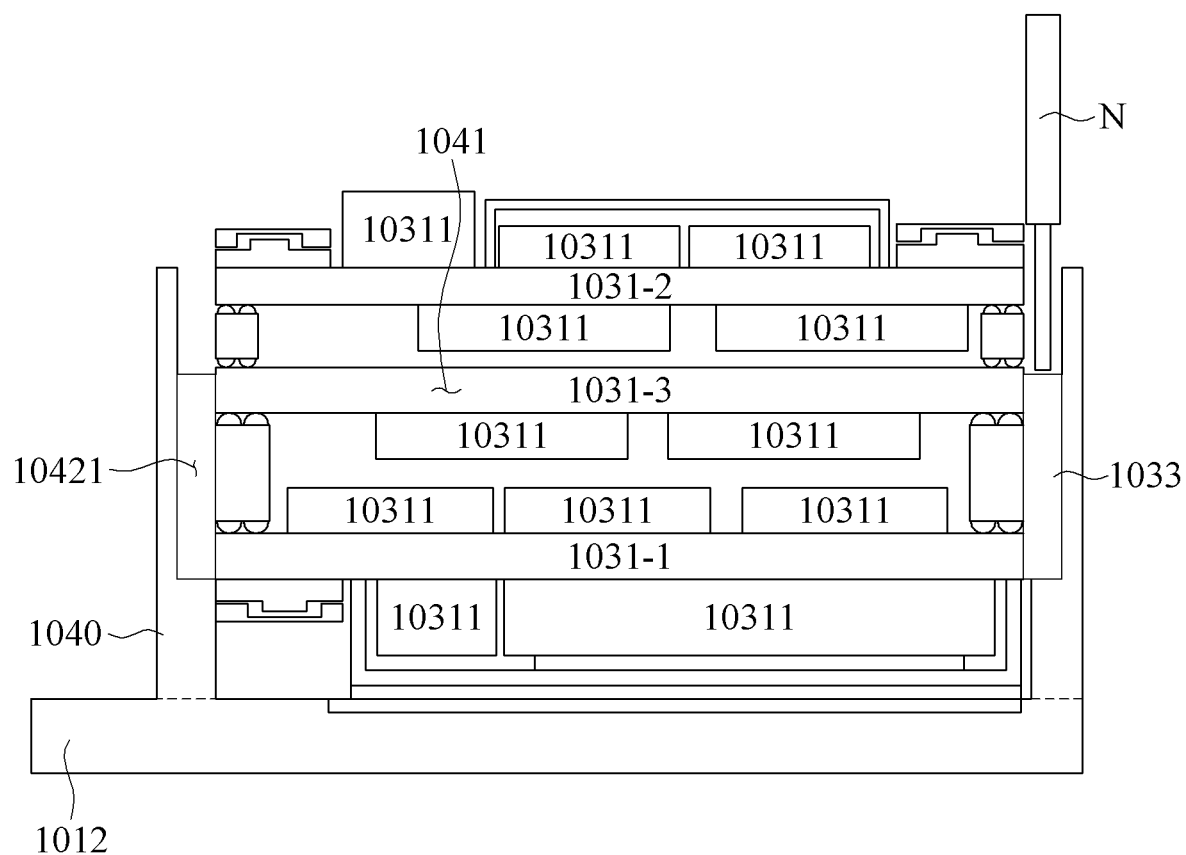
Figure 10D:
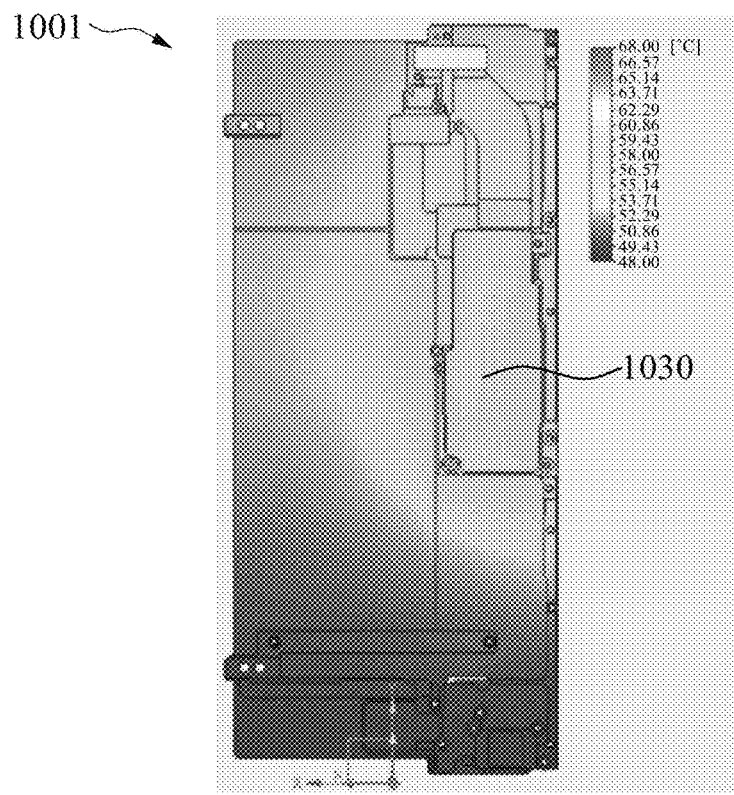
FIGS. 10D and 10E illustrate temperature measurement data of an electronic device for identifying a heat dissipation performance of a board module of FIG. 10A.
Figure 10E:
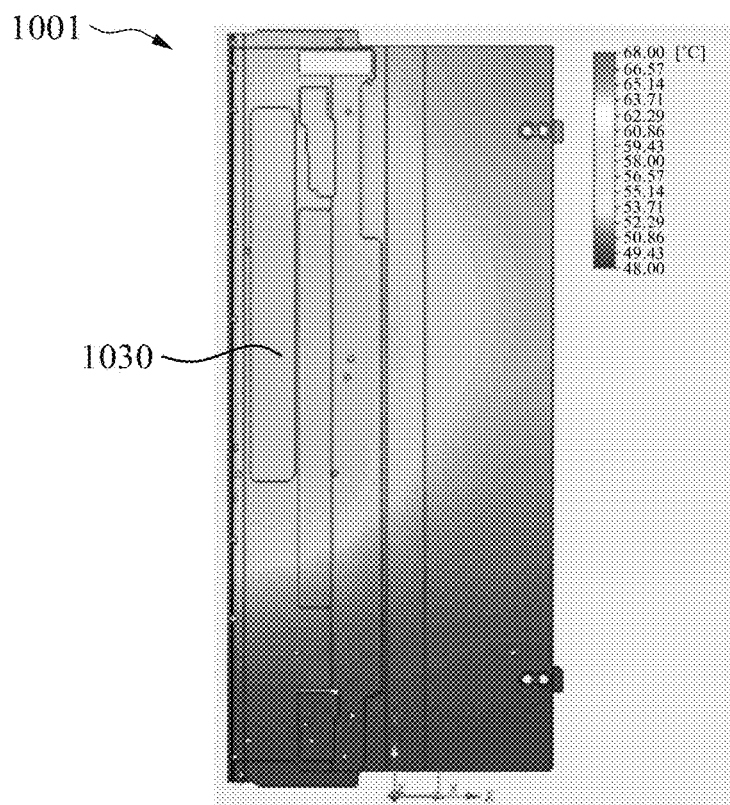

FIG. 10A FIG. 10A is a cross-sectional view illustrating an electronic device taken along the line II-II' of FIG. 2E according to one embodiment, FIGS. 10B and 10C are diagrams illustrating a process of seating a board module in a seating space according to one embodiment, and FIGS. 10D and 10E illustrate temperature measurement data of an electronic device for identifying a heat dissipation performance of a board module of FIG. 10A.

Referring to FIGS. 10A through 10E, an electronic device 1001 (e.g., the electronic device 101 of FIG. 1, the electronic device 201 of FIG. 2A, or the electronic device 301 of FIG. 3A) according to one embodiment may include a housing (e.g., a second housing 1012), a seating portion 1040, and a board module 1030 (e.g., the first PCB 251 of FIG. 2 and the board module 330 of FIG. 3A).

In one embodiment, the seating portion 1040 may support the board module 1030 from the second housing 1012. In one embodiment, the seating portion 1040 may form a seating space 1041 in which the board module 1030 is seated. The seating portion 1040 may include one or more contact portion 10411 formed on an inner circumferential surface of the seating space 1041 and contacting a side surface of the board module 1030.

In one embodiment, the board module 1030 may include a plurality of circuit boards 1031, an interposer 1032, and a heat dissipator 1033. For example, the plurality of circuit boards 1031 may include a first circuit board 1031-1 and a second circuit board 1031-2 disposed in parallel to each other, and a third circuit board 1031-3 disposed between the first circuit board 1031-1 and the second circuit board 1031-2. One or more interposers 1032 may include a first interposer 1032-1 connecting the first circuit board 1031-1 and the third circuit board 1031-3, and a second interposer 1032-2 connecting the second circuit board 1031-2 and the third circuit board 1031-3. In one embodiment, one or more electrical elements 10311 may be mounted on each of the plurality of circuit boards 1031. A board space 10312 may be formed between the plurality of circuit boards 1031. A first board space 10312-1 may be formed between the first circuit board 1031-1 and the third circuit board 1031-3, and a second board space 10312-2 may be formed between the second circuit board 1031-2 and the third circuit board 1031-3. In one embodiment, the heat dissipator 1033 may be disposed on an outer surface of the interposer 1032.

In one embodiment, the seating portion 1040 may include a support portion 1042 protruding from the inner circumferential surface toward the seating space 1041. Based on a cross-section parallel to the seating direction (e.g., +Z direction), a distance D101 between the support portions 1042 may correspond to a width D102 of the plurality of circuit boards 1031. Based on the cross-section parallel to the seating direction (e.g., +Z direction), at an upper position compared to the support portion 1042, a support space 10421 may be formed between the interposer 1032 and the seating portion 1040. The heat dissipator 1033 may be disposed in the support space 10421. In the above-described structure, the heat dissipator 1033 may be supported by a top surface (e.g., a surface faxing −Z axis) of the support portion 1042 and disposed between the interposer 1032 and the seating portion 1040. In this case, the heat dissipator 1033 may be in contact with the outer surface of the interposer 1032 and the contact portion 10411 of the seating portion 1040, simultaneously.

In one embodiment, excluding the heat dissipator 1033, the board module 1030 may be disposed in the seating space 1041 (e.g., FIG. 10B). After the board module 1030 excluding the heat dissipator 1033 is disposed in the seating space 1041, the heat dissipator 1033 may be applied to the support space 10421 through a nozzle N (e.g., FIG. 10C).

FIGS. 10D and 10E illustrate temperature measurement data of an electronic device for identifying a dissipation performance of the board module illustrated in FIG. 10A. Experiments shown in FIGS. 10D and 10E were performed using the electronic device of FIGS. 7C and 7D in which the board module of FIG. 10A is applied, and performed under the same conditions as FIGS. 7C through 7F. FIG. 10D illustrates data obtained by measuring a temperature of a front surface of the electronic device, and FIG. 10E illustrates data obtained by measuring a temperature of a rear surface of the electronic device of FIG. 10D.

Referring to FIGS. 10D and 10E, an average ambient temperature of an electrical element to which power was applied was measured to be about 63.27° C., and a temperature of a circuit board including the power-applied electrical element was measured to be about 60.88° C. In addition, when compared to the experimental data of FIG. 7C obtained for the electronic device 701 in which the heat dissipator is omitted, the average ambient temperature of the electrical element of the electronic device 1001 in which the board module is applied FIG. 10A decreased by 4.94% and the temperature of the circuit board on which the electrical element was mounted decreased by 5.21%, confirming that relatively high heat dissipation performance was ensured.

When the experimental data of FIGS. 10D and 10E were compared with the experimental data of FIGS. 7E and 7F, in the electronic device 1001 of FIG. 10A, the ambient temperature of the electrical element increased by 0.64% and the temperature of the circuit board 1031 on which the electrical element was mounted increased 0.53%. From this, when compared to the electronic device 701 for which the experiments of FIGS. 7E and 7F were performed, it was confirmed that the heat dissipation performance was not significantly deteriorated while having an advantage in the manufacturing process of the board module.

Figure 11A:
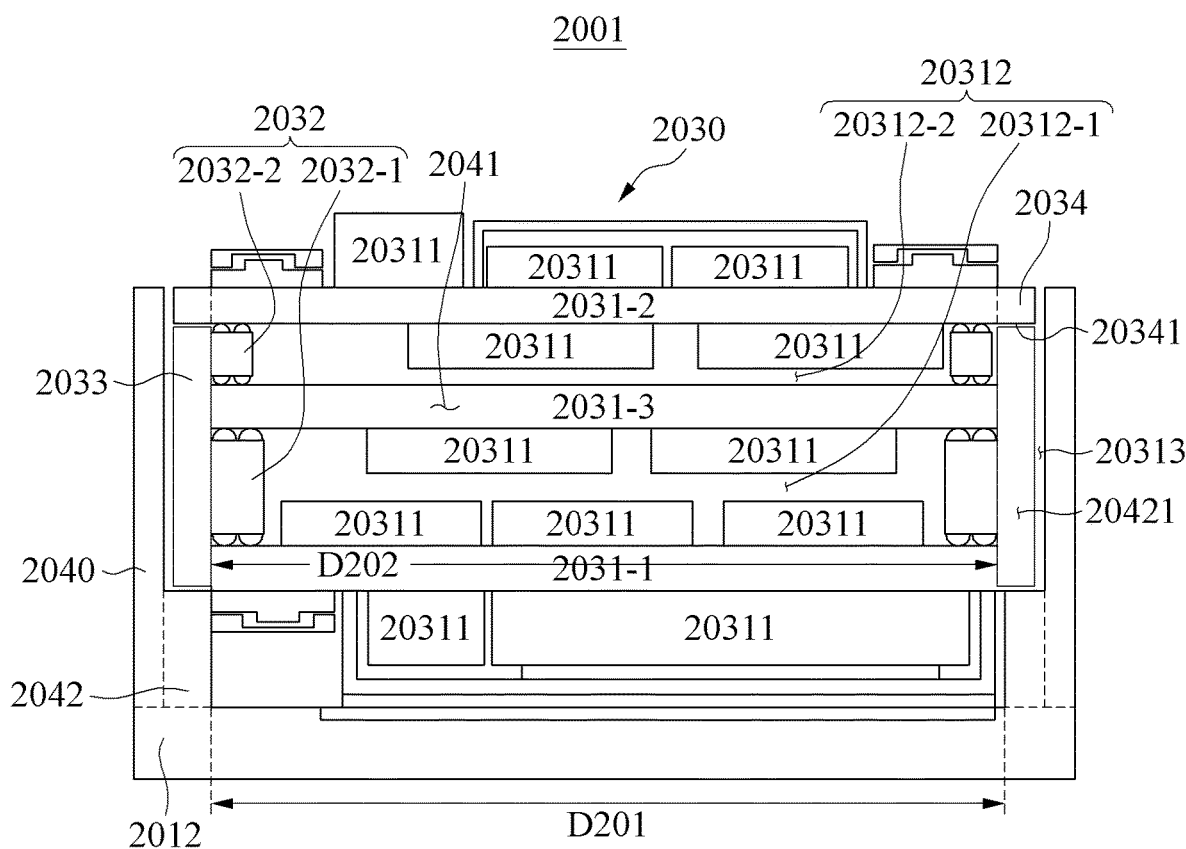
FIG. 11A is a cross-sectional view illustrating an electronic device taken along the line II-II' of FIG. 2E according to an example embodiment.
Figure 11B:
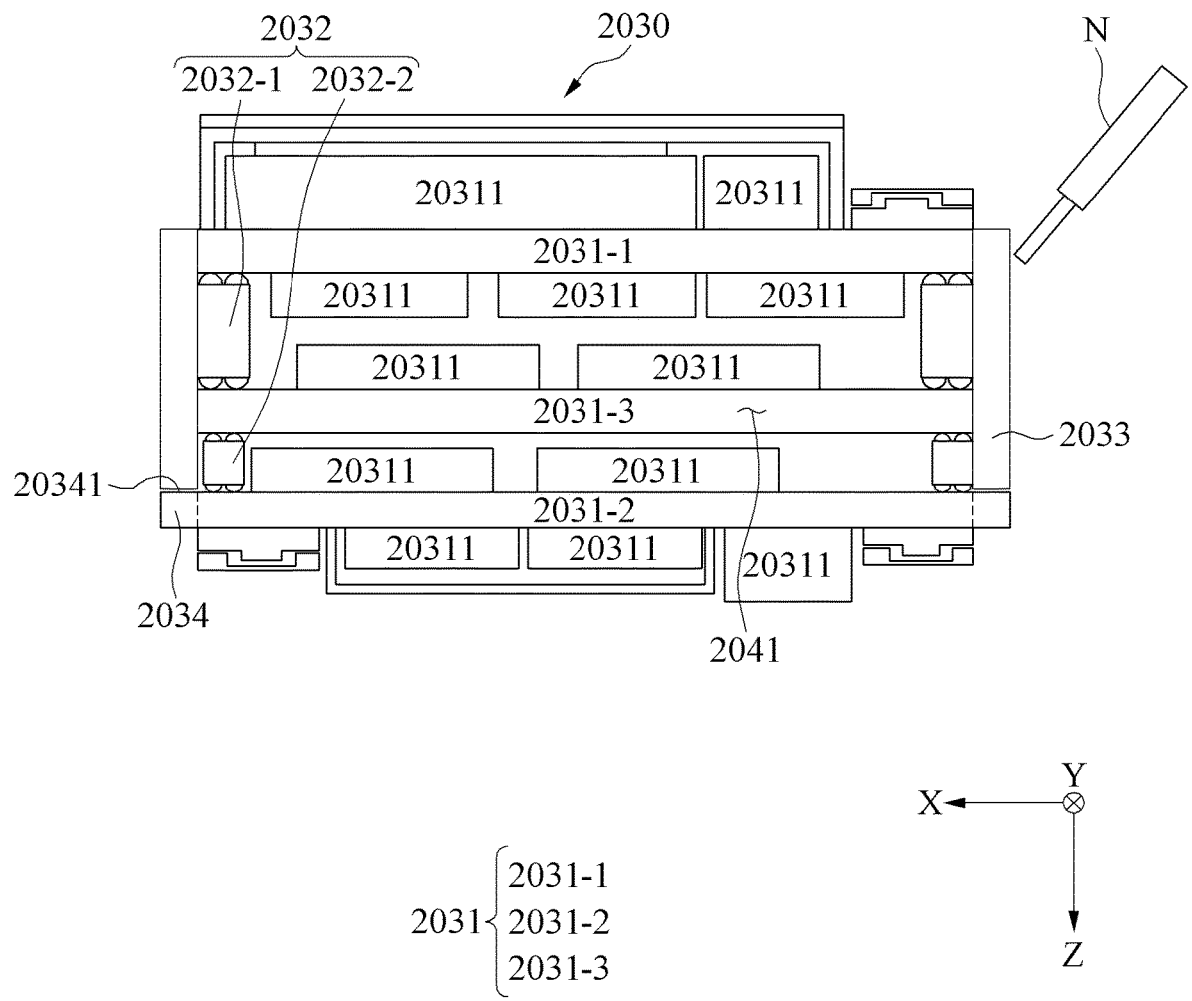
FIGS. 11B and 11C are diagrams illustrating a process of seating a board module in a seating space according to an example embodiment.
Figure 11C:
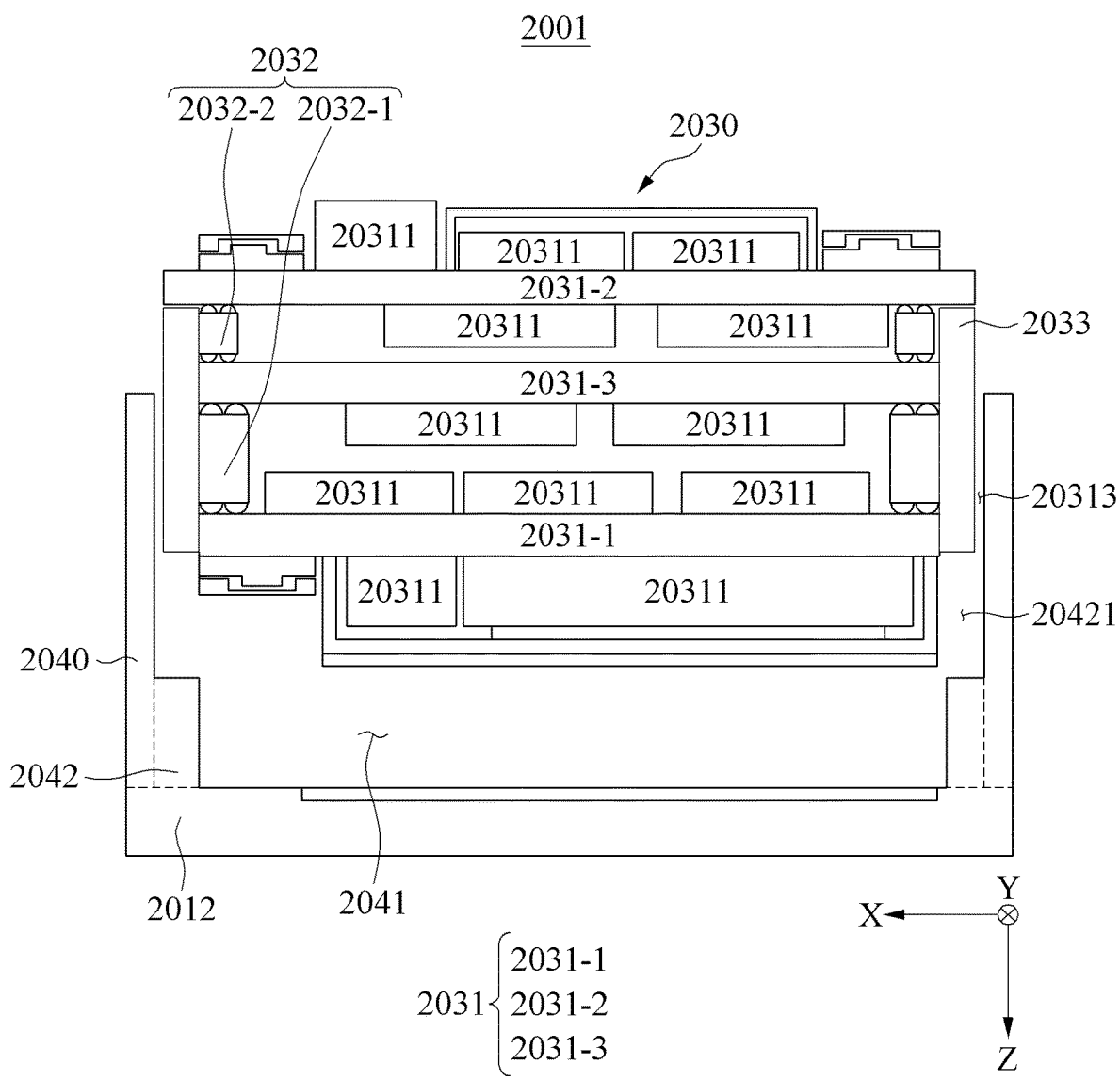
Figure 11D:
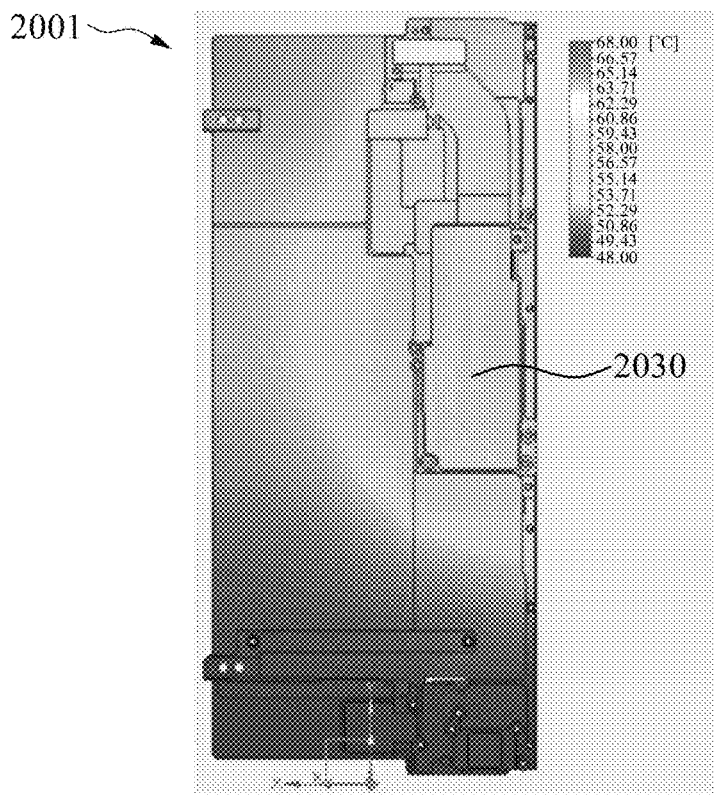
FIGS. 11D and 11E illustrate temperature measurement data of an electronic device reflecting a board module having a space formed between a heat dissipator and a seating portion as illustrated in FIG. 11A.
Figure 11E:
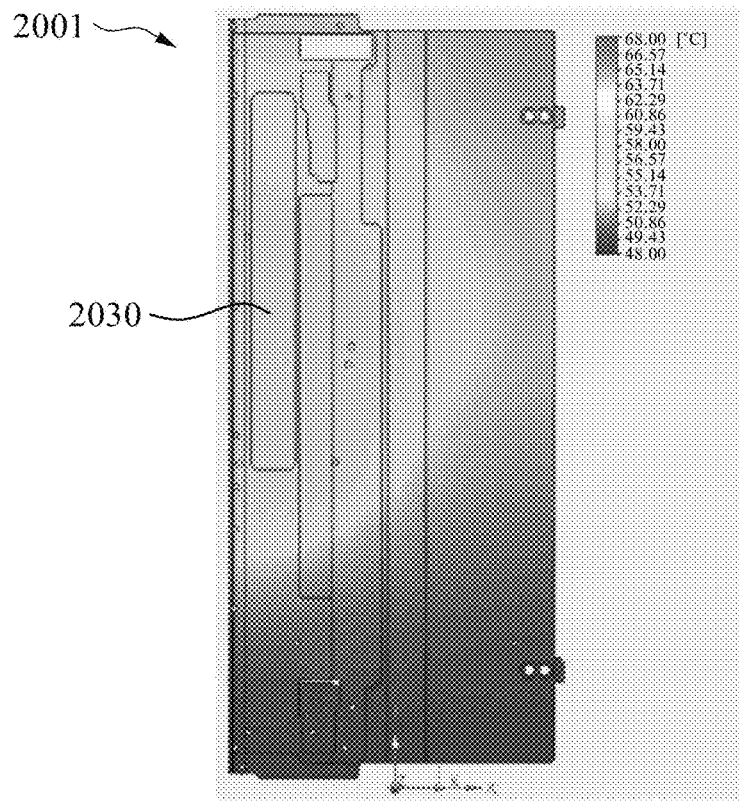

FIG. 11A is a cross-sectional view illustrating an electronic device taken along the line I-II' of FIG. 2E according to one embodiment, FIGS. 11B and 11C are diagrams illustrating a process of seating a board module in a seating space according to one embodiment, and FIGS. 11D and 11E illustrate temperature measurement data of an electronic device reflecting a board module having a space formed between a heat dissipator and a seating portion as illustrated in FIG. 11A.

Referring to FIGS. 11A through 11E, an electronic device 2001 (e.g., the electronic device 101 of FIG. 1, the electronic device 201 of FIG. 2A, or the electronic device 301 of FIG. 3A) according to one embodiment may include a housing (e.g., a second housing 2012), a seating portion 2040, and a board module 2030 (e.g., the first PCB 251 of FIG. 2 and the board module 330 of FIG. 3A).

In one embodiment, the seating portion 2040 may support the board module 2030 from the second housing 2012. In one embodiment, the seating portion 2040 may form a seating space 2041 in which the board module 2030 is seated.

In one embodiment, the board module 2030 may include a plurality of circuit boards 2031, an interposer 2032, a heat dissipator 2033, and a support portion 2034. For example, the plurality of circuit boards 2031 may include a first circuit board 2031-1 and a second circuit board 2031-2 disposed in parallel to each other, and a third circuit board 2031-3 disposed between the first circuit board 2031-1 and the second circuit board 2031-2. One or more interposers 2032 may include a first interposer 2032-1 connecting the first circuit board 2031-1 and the third circuit board 2031-3, and a second interposer 2032-2 connecting the second circuit board 2031-2 and the third circuit board 2031-3. In one embodiment, one or more electrical elements 20311 may be mounted on a surface of each of the plurality of circuit boards 2031. A board space 20312 may be formed between the plurality of circuit boards 2031. In this case, a first board space 20312-1 may be formed between the first circuit board 2031-1 and the third circuit board 2031-3, and a second board space 20312-2 may be formed between the second circuit board 2031-2 and the third circuit board 2031-3. In one embodiment, the heat dissipator 2033 may be disposed on an outer surface of the interposer 2032.

In one embodiment, based on a cross-section parallel to the seating direction (e.g., +Z direction), at least one circuit board among the plurality of circuit boards 2031 may include the support portion 2034 having an edge protruding to an outer side of the interposer 2032. The support portion 2034 may be formed on the circuit board 2031 disposed at an uppermost end, for example, the second circuit board 2031-2 among the plurality of circuit boards 2031.

In one embodiment, the seating portion 2040 may include a support portion 2042 protruding from the inner circumferential surface toward the seating space 2041. Based on a cross-section parallel to the seating direction (e.g., +Z direction), a distance D201 between the support portions 2042 may correspond to a width of one of the plurality of circuit boards 2031. Based on a cross-section parallel to the seating direction (e.g., +Z direction), at an upper position compared to the support portion 2042, a support space 20421 may be formed between the seating portion 2040 and the plurality of circuit boards 2031 and the interposer 2032. In one embodiment, the heat dissipator 2033 may be disposed in at least a portion of the support space 20421. In one embodiment, based on the cross-section parallel to the seating direction (e.g., +Z direction), the inner circumferential surface of the seating portion 2040 may be spaced apart from a side surface of the board module 2030.

For example, based on the cross-section parallel to the seating direction (e.g., +Z direction), at the upper position compared to the support portion 2042, a separation space 20313 may be formed between the inner circumferential surface of the seating portion 2040 and a side surface of the board module 2030. In the above-described structure, the board module 2030 may be easily attached and detached to and from the seating portion 2040 in the seating space 2041. In one embodiment, the heat dissipator 2033 may be applied to a support plane 20341 of the support portion 2034 through a nozzle N (e.g., FIG. 11B). After the heat dissipator 2033 is applied to the support plane 20341, the board module 2030 may be seated in the seating space 2041 (e.g., 11c).

FIGS. 11D and 11E illustrate temperature measurement data of an electronic device including a board module having a space formed between a conductive heat dissipator and a seating portion as shown in FIG. 11A. FIG. 11D illustrates a front-surface temperature distribution of the electronic device and FIG. 11E illustrates a rear-surface temperature distribution of the electronic device of FIG. 11D.

Experiments of FIGS. 11D and 11E were performed under the same conditions as FIGS. 7C through 7F.

Referring to FIGS. 11D and 11E, an ambient temperature of an electrical element (e.g., the electrical element 20311 of FIG. 11A) to which power was applied was measured to be about 63.66° C., and a circuit board (e.g., the circuit board 2031 of FIG. 11A) on which the electrical element is mounted was measured to be about 61.27° C.

When the experimental data of FIGS. 11D and 11E are compared to the experimental data of FIGS. 7C and 7D performed for the electronic device 701 in which the heat dissipator is omitted, in the electronic device 2001 of FIGS. 11D and 11E, the ambient temperature of the electrical element decreased by 4.94% and the temperature of the circuit board 2031 on which the electrical element is mounted decreased by 5.21%, confirming that relatively high heat dissipation performance was ensured compared to a case in which the heat dissipator is absent.

In addition, when the experimental data of FIGS. 11D and 11E are compared to the experimental data of FIG. 7E and FIG. 7F performed for the electronic device 701 including a board module in which a heat dissipator and a seating portion are in contact, in the cases of FIGS. 11D and 11E, an ambient temperature of an electrical element increased by 0.62% and the circuit board 2031 on which the electrical element is mounted increased 0.64%, confirming that the heat dissipation performance was not significantly deteriorated.

Figure 12:
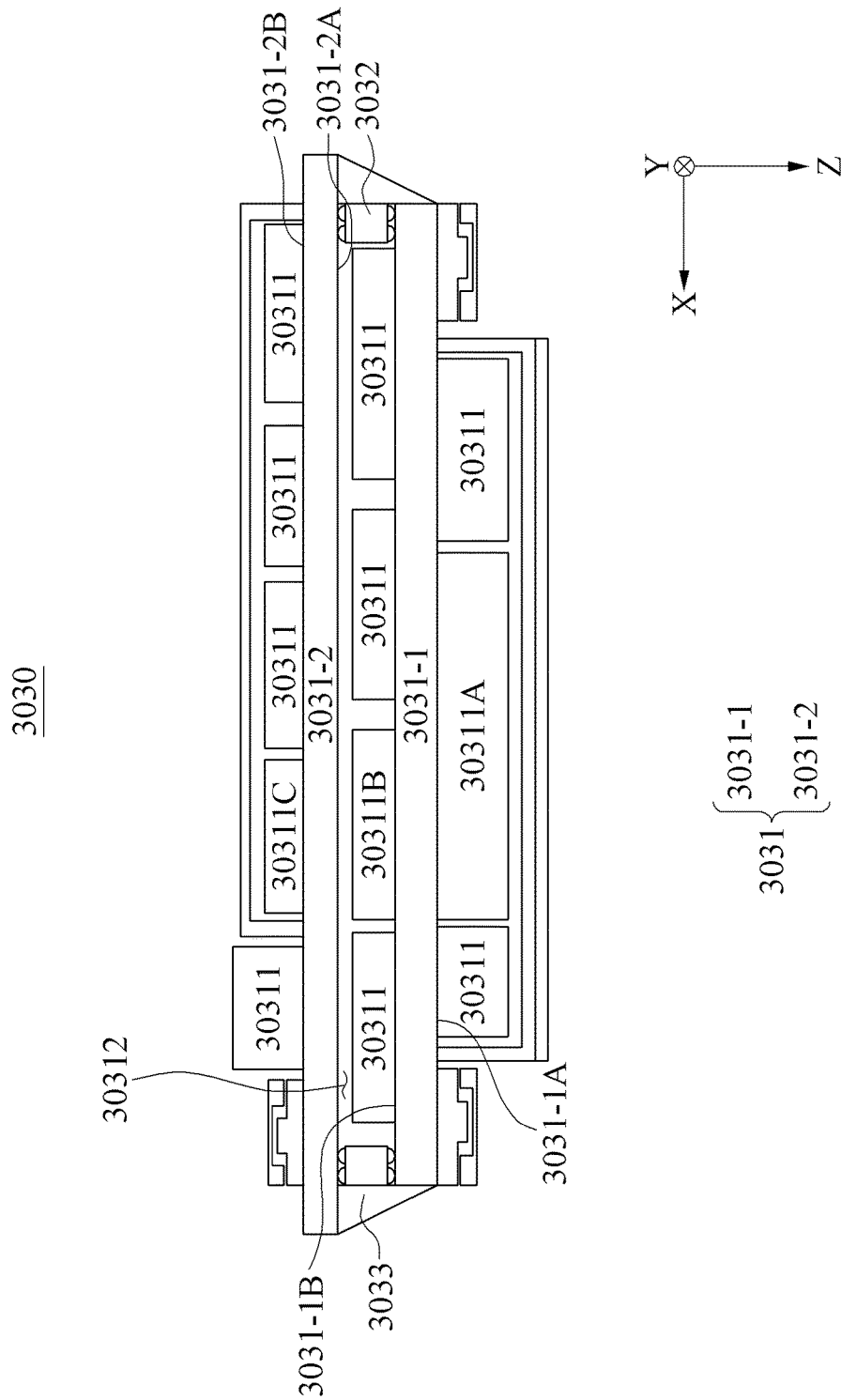
FIG. 12 is a cross-sectional view illustrating a board module taken along the line II-II' of FIG. 2E according to an example embodiment.

FIG. 12 is a cross-sectional view illustrating a board module taken along the line II-II' of FIG. 2E according to one embodiment.

Referring to FIG. 12, a board module 3030 (e.g., the first PCB 251 of FIG. 2 and the board module 330 of FIG. 3A) according to one embodiment may include a plurality of circuit boards 3031 and an interposer 3032.

In one embodiment, the circuit board 3031 may be provided in plural. One or more electrical elements 30311 may be mounted on a surface of the circuit board 3031. The plurality of circuit boards 3031 may be disposed to be spaced apart from each other in the vertical direction (e.g., Z-axial direction) in a substantially parallel state. In one embodiment, a board space 30312 may be formed between the plurality of circuit boards 3031. The electrical element 30311 mounted on the circuit board 3031 may be disposed in the board space 30312.

In one embodiment, the interposer (spacer) 3032 may connect the plurality of circuit boards 3031. In one embodiment, the interposers 3032 may be arranged to surround the board space 30312. The interposer 3032 may support the plurality of circuit boards 3031 such that the board space 30312 is formed. In the interposer 3032, a via may be formed to electrically connect the circuit boards 3031 adjacent, directly or indirectly, to each other. In one embodiment, a heat dissipator 3033 may be disposed along an outer side of the interposer 3032 to externally dissipate heat generated from the plurality of circuit boards 3031.

In one embodiment, the plurality of circuit boards 3031 may include a first circuit board 3031-1 and a second circuit board 3031-2. The first circuit board 3031-1 may include a first board surface 3031-1A and a second board surface 3031-1B opposite to the first board surface 3031-1A. The second circuit board 3031-2 may include a third board surface 3031-2A and a fourth board surface 3031-2B opposite to the third board surface 3031-2A. The first board surface 3031-1A may be disposed to face a front surface (e.g., a surface facing +Z-axial direction) of a housing (e.g., the housing 310 of FIG. 3A). The fourth board surface 3031-2B may be disposed to face a rear surface (e.g., a surface facing −Z-axial direction) of the housing.

In one embodiment, an electrical element 30311A that generates a large amount of heat may be disposed on the first board surface 3031-1A. For example, the electrical element 30311A disposed on the first board surface 3031-1A may generate more heat compared to the electrical element 30311 disposed on the second board surface 3031-1B. For example, an electrical element that generated a high amount of heat, such as an AP (e.g., the processor 120 of FIG. 1) may be disposed on the first board surface 3031-1A. In one embodiment, the electrical element 30311A disposed on the first board surface 3031-1A may be adjacent, directly or indirectly, to the front surface of the housing. For example, the electrical element 30311A disposed on the first board surface 3031-1A may be located adjacent to a front surface of a second housing (e.g., the second housing 312 of FIG. 3A). In the above-described structure, heat generated in the electrical element 30311A disposed on the first board surface 3031-1A may be easily transferred to the housing.

In one embodiment, an electrical element 30311B having a high degree of noise generation may be disposed on at least one of the second board surface 3031-1B and the third circuit board surface 3031-2A. For example, a PMIC (e.g., the power management module 188 of FIG. 1) may be disposed on the second board surface 3031-1B. In this example, the electrical element 30311B disposed on the second board surface 3031-1B may be disposed in the board space 30312 and sealed by the second board surface 3031-1B, the third board surface 3031-2A, and the interposer 3032. In the above-described structure, emission of noise generated in the electrical element 30311B disposed in the board space 30312 to an outside of the board space 30312 may be reduced.

In one embodiment, an antenna structure (e.g., the antenna module 197 of FIG. 1) may be formed on the rear surface of the housing. In one embodiment, when the fourth board surface 3031-2B is disposed to face the rear surface (e.g., a surface facing −Z-axial direction) of the housing, a communication element 30311C electrically communicating with the antenna structure may be disposed on the fourth board surface 3031-2B. For example, an RFIC (e.g., the communication module 190 of FIG. 1) may be disposed on the fourth board surface 3031-2B. In the above-described structure, the communication electrical element 30311C disposed on the fourth board surface 3031-2B may be located adjacent to the rear surface of the housing. For example, the RFIC disposed on the fourth board surface 3031-2B may be located adjacent to the rear surface of the second housing. In the above-described structure, the communication element 30311C may be advantageous in connecting to the antenna structure.

Figure 13:
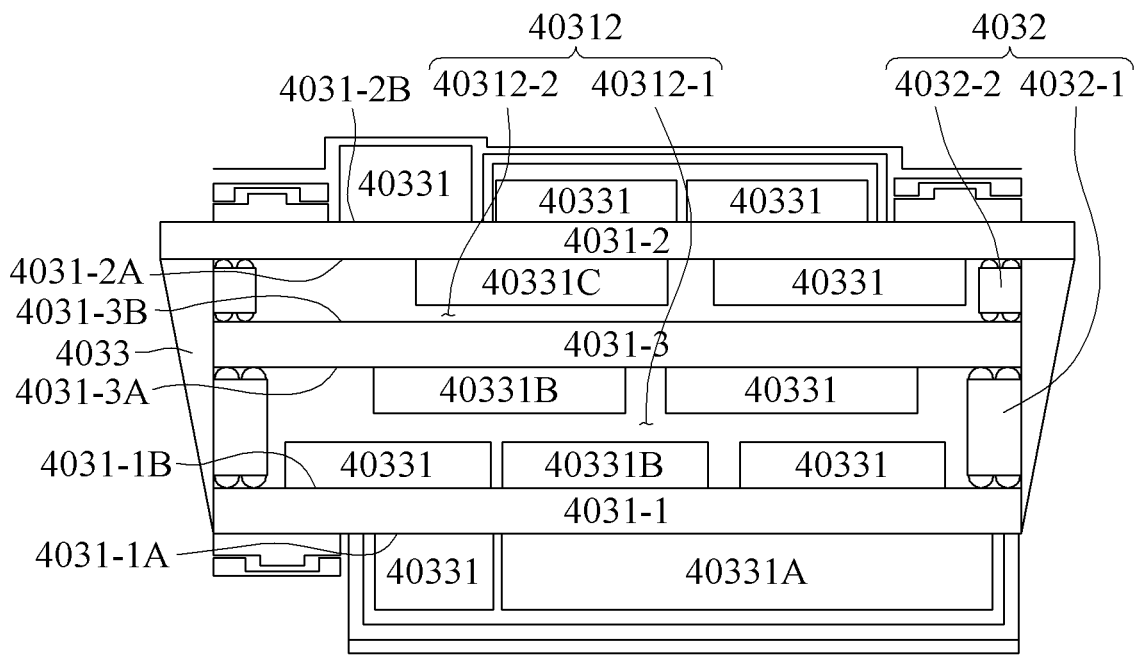
FIG. 13 is a cross-sectional view illustrating a board module taken along the line II-II' of FIG. 2E according to an example embodiment.
Figure 13:
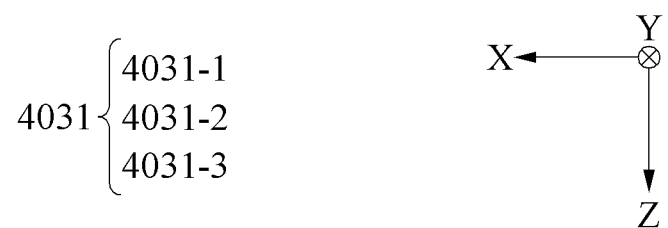

FIG. 13 is a cross-sectional view illustrating a board module taken along the line II-II' of FIG. 2E according to one embodiment.

Referring to FIG. 13, a board module 4030 (e.g., the first PCB 251 of FIG. 2 and the board module 330 of FIG. 3A) according to one embodiment may include a plurality of circuit boards 4031 and an interposer/spacer 4032.

In one embodiment, the circuit board 4031 may be provided in plural. One or more electrical elements 40311 may be mounted on a surface of the circuit board 4031. The plurality of circuit boards 4031 may be disposed to be spaced apart from each other in the vertical direction (e.g., Z-axial direction) in a substantially parallel state. In one embodiment, a board space 40312 may be formed between the plurality of circuit boards 4031. The electrical element 40311 mounted on the plurality of circuit boards 4031 may be disposed in the board space 40312.

In one embodiment, the interposer (spacer) 4032 may connect the plurality of circuit boards 4031. In one embodiment, the interposer 4032 may be arranged to surround the board space 40312. The interposer 4032 may support the plurality of circuit boards 4031 such that the board space 40312 is formed. In one embodiment, a via may be formed in the interposer 4032 to electrically connect the circuit boards 4031 adjacent to each other.

In one embodiment, the plurality of circuit boards 4031 may include a first circuit board 4031-1, a second circuit board 4031-2, and a third circuit board 4031-3. The first circuit board 4031-1 may include a first board surface 4031-1A and a second board surface 4031-1B opposite to the first board surface 4031-1A. The second circuit board 4031-2 may include a third board surface 4031-2A and a fourth board surface 4031-2B opposite to the third board surface 4031-2A. The first board surface 4031-1A may be disposed to face a front surface (e.g., a surface facing +Z-axial direction) of a housing (e.g., the housing 310 of FIG. 3A). The fourth board surface 4031-2B may be disposed to face a rear surface (e.g., a surface facing −Z-axial direction) of the housing. The third board 4031-3 may be disposed between the first circuit board 4031-1 and the second circuit board 4031-2. The third circuit board 4031-3 may include a fifth board surface 4031-3A facing the second board surface 4031-1B and a sixth board surface 4031-3B facing the third board surface 4031-2A.

In one embodiment, the interposer 4032 may include a first interposer 4032-1 and a second interposer 4032-2. The first interposer 4032-1 may connect the first circuit board 4031-1 and the third circuit board 4031-3 so as to surround a first board space 40312-1 formed between the first circuit board 4031-1 and the third circuit board 4031-3. The second interposer 4032-2 may connect the second circuit board 4031-2 and the third circuit board 4031-3 so as to surround a second board space 40312-2 formed between the second circuit board 4031-2 and the third circuit board 4031-3. In one embodiment, a heat dissipator 4033 may be disposed along outer sides of the first interposer 4032-1 and the second interposer 4032-2 to externally dissipate heat generated from the first circuit board 4031-1, the second circuit board 4031-2, and the third circuit board 4031-3.

In one embodiment, an electrical element 40311A that generates a large amount of heat may be disposed on the first board surface 4031-1A. For example, the electrical element 40311A disposed on the first board surface 4031-1A may generate more heat compared to the electrical element 40311 disposed on the second board surface 4031-1B. For example, at least one of an AP (e.g., the processor 120 of FIG. 1) or a universal flash storage (UFS) may be disposed on the first board surface 4031-1A. In one embodiment, the electrical element 40311A disposed on the first board surface 4031-1A may be located adjacent to the front surface of the housing. For example, the AP disposed on the first board surface 4031-1A may be located adjacent to a front surface of a second housing (e.g., the second housing 312 of FIG. 3A). In the above-described structure, heat generated in the electrical element 40311A disposed on the first board surface 4031-1A may be easily transferred to the housing.

In one embodiment, an electrical element 40331B that generates noise may be disposed on at least one of the second board surface 4031-1B and the fifth board surface 4031-3A. For example, a PMIC (e.g., the power management module 188 of FIG. 1) may be disposed on the second board surface 4031-1B. The noise-generating element 40331B may be sealed by the second board surface 4031-1B, the fifth board surface 4031-3A, and the first interposer 4032-1 in the first board space 40312-1. In the above-described structure, noise generated in the first board space 40312-1 may not pass outside the first circuit board 4031-1.

In one embodiment, a communication element 40311C electrically communicating with an antenna structure (e.g., the antenna module 197 of FIG. 1) may be disposed on at least one of the third board surface 4031-2A and the fourth board surface 4031-2B. For example, an RFIC (e.g., the communication module 190 of FIG. 1) may be disposed on the third board surface 4031-2A. For example, a transceiver (TR) may be disposed on at least one of the third board surface 4031-2A and the fourth board surface 4031-2B. An antenna structure may be formed on the rear surface of the housing. In the above-described structure, the communication element 40311C disposed on the third board surface 4031-2A or the fourth board surface 4031-2B may be located adjacent to the rear surface of the housing. For example, the RFIC disposed on the third board surface 4031-2A or the fourth board surface 4031-2B may be located adjacent to the rear surface of the second housing. In the above-described structure, the communication element 40311C may be advantageous in connecting to the antenna structure and may not be affected by the noise generated in the electrical element 40311 disposed on the first board surface 4031-1A, the second board surface 4031-1B, and the fifth board surface 4031-3A.

Figure 14A:
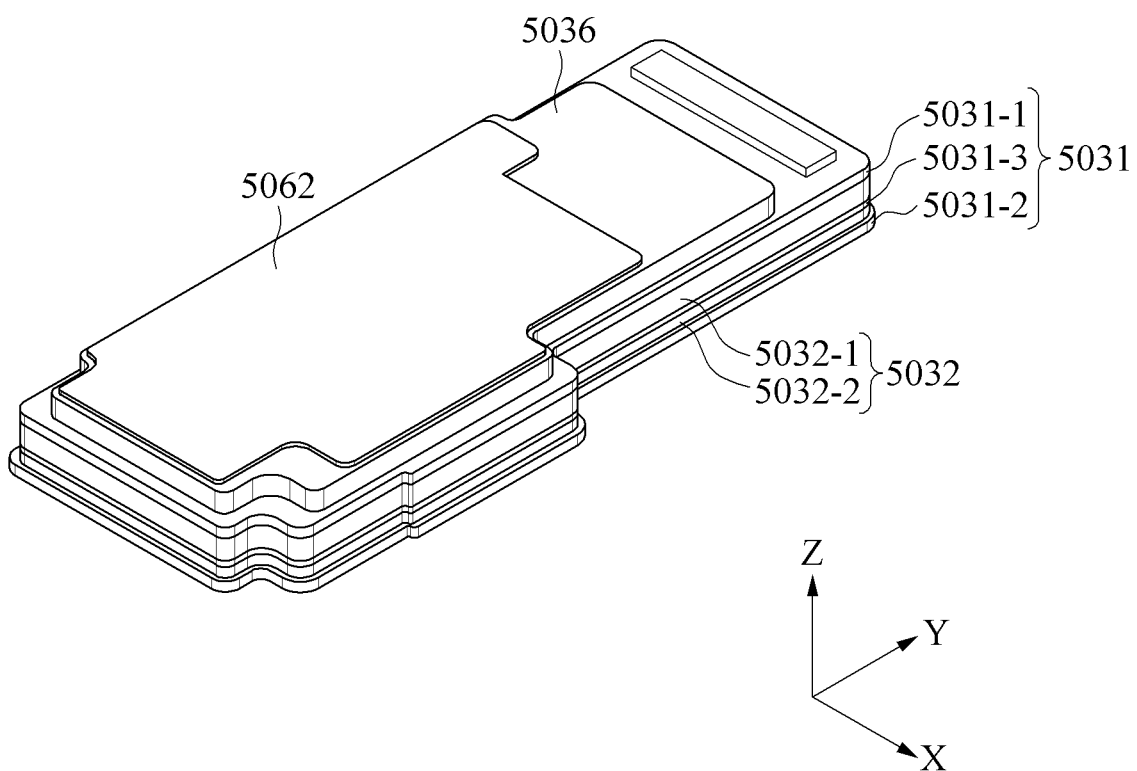
FIG. 14A is a perspective view illustrating an electronic device according to an example embodiment.
Figure 14B:
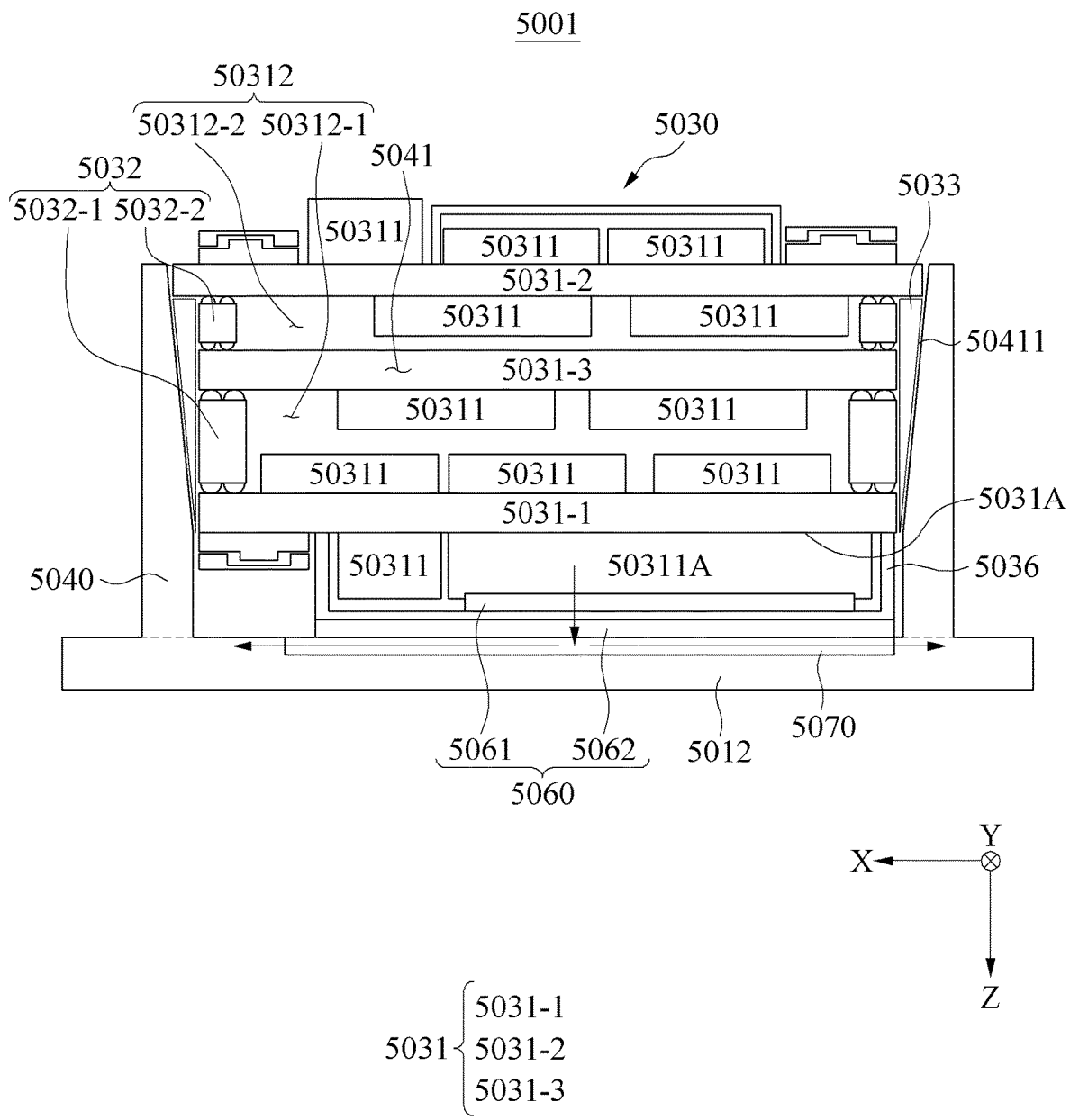
FIG. 14B is a cross-sectional view illustrating an electronic device taken along the line II-II' of FIG. 2E according to an example embodiment.

FIG. 14A is a perspective view illustrating an electronic device according to one embodiment and FIG. 14B is a cross-sectional view illustrating an electronic device taken along the line II-II' of FIG. 2E according to one embodiment.

Referring to FIGS. 14A and 14B, an electronic device 5000 (e.g., the electronic device 101 of FIG. 1, the electronic device 201 of FIG. 2A, or the electronic device 301 of FIG. 3A) according to one embodiment may include a housing (e.g., a second housing 5012), a seating portion 5040, a board module 5030 (e.g., the first PCB 251 of FIG. 2, the board module 330 of FIG. 3A), a second heat transfer member 5060, and a first heat transfer member 5070.

In one embodiment, the seating portion 5040 may support the board module 5030 from the second housing 5012. In one embodiment, the seating portion 5040 may form a seating space 5041 in which the board module 5030 is seated. The seating portion 5040 may include at least one contact portion 50411 formed on an inner circumferential surface of the seating space 5041 and contacting a side surface of the board module 5030.

In one embodiment, the board module 5030 may include a plurality of circuit boards 5031, an interposer/spacer 5032, a heat dissipator 5033, and a shield can 5036. For example, the plurality of circuit boards 5031 may include a first circuit board 5031-1 and a second circuit board 5031-2 disposed in parallel to each other, and a third circuit board 5031-3 disposed between the first circuit board 5031-1 and the second circuit board 5031-2. One or more interposers/spacers 5032 may include a first interposer 5032-1 connecting the first circuit board 5031-1 and the third circuit board 5031-3, and a second interposer 5032-2 connecting the second circuit board 5031-2 and the third circuit board 5031-3. A board space 50312 may be formed between the plurality of circuit boards 5031. In this case, a first board space 50312-1 may be formed between the first circuit board 5031-1 and the third circuit board 5031-3, and a second board space 50312-2 may be formed between the second circuit board 5031-2 and the third circuit board 5031-3. In one embodiment, the heat dissipator 5033 may be disposed on an outer surface of the interposer 5032.

In one embodiment, the shield can 5036 may protect electrical elements 50311 mounted on the circuit board 5031. The shield can 5036 may be disposed to surround a first electrical element 50311A corresponding to at least one of the electrical elements 50311, which is not disposed in the board space 50312, so as to protect the first electrical element 50311A that is vulnerable to the shock. For example, the shield can 5036 may be disposed to surround an AP (e.g., the processor 120 of FIG. 1) mounted on a first board surface 5031A disposed to face a front surface (e.g., a surface facing +Z-axial direction) of the housing. Each "processor" herein may comprise processing circuitry.

In one embodiment, the first heat transfer member 5070 may emit heat generated in the board module 5030 to the housing. For example, the first heat transfer member 5070 may include at least one of a vapor chamber, a heat pipe, or a fin structure. For example, the first heat transfer member 5070 may function to dissipate heat generated in an electrical element 50331 mounted on the first board surface 5031A. An electrical element 51331A that generates a relatively large amount of heat, for example, the AP may be disposed on the first board surface 5031A. The first heat transfer member 5070 may receive the heat generated in the electrical element 50331 mounted on the first board surface 5031A and transfer the received heat to the second housing 5012. In one embodiment, the first heat transfer member 5070 may be formed in a plate shape. The first heat transfer member 5070 may dissipate the heat generated in the board module 5030 to a plane (e.g., XY plane). In one embodiment, the first heat transfer member 5070 may be received in at least a portion of the second housing 5012. For example, a receiving groove may be formed in the second housing 5012 to receive the first heat transfer member 5070, so that the first heat transfer member 5070 is received in the receiving groove of the second housing 5012.

In one embodiment, a heat transfer member 5060 may transfer the heat generated in the board module 5030 to the first heat transfer member 5070. The heat transfer member 5060 may be disposed between the first board surface 5031A and the first heat transfer member 5070. In one embodiment, the heat transfer member 5060 may include a thermal interface material (TIM) having a high heat transfer performance. In one embodiment, the second heat transfer member 5060 may include a (2-1)-th heat transfer member 5061 and a (2-2)-th heat transfer member 5062.

In one embodiment, the (2-1)-th heat transfer member 5061 may transfer heat generated in the first electrical element 50311A to the shield can 5036. The (2-1)-th heat transfer member 5061 may be disposed between the first electrical element 50311A and the shield can 5036 and connect the first electrical element 50311A and the shield can 5036. The (2-1)-th heat transfer member 5061 may be formed of a liquid material having high thermal conductivity, and may be formed of a material having a compressibility.

In one embodiment, the (2-2)-th heat transfer member 5062 (e.g., nano TIM) may transfer the heat received in the shield can 5036 to the first heat transfer member 5070. The (2-2)-th heat transfer member 5062 may be disposed between the shield can 5036 and the first heat transfer member 5070 and connect the shield can 5036 and the first heat transfer member 5070. The (2-2)-th heat transfer member 5062 may be formed of a solid (e.g., tape) material having high thermal conductivity. For example, the (2-2)-th heat transfer member 5062 may include graphite and copper components. In one embodiment, the (2-2)-th heat transfer member 5062 may reduce noise generated in the first electrical element 50311A. For example, the (2-2)-th heat transfer member 5062 may reduce electronic noise generated in the AP.

According to one embodiment, the electronic device 601 includes the housing 310 including the first housing 311 and the second housing 312 to move relative to the first housing 311, the flexible display 320 supported by at least one of the first housing 311 or the second housing 312 and changeable in form of a display area based on a movement of the second housing 312 relative to the first housing 311, the board module 630 disposed inside the housing 310, and the seating portion 640 that forms the seating space 641 receiving the board module 630 and supports the board module 630. The board module 630 includes the plurality of circuit boards 631 spaced apart from each other and including the one or more electrical elements 6311, the at least one interposer (spacer) 632 having at least a portion placed between the plurality of circuit boards 631 and electrically connecting at least two circuit boards among the plurality of circuit boards 631, and the heat dissipator 633 that is part of, contacting, and/or disposed in the interposer 632. In a state in which the board module 630 is received in the seating space 641, at least a portion of a surface of the heat dissipator 633 may contact the seating portion 640 so that heat generated in the plurality of circuit boards 631 is transferred to the seating portion 640.

In one embodiment, the seating portion 640 may include the at least one contact portion 6411 formed on an inner circumferential surface of the seating space 641 and in surface contact with an outer surface of the heat dissipator 633.

In one embodiment, the contact portion 6411 may include the plurality of first contact portions 74111 formed along an outer surface of the board module 630, and the plurality of second contact portions 74112 formed between the plurality of first contact portions 74111 and having end portions formed to be inwardly recessed when compared to the first contact portion 74111.

In one embodiment, the seating portion 640 may further include the at least one non-contact portion 8412 formed on the inner circumferential surface of the seating space 641 and spaced apart from the outer surface of the heat dissipator 633.

In one embodiment, the contact portion 6411 may be formed to be inclined such that a width of the seating space 641 is reduced in one direction.

In one embodiment, the board module 630 may have a shape corresponding to the contact portion 6411.

In one embodiment, in the board module 630, at least one circuit board of the plurality of circuit boards 631 may include a support portion having an edge protruding to the outer side of the interposer 632, and the heat dissipator 633 may be connected to the interposer 632 so as to be supported by the support portion.

In one embodiment, in the seating portion 640, at least a portion of an inner circumferential surface forming the seating space 641 may be spaced apart from a side surface of the board module 630, and the seating portion 640 may include a support portion formed to protrude from the inner circumferential surface and support a surface edge of the board module 630 facing the seating direction.

In one embodiment, the board module 630 may include the first circuit board 4031-1 including the first circuit board surface 4031-1A and the second board surface 4031-1B opposite to the first board surface 4031-1A, and the second circuit board 4031-2 including the third board surface 4031-2A facing the second board surface 4031-1B and the fourth board surface 4031-2B opposite to the third board surface 4031-2A. The first board surface 4031-1A may be disposed to face a front surface of the housing 310. The fourth board surface 4031-2B may be disposed to face a rear surface of the housing 310.

In one embodiment, the electrical element 40311A disposed on the first board surface 4031-1A may generate a larger amount of heat compared to an electrical element disposed on the second board surface 4031-1B.

In one embodiment, an antenna structure may be formed on the rear surface of the housing 310. The communication element 30311C that electrically communicates with the antenna structure may be disposed on the fourth board surface 4031-2B.

In one embodiment, the board module 630 may further include the third circuit board 4031-3 disposed between the first circuit board 4031-1 and the second circuit board 4031-2 and including the fifth board surface 4031-3A facing the second board surface 4031-1B and the sixth board surface 4031-3B facing the third board surface 4031-2A. The interposer (spacer) 632 may include the first interposer 632 disposed between the first circuit board 4031-1 and the third circuit board 4031-3 and electrically connecting the first circuit board 4031-1 and the third circuit board 4031-3, and the second interposer 632 disposed between the second circuit board 4031-2 and the third circuit board 4031-3 and electrically connecting the second circuit board 4031-2 and the third circuit board 4031-3. The heat dissipator 633 may be disposed along outer sides of the first interposer 632 and the second interposer 632 to dissipate heat generated in the first circuit board 4031-1, the second circuit board 4031-2, and the third circuit board 4031-3.

In one embodiment, a PMIC may be disposed on at least one of the second board surface 4031-1B or the fifth board surface 4031-3A.

In one embodiment, based on a state in which the board module 630 is seated in the seating space 641, the electronic device 601 may further include a first heat transfer member to emit heat generated in the board module 630 to the housing 310 and a second heat transfer member to transfer the heat generated in the board module 630 to the first heat transfer member.

In one embodiment, based on a first form in which the display area is minimum or small in size, the flexible display 320 may include the exposed portion 321 exposed to an outside of the housing 310 and the inserted portion 322 inserted into the housing 310. A space of the housing 310 may include the first space 3131 and the second space 3132. When facing the rear surface of the housing 310, the second space 3132 and the inserted portion 322 may not overlap each other. The seating portion 640 may be formed in the second space 3132.

According to one embodiment, the board module 630 disposed inside the electronic device 601 includes the plurality of circuit boards 631 spaced apart from each other and including the one or more electrical elements 6311, the at least one interposer 632 having at least a portion disposed between the plurality of circuit boards 631 and electrically connecting at least two circuit boards among the plurality of circuit boards 631, and the heat dissipator 633 disposed in the interposer 632. The plurality of circuit boards 631 includes the first circuit board 4031-1 and the second circuit board 4031-2.

In one embodiment, the second circuit board 4031-2 may include a support portion having an edge protruding to the outer side of the interposer 632. The heat dissipator 633 may be connected to the interposer 632 so as to be supported by the support portion.

In one embodiment, based on a state of facing a surface of the first circuit board 4031-1, the heat dissipator 633 may include one or more recessed portions of which at least a portion of an edge is recessed along a circumference.

In one embodiment, the heat dissipator 633 may perform a waterproof function.

According to one embodiment, the electronic device 601 includes the housing 310, the flexible display 320 supported by the housing 310, the board module 630 disposed inside the housing 310, and the seating portion 640 that forms the seating space 641 receiving the board module 630 and supports the board module 630. The board module 630 includes the plurality of circuit boards 631 spaced apart from each other and including the one or more electrical elements 6311, the at least one interposer 632 having at least a portion disposed between the plurality of circuit boards 631 and electrically connecting at least two circuit boards among the plurality of circuit boards 631, and the heat dissipator 633 disposed in the interposer 632. In a state in which the board module 630 is received in the seating space 641, at least a portion of the heat dissipator 633 may contact the seating portion 640 so that heat generated in the plurality of circuit boards 631 is transferred to the seating portion 640. The seating portion 640 includes the at least one contact portion 6411 formed on the inner circumferential surface of the seating space 641 and in surface contact with an outer surface of the heat dissipator 633. When facing the seating direction, in the board module 630, at least one circuit board of the plurality of circuit boards 631 includes a support portion having an edge protruding to the outer side of the interposer 632. The heat dissipator 633 is supported by the support portion.

According to one embodiment, the electronic device 601 includes the housing 310 comprising the first housing 311 and the second housing 312, and the second housing 312 configured to move relative to the first housing 310, the flexible display 320 supported by at least one of the first housing 311 or the second housing 312 and changeable in form of a display area based on a movement of the second housing 312 relative to the first housing 311, the board module 630 disposed inside the housing 310, and a seating portion 640 configured to form the seating space 641 receiving the board module 630 and to support the board module 630. The board module 630 includes the first circuit board 4031-1 including the first board surface 4031-1A and the second board surface 4031-1B opposite to the first board surface 4031-1A, the second circuit board 4031-2 including the third board surface 4031-2A facing the second board surface 4031-1B and the fourth board surface 4031-2B opposite to the third board surface 4031-2A, the third circuit board 4031-3 disposed between the first circuit board 4031-1 and the second circuit board 4031-2 and comprising the fifth board surface 4031-3A facing the second board surface 4031-1B and a sixth board surface 4031-3B facing the third board surface 4031-1A, the first interposer 4032-1 disposed between the first circuit board 4031-1 and the third circuit board 4031-3 and configured to electrically connect the first circuit board 4031-1 and the third circuit board 4031-3, the second interposer 4032-2 disposed between the second circuit board 4031-2 and the third circuit board 4031-3 and configured to electrically connect the second circuit board 4031-2 and the third circuit board 4031-3, and the heat dissipator 633 that is part of, connected to, and/or disposed in, the first interposer 4032-1 and the second interposer 4032-2. In a state in which the board module 640 is accommodated in the seating space 641, at least a portion of a surface of the heat dissipator 633 contacts the seating portion 640 so that heat generated in the plurality of circuit boards 4031 can be transferred to the seating portion 641.

What is claimed is:

1. An electronic device comprising:
a housing comprising a first housing and a second housing, the second housing configured to move relative to the first housing;
a flexible display supported by at least one of the first housing or the second housing and changeable in form of a display area based on a movement of the second housing relative to the first housing;
a board module disposed inside the housing; and
a seating portion configured to form a seating space receiving the board module and to support the board module,
wherein the board module comprises:
a plurality of circuit boards spaced apart from each other and comprising one or more electrical elements;
at least one interposer comprising at least a portion placed between the plurality of circuit boards and configured to electrically connect at least two circuit boards among the plurality of circuit boards; and
a heat dissipator that is part of, connected to, and/or disposed in, the interposer, and
wherein, in a state in which the board module is accommodated in the seating space, at least a portion of a surface of the heat dissipator contacts the seating portion so that heat generated in the plurality of circuit boards can be transferred to the seating portion.

2. The electronic device of claim 1, wherein the seating portion comprises at least one contact portion formed on an inner circumferential surface of the seating space and in surface contact with an outer surface of the heat dissipator.

3. The electronic device of claim 2, wherein the contact portion comprises:
a plurality of first contact portions formed along an outer surface of the board module; and a plurality of second contact portions formed between the plurality of first contact portions and comprising end portions formed to be inwardly recessed when compared to the plurality of first contact portions.

4. The electronic device of claim 2, wherein the seating portion further comprises at least one non-contact portion formed on the inner circumferential surface of the seating space and spaced apart from the outer surface of the heat dissipator.

5. The electronic device of claim 2, wherein the contact portion is formed to be inclined such that a width of the seating space is reduced in one direction.

6. The electronic device of claim 5, wherein the board module has a shape corresponding to the contact portion.

7. The electronic device of claim 1, wherein, in the board module, at least one circuit board of the plurality of circuit boards comprises a support portion having an edge protruding to an outer side of the interposer, and
wherein the heat dissipator is connected to the interposer so as to be supported by the support portion.

8. The electronic device of claim 1, wherein, in the seating portion, at least a portion of an inner circumferential surface forming the seating space is spaced apart from a side surface of the board module, and
the seating portion comprises a support portion formed to protrude from the inner circumferential surface and configured to support a surface edge of the board module.

9. The electronic device of claim 1, wherein the board module further comprises:
a first circuit board comprising a first board surface and a second board surface opposite to the first board surface; and
a second circuit board comprising a third board surface facing the second board surface and a fourth board surface opposite to the third board surface,
the first board surface is disposed to face a front surface of the housing, and
the fourth board surface is disposed to face a rear surface of the housing.

10. The electronic device of claim 9, wherein an electrical element disposed on the first board surface is configured to generate a larger amount of heat compared to another electrical element disposed on the second board surface.

11. The electronic device of claim 9, wherein an antenna structure, comprising at least part of an antenna, is formed on the rear surface of the housing, and
a communication element, comprising communication circuitry, configured to electrically communicate with the antenna structure is at least partially disposed on the fourth board surface.

12. The electronic device of claim 9, wherein the board module further comprises a third circuit board disposed between the first circuit board and the second circuit board and comprising a fifth board surface facing the second board surface and a sixth board surface facing the third board surface,
wherein the interposer comprises:
a first interposer disposed between the first circuit board and the third circuit board and configured to electrically connect the first circuit board and the third circuit board; and
a second interposer disposed between the second circuit board and the third circuit board and configured to electrically connect the second circuit board and the third circuit board, and
wherein the heat dissipator is disposed along outer sides of the first interposer and the second interposer to dissipate heat generated from the first circuit board, the second circuit board, and the third circuit board.

13. The electronic device of claim 12, wherein a power management integrated circuit (PMIC) is disposed on at least one of the second board surface or the fifth board surface.

14. The electronic device of claim 1, wherein, based on a state in which the board module is seated in the seating space, the electronic device further comprises:
a first heat transfer member, comprising a conductor, configured to emit heat to be generated in the board module to the housing; and
a second heat transfer member, comprising a conductor, configured to transfer heat to be generated in the board module to the first heat transfer member.

15. The electronic device of claim 1, wherein, based on a first form in which the display area is minimum and/or small in size, the flexible display comprises an exposed portion exposed to an outside of the housing and an inserted portion inserted into the housing,
a space formed by the first housing and the second housing comprises a first space and a second space,
the second space and the inserted portion do not overlap each other when facing a rear surface of the housing, and
the seating portion is formed in the second space.

16. A board module in an electronic device, the board module comprising:
a plurality of circuit boards spaced apart from each other and comprising one or more electrical elements;
at least one interposer comprising at least a portion disposed between the plurality of circuit boards and configured to electrically connect at least two circuit boards among the plurality of circuit boards; and
a heat dissipator that is part of, connected to, and/or disposed in the interposer,
wherein the plurality of circuit boards comprises a first circuit board, a second circuit board, and a third circuit board disposed between the first circuit board and the second circuit board,
the interposer comprising a first interposer disposed between the first circuit board and the third circuit board, and a second interposer disposed between the second circuit board and the third circuit board,
wherein at least one circuit board of the plurality of circuit boards comprises a support portion having an edge protruding to an outer side of the interposer, and
the heat dissipator is connected to the interposer so as to be supported by the support portion.

17. The board module of claim 16, wherein, based on a state of facing a surface of the first circuit board, the heat dissipator comprises one or more recessed portions of which at least a portion of an edge is recessed along a circumference.

18. The board module of claim 16, wherein the heat dissipator is configured to perform a waterproof function.

19. An electronic device comprising:
a housing;
a flexible display supported by the housing;
a board module disposed inside the housing; and
a seating portion configured to form a seating space receiving the board module and to support the board module,
wherein the board module comprises:

a plurality of circuit boards spaced apart from each other and comprising one or more electrical elements;

at least one interposer having at least a portion disposed between the plurality of circuit boards and configured to electrically connect at least two circuit boards among the plurality of circuit boards; and a heat dissipator that is part of, contacting, and/or disposed in the interposer, wherein, in a state in which the board module is received in the seating space, at least a portion of a surface of the heat dissipator contacts the seating portion so that heat to be generated in the plurality of circuit boards can be transferred to the seating portion, wherein the seating portion comprises at least one contact portion formed on an inner circumferential surface of the seating space and in surface contact with an outer surface of the heat dissipator, wherein, in the board module, at least one circuit board of the plurality of circuit boards comprises a support portion having an edge protruding to an outer side of the interposer, and wherein the heat dissipator is supported by the support portion.

20. An electronic device comprising:

a housing comprising a first housing and a second housing, the second housing configured to move relative to the first housing;

a flexible display supported by at least one of the first housing or the second housing and changeable in form of a display area based on a movement of the second housing relative to the first housing;

a board module disposed inside the housing; and a seating portion configured to form a seating space receiving the board module and to support the board module, wherein the board module comprises:

a first circuit board comprising a first board surface and a second board surface opposite to the first board surface;

a second circuit board comprising a third board surface facing the second board surface and a fourth board surface opposite to the third board surface;

a third circuit board disposed between the first circuit board and the second circuit board and comprising a fifth board surface facing the second board and a sixth board surface facing the third board surface, a first interposer disposed between the first circuit board and the third circuit board and configured to electrically connect the first circuit board and the third circuit board;

a second interposer disposed between the second circuit board and the third circuit board and configured to electrically connect the second circuit board and the third circuit board, and a heat dissipator that is part of, connected to, and/or disposed in, the first interposer and the second interposer; and wherein, in a state in which the board module is accommodated in the seating space, at least a portion of a surface of the heat dissipator contacts the seating portion so that heat generated in the plurality of circuit boards can be transferred to the seating portion.

* * * * *